US008451879B2

(12) United States Patent
Kennedy et al.

(10) Patent No.: US 8,451,879 B2
(45) Date of Patent: *May 28, 2013

(54) HIGH BANDWIDTH DATA TRANSPORT SYSTEM

(75) Inventors: Philip T. Kennedy, Cedar Rapids, IA (US); Joseph A. Gerke, Ely, IA (US); David M. Snyder, Cedar Rapids, IA (US); Jon G. Stanford, Norway, IA (US); Xuejie Song, Cedar Rapids, IA (US); Gregory P. Probst, Iowa City, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 892 days.

This patent is subject to a terminal disclaimer.

(21) Appl. No.: 11/932,459

(22) Filed: Oct. 31, 2007

(65) Prior Publication Data

US 2009/0110030 A1    Apr. 30, 2009

Related U.S. Application Data

(60) Provisional application No. 60/983,337, filed on Oct. 29, 2007.

(51) Int. Cl.
*H04B 1/00* (2006.01)

(52) U.S. Cl.
USPC .......................................... 375/130; 375/257

(58) Field of Classification Search
USPC .................................. 375/130, 257
See application file for complete search history.

(56) References Cited

U.S. PATENT DOCUMENTS

| 3,818,117 A | 6/1974 | Reyner, II et al. |
| 3,836,951 A | 9/1974 | Geren et al. |
| 3,903,371 A | 9/1975 | Colton et al. |
| 3,906,484 A | 9/1975 | Melvin, Jr. et al. |
| 4,357,634 A | 11/1982 | Chung |
| 4,434,323 A | 2/1984 | Levine et al. |
| 4,513,403 A | 4/1985 | Troy |
| 4,640,158 A | 2/1987 | Link et al. |
| 4,641,317 A | 2/1987 | Fullerton |

(Continued)

FOREIGN PATENT DOCUMENTS

| DE | 195 10304 C1 | 3/1995 |
| WO | WO 00/41383 | 7/2000 |
| WO | WO 00/54488 | 9/2000 |
| WO | WO 01 97477 A2 | 12/2001 |

OTHER PUBLICATIONS

IEEE802.11a, "Part 11: Wireless LAN Medium Access Control (MAC) and Physical Layer (PHY) specifications High-speed Physical Layer in the 5 GHz Band", IEEE 1999, p. 24.*
Rauschmayer, "ADSL/VDSL principles", 1999, pp. 171 and 208.*

(Continued)

*Primary Examiner* — Juan A Torres
(74) *Attorney, Agent, or Firm* — McKee, Voorhees & Sease, P.L.C.

(57) ABSTRACT

A device for sending and receiving ultra wideband communications over a guided medium includes a line interface configured for electrical communication to the guided medium and adapted for interfacing with the guided medium, an ultra wideband impulse transmitter electrically connected to the line interface for transmitting amplitude modulated ultra wideband impulses over the guided medium, and an ultra wideband receiver electrically connected to the line interface for receiving amplitude modulated ultra wideband impulses over the guided medium.

6 Claims, 31 Drawing Sheets

BASIC MULTI-MEGABAND SYSTEM FFT PHY BLOCK DIAGRAM

U.S. PATENT DOCUMENTS

| | | | |
|---|---|---|---|
| 4,706,264 | A | 11/1987 | Cung |
| 4,813,057 | A | 3/1989 | Fullerton |
| 4,866,737 | A | 9/1989 | Seifried |
| 5,050,189 | A | 9/1991 | Cox et al. |
| 5,132,986 | A | 7/1992 | Endo et al. |
| 5,339,421 | A | 8/1994 | Housel, III |
| 5,363,108 | A | 11/1994 | Fullerton |
| 5,414,455 | A | 5/1995 | Hooper et al. |
| 5,418,721 | A | 5/1995 | Arai et al. |
| 5,442,390 | A | 8/1995 | Hooper et al. |
| 5,461,318 | A | 10/1995 | Borchert et al. |
| 5,497,373 | A | 3/1996 | Hulen et al. |
| 5,526,035 | A | 6/1996 | Lappington et al. |
| 5,560,038 | A | 9/1996 | Haddock |
| 5,581,706 | A | 12/1996 | Jessup, Jr. et al. |
| 5,666,379 | A | 9/1997 | Ovard et al. |
| 5,666,390 | A | 9/1997 | Morzano |
| 5,677,927 | A | 10/1997 | Fullerton et al. |
| 5,706,495 | A | 1/1998 | Chadha et al. |
| 5,737,595 | A | 4/1998 | Cohen et al. |
| 5,754,849 | A | 5/1998 | Dyer et al. |
| 5,818,442 | A | 10/1998 | Adamson |
| 5,832,035 | A | 11/1998 | Fullerton |
| 5,841,764 | A | 11/1998 | Roderique et al. |
| 5,852,825 | A | 12/1998 | Winslow |
| 5,951,646 | A | 9/1999 | Brandon |
| 5,952,956 | A | 9/1999 | Fullerton |
| 5,956,729 | A | 9/1999 | Goetz et al. |
| 5,974,416 | A | 10/1999 | Anand et al. |
| 5,982,276 | A | 11/1999 | Stewart |
| 6,020,980 | A | 2/2000 | Freeman |
| 6,026,125 | A | 2/2000 | Larrick, Jr. et al. |
| 6,031,862 | A | 2/2000 | Fullerton et al. |
| 6,049,806 | A | 4/2000 | Crecine |
| 6,049,848 | A | 4/2000 | Yates et al. |
| 6,054,950 | A | 4/2000 | Fontana |
| 6,061,057 | A | 5/2000 | Knowlton et al. |
| 6,111,356 | A | 8/2000 | Roitman et al. |
| 6,112,207 | A | 8/2000 | Nori et al. |
| 6,133,912 | A | 10/2000 | Montero |
| 6,151,602 | A | 11/2000 | Hejlsberg et al. |
| 6,185,290 | B1 | 2/2001 | Shaffer et al. |
| 6,195,484 | B1 | 2/2001 | Brennan, III et al. |
| 6,236,652 | B1 | 5/2001 | Preston et al. |
| 6,250,309 | B1 | 6/2001 | Krichen et al. |
| 6,272,316 | B1 | 8/2001 | Wiedeman et al. |
| 6,354,946 | B1 | 3/2002 | Finn |
| 6,356,946 | B1 | 3/2002 | Clegg et al. |
| 6,363,179 | B1 | 3/2002 | Evans et al. |
| 6,363,320 | B1 | 3/2002 | Chou |
| 6,427,150 | B1 | 7/2002 | Oashi et al. |
| 6,430,208 | B1 | 8/2002 | Fullerton et al. |
| 6,437,832 | B1 | 8/2002 | Grabb et al. |
| 6,438,140 | B1 | 8/2002 | Jungers et al. |
| 6,496,104 | B2 | 12/2002 | Kline |
| 6,505,032 | B1 | 1/2003 | McCorkle et al. |
| 6,532,256 | B2 | 3/2003 | Miller |
| 6,532,260 | B2 | 3/2003 | Oi |
| 6,536,043 | B1 | 3/2003 | Guedalia |
| 6,603,818 | B1 | 8/2003 | Dress, Jr. et al. |
| 6,606,350 | B2 | 8/2003 | Dress, Jr. et al. |
| 6,678,321 | B1 | 1/2004 | Graham et al. |
| 6,717,517 | B2 | 4/2004 | Przygoda, Jr. |
| 6,717,992 | B2 | 4/2004 | Cowie et al. |
| 6,781,530 | B2 | 8/2004 | Moore |
| 6,782,048 | B2 | 8/2004 | Santhoff |
| 6,810,087 | B2 | 10/2004 | Hoctor et al. |
| 6,822,508 | B2 | 11/2004 | Yoon et al. |
| 6,834,073 | B1 | 12/2004 | Miller et al. |
| 6,868,419 | B1 | 3/2005 | Melick et al. |
| 6,882,689 | B2 | 4/2005 | Maggio et al. |
| 6,909,877 | B2 | 6/2005 | Rofheart et al. |
| 6,920,129 | B2 | 7/2005 | Preston et al. |
| 6,933,882 | B2 | 8/2005 | Fullerton |
| 6,959,031 | B2 | 10/2005 | Haynes et al. |
| 6,980,566 | B2 | 12/2005 | Melick et al. |
| 7,013,145 | B1 | 3/2006 | Centore, III |
| 7,031,294 | B2 | 4/2006 | Aiello et al. |
| 7,089,407 | B2 | 8/2006 | Kojima et al. |
| 7,185,062 | B2 | 2/2007 | Lolayekar et al. |
| 7,308,033 | B2 * | 12/2007 | Yu et al. ........................ 375/260 |
| 7,340,283 | B1 | 3/2008 | Melick et al. |
| 7,346,120 | B2 | 3/2008 | McCorkle |
| 7,376,191 | B2 | 5/2008 | Melick et al. |
| 7,376,357 | B2 | 5/2008 | Melick et al. |
| 7,649,951 | B2 * | 1/2010 | Moffatt ........................ 375/260 |
| 7,751,488 | B2 * | 7/2010 | Moffatt ........................ 375/260 |
| 2001/0055353 | A1 | 12/2001 | Rybicki et al. |
| 2002/0059642 | A1 | 5/2002 | Russ et al. |
| 2002/0075972 | A1 | 6/2002 | Richards et al. |
| 2002/0076193 | A1 | 6/2002 | Melick et al. |
| 2003/0076248 | A1 | 4/2003 | Larson |
| 2003/0228005 | A1 * | 12/2003 | Melick et al. ............. 379/93.01 |
| 2004/0233943 | A1 | 11/2004 | Fullerton et al. |
| 2004/0247020 | A1 | 12/2004 | Mills et al. |
| 2005/0053165 | A1 * | 3/2005 | Lakkis ........................ 375/260 |
| 2005/0069020 | A1 * | 3/2005 | Lakkis ........................ 375/130 |
| 2005/0089083 | A1 | 4/2005 | Fisher et al. |
| 2005/0094784 | A1 | 5/2005 | Melick et al. |
| 2005/0131922 | A1 * | 6/2005 | Kennedy et al. ............. 707/100 |
| 2005/0180369 | A1 | 8/2005 | Hansen et al. |
| 2005/0240607 | A1 | 10/2005 | Melick et al. |
| 2005/0254554 | A1 * | 11/2005 | Melick et al. ................. 375/130 |
| 2006/0039457 | A1 * | 2/2006 | Davis et al. ................... 375/222 |
| 2006/0165015 | A1 | 7/2006 | Melick et al. |
| 2007/0022444 | A1 | 1/2007 | Santhoff |
| 2007/0025738 | A1 | 2/2007 | Moore |
| 2007/0058693 | A1 | 3/2007 | Aytur et al. |
| 2007/0081604 | A1 * | 4/2007 | Khan et al. .................... 375/261 |
| 2007/0147386 | A1 | 6/2007 | Choi et al. |
| 2007/0248174 | A1 * | 10/2007 | Ghosh et al. .................. 375/260 |
| 2008/0002709 | A1 | 1/2008 | Kennedy et al. |
| 2008/0049708 | A1 * | 2/2008 | Khan et al. .................... 370/343 |
| 2008/0107188 | A1 | 5/2008 | Kennedy et al. |
| 2008/0112479 | A1 * | 5/2008 | Garmany et al. ............. 375/231 |
| 2008/0151831 | A1 * | 6/2008 | Khan et al. .................... 370/330 |
| 2008/0159537 | A1 * | 7/2008 | Khan et al. .................... 380/268 |
| 2009/0245084 | A1 * | 10/2009 | Moffatt et al. ................ 370/208 |

OTHER PUBLICATIONS

Itu G.992.1 ADSL transceivers, 1999 pp. 10 and 38-42, this recommendation can be downloaded for free in http://www.itu.int/rec/dologin_pub.asp?lang=e&id=T-REC-G.992.1-199907-I!!PDF-E &type=items.*

International Search Report for co-pending PCT/US2007/083359, Lightwave Systems, Jul. 8, 2008.

International Search Report, PCT/US00/05993, Lightwave Systems, May 25, 2004.

International Search Report, PCT/US03/13818, Lightwave Systems, Aug. 22, 2003.

"Data Transmission", www.cs.ucf.edu/courses/cda3102/chapter4.html, Apr. 3, 2001, 6 pages.

Communications—Data Transmission, "Data Transmission", http://home.olemiss.edu/~misbook/cm6.htm, Apr. 3, 2001, 3 pages.

Dodd, Annabel Z., The Essential Guide to Telecommunications, 2nd edition, 2000, Prentice Hall PTR, pp. 14-17 and 188-239.

Hardware, "Data Representation", http://home.olemiss.edu/~misbook/hm1.htm, Apr. 3, 2001, 3 pages.

Jones, Douglas W., "BCD Arithmetic, a Tutorial", http://www.cs.uiowa.edu/~jones/bcd/bcd.html, Apr. 3, 2001, 9 pages.

Kuhn, Kelin J., "CD/ROM—An extension of the CD audio standard" EE498, www.ee.washington.edu/conselec/CE/kuhn/cdrom/95x8.htm, Apr. 3, 2001, 9 pages.

Kuhn, Kelin J., "Other disk formats of interest" EE498, www.ee.washington.edu/conselec/CE/kuhn/otherformats/95x9.htm, Apr. 3, 2001, 7 pages.

Maney, Kevin, "Pulsing with promise", USA Today Money, Apr. 19, 1999, 4 pages.

Merriam—Webster's Collegiate Dictionary, Tenth Edition, Webster, Inc., p. 902, 2 pages.

Negroponte, Nicholas, "Being Digital", 1995 Vintage Books, pp. 11-85 and 127-136.

JimPrice.Com, "ASCII Chart", www.jimprice.com/jim-asc.htm, Feb. 10, 2000, 9 pages.

Pulse~Link, "Ultra Wideband Over Cable Technologies: Enhansing Cable Television Bandwidth Capacity Without Modification to Existing Infrastructure", 2002 Pulse~Link, Inc., 5 pages.

Ruettgers, Michael C., "E-Infostructure: EMC's Vision for Accelerating The New Economy", www.emc.com/about/managment/speeches/cebit.jsp, Dec. 12, 2000, 7 pages.

Ruettgers, Michael C., "Thriving in the Information Economy", www.emc.com/about/managment/speeches/wired_index.isp, Oct. 23, 2000, 5 pages.

Schneiderman, Ron, "Future Talk The Changing Wirelss Game", 1997 IEEE Press Marketing, pp. 89-130 and 135-141.

Searle, Steven J., "A Brief History of Character Codes", http://tronweb.super-nova.co.jp/characcodehist.html, Feb. 10, 2000, 22 pages.

Stallings, William, "Data and Computer Communications" Fifth Edition, 1997, pp. 143 and 541-544.

"The Unicode(R) Standard: A Technical Introduction", www.unicode.org/unicode/standard/principles.html, Apr. 3, 2001, 10 pages.

Tisal, Joachim, "GSM Cellular Radio Telephony" John Wiley & Sons, Inc., May 1997, pp. 43-98.

"Universal Data Tone", www.emc.com/about/data_tone/index.jsp, Oct. 23, 2000, 1 page.

"Video Compression: A Codec Primer", http://hotwired.lycos.com/webmonkey/97/34/index1a_page5.html? tw=multimedia, Apr. 3, 2001, 2 pages.

"What is Unicode?" www.unicode.org/unicode/standard/WhatIsUnicode.html, Feb. 10, 2000, 2 pages.

Win, Moe Z. et al., "Impulse Radio: How it works", IEEE Communications Letters, vol. 2, No. 1, Jan. 1988, pp. 10-12.

Win, Moe Z. et al., "Ultra-Wide Bandwidth Signal Propagation for Indoor Wireless Communications", IEEE International Conference on Communications, Monreal, Canada, Jun. 1997, pp. 56-60.

* cited by examiner

BASIC MULTI-MEGABAND SYSTEM FFT PHY BLOCK DIAGRAM

FFT / IFFT TX MAPPING FUNCTION DIAGRAM

HIGH BANDWIDTH DATA TRANSPORT SYSTEM

PRIORITY STATEMENT

This application is a nonprovisional of and claims priority to U.S. Provisional Patent Application No. 60/983,337, filed Oct. 29, 2007, herein incorporated by reference in its entirety.

FIELD OF THE INVENTION

The present invention relates generally to a system, apparatus and method of data transmission that provides for representing data using ultra wideband pulses or impulses, sending at least one pulse or impulse over an electrically conductive guided medium, receiving the at least one pulse or impulse at a telecommunication interface having an ultra wideband pulse or impulse over a conductive medium modem coupled to the electrically conductive guided medium, wherein the telecommunication interface is operatively connected to a non-ultra wideband pulse or impulse over a wire communication modem coupled to a communication medium. The method further provides for recovering the data from the at least one pulse or impulse. In addition, the method provides for interfacing "non-ultra wideband" pulse or impulse based networks with guided line networks that receive and transmit data encoded and modulated using "ultra-wideband pulse or impulse transmissions". The method further provides for single or multiple channels of operation.

PROBLEMS IN THE ART

There are several trends in society that are creating an unprecedented need for bandwidth by consumers and businesses. Some of these result from the advent of the "digital age." Today, digitally encoded music can be played on MP3 and Compact Disc (CD) players designed for portable use, in automobiles, and homes. Digitally encoded voice is commonplace technology for cell phones and other forms of wireless telephones. Digitally encoded video can be watched from Digital Versatile Disk players (DVD), Direct Broadcast Satellite (DBS) Receivers, Personal Video Recorders (TiVo), digital camcorders and High Definition Televisions (HDTV). In addition, machines using digitally encoded data, such as the Personal Computer, and game stations, such as, XBox, Playstation 2 and Nintendo 64 are now ubiquitous.

The rise of the Internet and networks has provided ubiquitous connectivity for businesses and consumers alike, but are being constrained by the lack of true broadband availability. In December 1995, there were 16 million Internet connections worldwide. By August of 2001, that number had grown to 513 million. In December of 2005, Internet connections worldwide had grown to 1.02 billion.

Also, the demand for broadband connectivity continues to grow. This is a result of the increased number of users accessing remote sources of digitally encoded data and data intensive applications. Initially, Internet content was largely text-based and provided limited amount of services. However, the Internet has grown to provide more bandwidth intensive content filled with pictures, graphics, and video clips. In the future, the increase of available bandwidth will enable higher quality Internet content such as full motion video, entertainment quality video, streaming video and audio.

Even though there is currently a glut of high-speed fiber optic backbone capacity, with an overall utilization rate of only 3% to 5%, the access network, or what is commonly referred to as the "first mile" or "last mile", simply cannot keep pace with the need and desire for higher speed access to larger amounts of digital information.

There are many individuals and organizations who view the need to provide broadband connectivity as a matter of national importance. The Technology Network (TechNet), an organization of CEOs from the nation's leading technology companies, has called on the federal government to adopt a goal of 100 megabits per second to 100 million homes and small businesses by 2010. TechNet states, "If most Americans had high speed Internet access, whether by wire line, wireless, satellite or cable, consumers could benefit from access to multimedia, interactive distance learning, increased telecommuting, higher productivity, easier interaction with government, improved health care services, and on-demand entertainment. Currently, the vast majority of so-called "broadband" connections such as cable modem and DSL operate at less than 2 megabytes per second.

The Internet currently is built with many components capable of providing bandwidth at very high data transmission rates. However, the major impediment to the delivery of high-bandwidth Internet content and services is the transmission constraints from the major Internet pipes to the customer's home or business, also known as the "last mile."

Today, there are four basic technologies used for "last mile" access: fiber, telephone twisted pair, cable, and wireless.

Even though fiber optic transmission lines can provide a significant amount of bandwidth, laying fiber to the home or business has proven to be too costly. Wireless is also an expensive access network solution, and the total available bandwidth is limited and shared.

Wired communications for the last several decades has been dominated by a single signal processing technology called Discrete Multi-tone or DMT. This technology is similar to the broader defined technology called Orthogonal Frequency Division Multiplexing or OFDM. The vast majority of technology used on telephone twisted pair, coax or power line cables utilize this technology. On each wire, the technology may have a slightly different name and implementation, but is conceptually identical in functionality. DMT/OFDM is based in theory on very traditional signal processing techniques designed for small to medium bandwidth applications. The various technologies were developed as single asymmetrical two way data highways to simply deliver Internet to computers. There is a need in the world for a new, more robust high speed solution.

During the last several decades, research in the wireless communications and radar industries working on applications for the military and convert communications migrated to a much different wireless technology utilizing very short pulses that individually cover very large spans of frequency. This technology research resulted in a wireless technology now known as UltraWideBand (UWB). This technology represents the fastest of the known wireless signal processing technologies.

Currently, cable, telephone twisted pair, broadband power line access wired networks and wireless networks are limited by the physics of continuously oscillating radio frequency technology. Also, the local in-building networks, cable, telephone twisted pair, and power line communication wired networks and wireless networks are limited by the physics of continuously oscillating radio frequency technology.

Not only are non-ultra wideband "last mile" wired and wireless networks constrained by the physics of continuously oscillating radio frequency technology, but so are local area networks (LANs) and data buses.

Therefore, what is needed is a cost-effective solution that provides very high bandwidth for "last mile" access networks, buses, and LANs, that interface with non-ultra wideband pulse or impulse communication systems which overcomes these problems, and other limitations of current technology.

FEATURES OF THE INVENTION

A general feature of the present invention is the provision of a system, method and apparatus for increasing the bandwidth of guided line mediums, which overcomes the problems found in the prior art.

A further object, feature, or advantage of the present invention is the use of pulses or impulses, which are capable of being used for the transmission of data at a high rate over high attenuation and capacitance mediums.

A further object, feature, or advantage of the present invention is the transmission of data as one or more streams.

A further object, feature, or advantage of the present invention is the transmission of data as one or more data packets.

A further object, feature, or advantage of the present invention is the transmission of data as one or more structured streams.

A further object, feature, or advantage of the present invention is the transmission of data as one or more structured data packets.

A further object, feature, or advantage of the present invention is the modulation of pulses or impulses by polarity.

A further object, feature, or advantage of the present invention is the modulation of pulses or impulses by position in time.

A further object, feature, or advantage of the present invention is the modulation of the time between successive pulses or impulses.

A further object, feature, or advantage of the present invention is the modulation of pulses or impulses by pulse or impulse width.

A further object, feature, or advantage of the present invention is the modulation of pulses or impulses by amplitude.

A further object, feature, or advantage of the present invention is the modulation of pulses or impulses by frequency.

A further object, feature, or advantage of the present invention is the modulation of pulses or impulses by phase.

A further object, feature, or advantage of the present invention is the modulation of pulses or impulses by variable pulse or impulse encoding.

A further object, feature, or advantage of the present invention is the modulation of pulses or impulses using pulse or impulse shaping.

A further object, feature, or advantage of the present invention is the modulation of alternating counter pulses or impulses.

A further object, feature, or advantage of the present invention is the modulation of multiple pulses or impulses with or without pulse or impulse compression methods.

A further object, feature, or advantage of the present invention is the modulation of pulses or impulses by any combination of polarity, time, amplitude, frequency, phase, shape, width, and time between successive pulses or impulses.

A further object, feature, or advantage of the present invention is the modulation of alternating counter pulses or impulses by any combination of polarity, time, amplitude, frequency, phase, shape, width, and time between successive pulses or impulses.

A further object, feature, or advantage of the present invention is the encoding of data or symbols in Base 2 numbers of pulses or impulses.

A further object, feature, or advantage of the present invention is the encoding of data or symbols in higher than Base 2 numbers of pulses or impulses.

A further object, feature, or advantage of the present invention is simplex signaling.

A further object, feature, or advantage of the present invention is half-duplex signaling.

A further object, feature, or advantage of the present invention is full-duplex signaling.

A further object, feature, or advantage of the present invention is synchronous signaling.

A further object, feature, or advantage of the present invention is asynchronous signaling.

A further object, feature, or advantage of the present invention is an enhanced broadband transmission system with a point-to-point topology.

A further object, feature, or advantage of the present invention is an enhanced broadband transmission system with a point-to-multi-point topology.

A further object, feature, or advantage of the present invention is an enhanced broadband transmission system using a loop topology.

A further object, feature, or advantage of the present invention is an enhanced broadband transmission system that is designed for a single user access.

A further object, feature, or advantage of the present invention is an enhanced broadband transmission system that is designed for multiple user access.

A further object, feature, or advantage of the present invention is its deployment over "last mile" access network topologies.

A further object, feature, or advantage of the present invention is a "last mile" access network configured as a telephone loop plant.

A further object, feature, or advantage of the present invention is a telephone loop configured to use one wire of a telephone twisted pair for forward transmission and the other wire for reverse transmission.

A further object, feature, or advantage of the present invention is a telephone loop configured to use both wires of a telephone twisted pair for multiplexed forward and reverse transmissions.

A further object, feature, or advantage of the present invention is a "last mile" access network configured as a Cable TV network.

A further object, feature, or advantage of the present invention is a "last mile" access network configured as a power distribution network.

A further object, feature, or advantage of the present invention is its deployment over local area network (LANs) topologies.

A further object, feature, or advantage of the present invention is its deployment over data bus topologies.

A further object, feature, or advantage of the present invention is its deployment using any combination of "last mile" access network, LAN, and data bus topologies.

A further object, feature, or advantage of the present invention is connection to a "last mile" access network, LAN, or data bus using a single transmission medium.

A further object, feature, or advantage of the present invention is connection to a "last mile" access network, LAN, or data bus using a plurality of transmission mediums of a single type.

A further object, feature, or advantage of the present invention is connection to a "last mile" access network, LAN, or data bus using a plurality of transmission mediums of a plurality of types.

A further object, feature, or advantage of the present invention is the use of un-bonded telephone twisted pair as a transmission medium.

A further object, feature, or advantage of the present invention is the use of bonded telephone twisted pair as a transmission medium.

A further object, feature, or advantage of the present invention is the use of coaxial cable as a transmission medium.

A further object, feature, or advantage of the present invention is the use of high voltage power transmission lines as a transmission medium.

A further object, feature, or advantage of the present invention is the use of low voltage in-building power lines as a transmission medium.

A further object, feature, or advantage of the present invention is the use of shielded pair wire as a transmission medium.

A further object, feature, or advantage of the present invention is the use of metallic vehicle bodies and frames as a transmission medium.

A further object, feature, or advantage of the present invention is the use of structural steel as a transmission medium.

A further object, feature, or advantage of the present invention is the use of railroad rail as a transmission medium.

A further object, feature, or advantage of the present invention is the use of reinforcing bar as a transmission medium.

A further object, feature, or advantage of the present invention is the use of metallic water pipe or other forms of metallic pipeline transport as a transmission medium.

A further object, feature, or advantage of the present invention is the use of metal desks as a transmission medium.

A further object, feature, or advantage of the present invention is the use of computer backplanes as a transmission medium.

A further object, feature, or advantage of the present invention is the use of drill stem as a transmission medium.

A further object, feature, or advantage of the present invention is the use of other conductive medium as a transmission medium.

A further object, feature, or advantage of the present invention is the use of combinations of above as a transmission medium.

A further object, feature, or advantage of the present invention is the use of the human body as a broadband data bus transmission medium.

A further object, feature, or advantage of the present invention is the use of a single frequency channel to transmit ultra wideband pulses or impulses.

A further object, feature, or advantage of the present invention is the use of multiple frequency channels to transmit ultra wideband pulses or impulses.

A further object, feature, or advantage of the present invention is the use of notched frequency channels to transmit ultra wideband pulses or impulses.

A further object, feature, or advantage of the present invention is the use of time division multiplexing for multiple channels, multiple users and/or multiple device access over a single frequency channel on individual or multiple transmission mediums.

A further object, feature, or advantage of the present invention is the use of code division multiplexing for multiple channels, multiple users and/or multiple device access over a single frequency channel operating on individual or multiple transmission mediums.

A further object, feature, or advantage of the present invention is the use of time division multiplexing for multiple channels, multiple users and/or multiple device access over multiple frequency channels operating on individual or multiple transmission mediums.

A further object, feature, or advantage of the present invention is the use of code division multiplexing for multiple channels, multiple users and/or multiple device access over multiple frequency channels operating on individual or multiple transmission mediums.

A further object, feature, or advantage of the present invention is the modulation of ultra wideband pulses or impulses on an individual or plurality of narrowband sub-carriers.

A further object, feature, or advantage of the present invention is the use of a mixture of low and high speed frequency channels operating on the same wire.

A further object, feature, or advantage of the present invention is the use of different number base encodings for different frequency channels operating on the same wire.

A further object, feature, or advantage of the present invention is the use of public and private access codes.

A further object, feature, or advantage of the present invention is the provision of high security through the low probability of intercept and detection characteristics of transmissions.

A further object, feature, or advantage of the present invention is the provision of an efficient data encapsulation protocol.

A further object, feature, or advantage of the present invention is the provision of a multiplexer.

A further object, feature, or advantage of the present invention is the provision of a transceiver/processor.

A further object, feature, or advantage of the present invention is the provision of intermediate field repeaters.

A further object, feature, or advantage of the present invention is the provision of multiplexers, switches, intermediate field repeaters, routers, client transceiver/processors, and other devices that switch data as pulses or impulses.

A further object, feature, or advantage of the present invention is the provision for a client device to operate as a "Home/PNA" local director.

A further object, feature, or advantage of the present invention is the provision for a multiplexer that is configured to operate as a "Home/PNA" remote director.

A further object, feature, or advantage of the present invention is an enhanced broadband delivery system that is designed to operate as a unified messaging system.

A further object, feature, or advantage of the present invention is an enhanced broadband delivery system in which multiplexers serve as a concatenation point for a unified messaging system.

A further object, feature, or advantage of the present invention is the use of geo-position represented by bits other than TCP/IP headers as a routing mechanism.

A further object, feature, or advantage of the present invention is the use of geo-position represented by bits other than TCP/IP headers as a routing mechanism in which the bits are tagged with XML or non-XML tags.

A further object, feature, or advantage of the present invention is the use of geo-position represented by bits other than TCP/IP headers as a routing mechanism in which the bits are not tagged but rather defined by position within the data packet.

A further object, feature, or advantage of the present invention is the inclusion of data and symbol compression methods and systems within the transport.

A further object, feature, or advantage of the present invention is the inclusion of data and symbol encryption and other security methods and systems within the transport.

A further object, feature, or advantage of the present invention is the inclusion of manual and automated transmission tuning and conditioning systems and methods.

A further object, feature, or advantage of the present invention is the use of priority, service type, stream identification, destination address, intermediate address, origination address, protocol type, network conditions (blockage, availability, route costs, quality of service, etc.), security rules and other standard network routing and switching metrics to route and switch data.

A still further object, feature, or advantage of the present invention is to provide for interfacing between a MOCA communication system and a second communication system which is a UWB over wire communication system.

A still further object, feature, or advantage of the present invention is to provide for interfacing between a tZero Ultra-MIMO communication system and a second communication system which is a UWB over wire communication system.

A still further object, feature, or advantage of the present invention is to provide for interfacing between the HomePNA Standard and a second communication system which is a UWB over wire communication system.

A still further object, feature, or advantage of the present invention is to provide for interfacing between HomePlug Standard and a second communication system which is a UWB over wire communication system.

A still further object, feature, or advantage of the present invention is to provide for interfacing between a modem and a UWB over wire communication system. Examples of modems include, but are not limited to Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92).

A still further object, feature, or advantage of the present invention is to provide for interfacing between an Integrated Services Digital Network (ISDN) and a UWB over wire communication system. Examples of ISDN's include, but are not limited to 64 k ISDN and 128 k dual-channel ISDN.

A still further object, feature, or advantage of the present invention is to provide for interfacing between a computer interface and a UWB over wire communication system. Examples of computer interfaces include, but are not limited to Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair).

A still further object, feature, or advantage of the present invention is to provide for interfacing between a wireless communication system and a second communication system which is a UWB over wire communication system. Examples of wireless communications systems based on the following standards include, but are not limited to IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman).

A still further object, feature, or advantage of the present invention is to provide for interfacing between a mobile telephone interface and a UWB over wire communication system. Examples of mobile telephone interface devices include, but are not limited to GSM CSD, HSCSD, GPRS, UMTS, CDMA, and TDMA.

A still further object, feature, or advantage of the present invention is to provide for interfacing between a wide area network and a UWB over wire communication system. Examples of wide area networks include, but are not limited to DS0, Satellite Internet upstream, Satellite Internet downstream, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768

A still further object, feature, or advantage of the present invention is to provide for interfacing between a local area network and a UWB over wire communication system. Examples of local area networks include, but are not limited to LocalTalk, ARCNET, Token Ring, Ethernet (10base-X), Fast Ethernet (100base-X), FDDI, and Gigabit Ethernet (1000base-X).

A still further object, feature, or advantage of the present invention is to provide for interfacing between a network using VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco) and a UWB over wire communications system.

A still further object, feature, or advantage of the present invention is to provide for interfacing between a network using VoIP (Voice over IP) standard media protocols, such as, but not limited to, DVB Digital Video Broadcasting, H.261 Video stream for transport using the real-time transport, H.263 Bitstream in the Real-time Transport Protocol, RTCP RTP Control protocol, and RTP Real-Time Transport and a UWB over wire communications system.

A still further object, feature, or advantage of the present invention is to provide for interfacing between a network using VoIP (Voice over IP) H.323 suite of standard protocols, such as, but not limited to, H.225 Covers narrow-band visual telephone services, H.225 Annex G, H.225E, H.235 Security and authentication, H.323SET, H.245 Negotiates channel usage and capabilities, H.450.1 Series defines Supplementary Services for H.323, H.450.2 Call Transfer supplementary service for H.323, H.450.3 Call diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy Subscribers supplementary service, H.450.10 Call Offer supplementary service, H.450.11 Call Intrusion supplementary service, H.450.12 ANF-CMN supplementary service, RAS Manages registration, admission, status, T.38 IP-based fax service maps, T.125 Multipoint Communication Service Protocol (MCS) and a UWB over wire communications system.

A still further object, feature, or advantage of the present invention is to provide for interfacing between a network using VoIP (Voice over IP) SIP suite of standard protocols, such as, but not limited to, MIME (Multi-purpose Internet Mail Extension), SDP (Session Description Protocol), and SIP (Session Initiation Protocol) and a UWB over wire communications system.

A still further object, feature, or advantage of the present invention is to provide for the encapsulation of a MOCA communication system protocol over a UWB over wire communication system.

A still further object, feature, or advantage of the present invention is to provide for encapsulation between a tZero UltraMIMO communication system protocol and a second communication system which is a UWB over wire communication system.

A still further object, feature, or advantage of the present invention is to provide for the encapsulation of a HomePNA communication system protocol on a UWB over wire communication system.

A still further object, feature, or advantage of the present invention is to provide for the encapsulation of a HomePlug communication system protocol on a UWB over wire communication system.

A still further object, feature, or advantage of the present invention is to provide for the encapsulation of a modern standard protocol such as, but not limited to Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92) on a UWB over wire communication system.

A still further object, feature, or advantage of the present invention is to provide for the encapsulation of an Integrated Services Digital Network (ISDN) based communication system protocol, such as, but not limited to 64 k ISDN and 128 k dual-channel ISDN on a UWB over wire communication system.

A still further object, feature, or advantage of the present invention is to provide for the encapsulation of a computer interface protocol, such as, but not limited to Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair) on a UWB over wire communications system.

A still further object, feature, or advantage of the present invention is to provide for the encapsulation of a wireless communication based on standard protocols such as, but not limited to IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman) on a UWB over wire communications system.

A still further object, feature, or advantage of the present invention is to provide for the encapsulation of mobile telephone standards protocol, such as, but not limited to, GSM CSD, HSCSD, GPRS, and UMTS on a UWB over wire communications system.

A still further object, feature, or advantage of the present invention is to provide for the encapsulation of a wide area network based system protocol, such as but not limited to, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768 on a UWB over wire communications system.

A still further object, feature, or advantage of the present invention is to provide for the encapsulation of a local area network protocol such as, but not limited to, LocalTalk, ARCNET, Token Ring, Ethernet (10base-X), Fast Ethernet (100base-X), FDDI, and Gigabit Ethernet (1000base-X) on a UWB over wire communications system.

A still further object, feature, or advantage of the present invention is to provide for the encapsulation of VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco) on a UWB over wire communications system.

A still further object, feature, or advantage of the present invention is to provide for the encapsulation of VoIP (Voice over IP) standard media protocols, such as, but not limited to, DVB Digital Video Broadcasting, H.261 Video stream for transport using the real-time transport, H.263 Bitstream in the Real-time Transport Protocol, RTCP RTP Control protocol, and RTP Real-Time Transport on a UWB over wire communications system.

A still further object, feature, or advantage of the present invention is to provide for the encapsulation of VoIP (Voice over IP) H.323 suite of standard protocols, such as, but not limited to, H.225 Covers narrow-band visual telephone services, H.225 Annex G, H.225E, H.235 Security and authentication, H.323SET, H.245 Negotiates channel usage and capabilities, H.450.1 Series defines Supplementary Services for H.323, H.450.2 Call Transfer supplementary service for H.323, H.450.3 Call diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy Subscribers supplementary service, H.450.10 Call Offer supplementary service, H.450.11 Call Intrusion supplementary service, H.450.12 ANF-CMN supplementary service, RAS Manages registration, admission, status, T.38 IP-based fax service maps, T.125 Multipoint Communication Service Protocol (MCS) on a UWB over wire communications system.

A still further object, feature, or advantage of the present invention is to provide for the encapsulation of VoIP (Voice over IP) SIP suite of standard protocols, such as, but not limited to, MIME (Multi-purpose Internet Mail Extension), SDP (Session Description Protocol), and SIP (Session Initiation Protocol) on a UWB over wire communications system.

A still further object, feature, or advantage of the present invention is to provide for the encapsulation of a MOCA communication system over a UWB pulse or impulse on narrowband wireless communication system.

A still further object, feature, or advantage of the present invention is to provide for encapsulation between a tZero UltraMIMO communication system and a second communication system which is a UWB pulse or impulse on narrowband wireless communication system.

A still further object, feature, or advantage of the present invention is to provide for the encapsulation of a HomePNA communication system over a UWB pulse or impulse on narrowband wireless communication system.

A still further object, feature, or advantage of the present invention is to provide for the encapsulation of a HomePlug communication system over a UWB pulse or impulse on narrowband wireless communication system.

A still further object, feature, or advantage of the present invention is to provide for the encapsulation of a modern standard such as, but not limited to Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92) over a UWB pulse or impulse on narrowband wireless communication system.

A still further object, feature, or advantage of the present invention is to provide for the encapsulation of an Integrated Services Digital Network (ISDN) based communication system, such as, but not limited to 64 k ISDN and 128 k dual-channel ISDN over a UWB pulse or impulse on narrowband wireless communication system.

A still further object, feature, or advantage of the present invention is to provide for the encapsulation of a computer interface, such as, but not limited to Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair) over a UWB pulse or impulse on narrowband wireless communications system.

A still further object, feature, or advantage of the present invention is to provide for the encapsulation of a wireless communication based on standards such as, but not limited to IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman) over a UWB pulse or impulse on narrowband wireless communications system.

A still further object, feature, or advantage of the present invention is to provide for the encapsulation of mobile telephone interface, such as, but not limited to, GSM CSD, HSCSD, GPRS, and UMTS over a UWB pulse or impulse on narrowband wireless communications system.

A still further object, feature, or advantage of the present invention is to provide for the encapsulation of a wide area network based system, such as but not limited to, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768 over a UWB pulse or impulse on narrowband wireless communications system.

A still further object, feature, or advantage of the present invention is to provide for the encapsulation of a local area network technology such as, but not limited to, LocalTalk, ARCNET, Token Ring, Ethernet (10base-X), Fast Ethernet (100base-X), FDDI, and Gigabit Ethernet (1000base-X) over a UWB pulses or impulses on narrowband wireless communications system.

A still further object, feature, or advantage of the present invention is to provide for the encapsulation of VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco) over a UWB pulses or impulses on narrowband wireless communications system.

A still further object, feature, or advantage of the present invention is to provide for the encapsulation of VoIP (Voice over IP) standard media protocols, such as, but not limited to, DVB Digital Video Broadcasting, H.261 Video stream for transport using the real-time transport, H.263 Bitstream in the Real-time Transport Protocol, RTCP RTP Control protocol, and RTP Real-Time Transport over a UWB pulses or impulses on narrowband wireless communications system.

A still further object, feature, or advantage of the present invention is to provide for encapsulation of VoIP (Voice over IP) H.323 suite of standard protocols, such as, but not limited to, H.225 Covers narrow-band visual telephone services, H.225 Annex G, H.225E, H.235 Security and authentication, H.323SET, H.245 Negotiates channel usage and capabilities, H.450.1 Series defines Supplementary Services for H.323, H.450.2 Call Transfer supplementary service for H.323, H.450.3 Call diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy Subscribers supplementary service, H.450.10 Call Offer supplementary service, H.450.11 Call Intrusion supplementary service, H.450.12 ANF-CMN supplementary service, RAS Manages registration, admission, status, T.38 IP-based fax service maps, T.125 Multipoint Communication Service Protocol (MCS) over a UWB pulses or impulses on narrowband wireless communications system.

A still further object, feature, or advantage of the present invention is to provide for encapsulation of VoIP (Voice over IP) SIP suite of standard protocols, such as, but not limited to, MIME (Multi-purpose Internet Mail Extension), SDP (Session Description Protocol), and SIP (Session Initiation Protocol) over a UWB pulses or impulses on narrowband wireless communications system.

A still further object, feature, or advantage of the present invention is to provide for the encapsulation of a MOCA communication system over a variable pulse or impulse encoded fiber optic communication system.

A still further object, feature, or advantage of the present invention is to provide for encapsulation between a tZero UltraMIMO communication over a variable pulse or impulse encoded fiber optic communication system.

A still further object, feature, or advantage of the present invention is to provide for the encapsulation of a HomePNA communication system over a variable pulse or impulse encoded fiber optic communication system.

A still further object, feature, or advantage of the present invention is to provide for the encapsulation of a HomePlug communication system over a variable pulse or impulse encoded fiber optic communication system.

A still further object, feature, or advantage of the present invention is to provide for the encapsulation of a modem standard such as, but not limited to Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92) over a variable pulse or impulse encoded fiber optic communication system.

A still further object, feature, or advantage of the present invention is to provide for the encapsulation of an Integrated Services Digital Network (ISDN) based communication system, such as, but not limited to 64 k ISDN and 128 k dual-channel ISDN over a variable pulse or impulse encoded fiber optic communication system.

A still further object, feature, or advantage of the present invention is to provide for the encapsulation of a computer interface, such as, but not limited to Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair) over a variable pulse or impulse encoded fiber optic communication system.

A still further object, feature, or advantage of the present invention is to provide for the encapsulation of a wireless communication based on standards such as, but not limited to IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman) over a variable pulse or impulse encoded fiber optic communication system.

A still further object, feature, or advantage of the present invention is to provide for the encapsulation of mobile telephone interface, such as, but not limited to, GSM CSD, HSCSD, GPRS, and UMTS over a variable pulse or impulse encoded fiber optic communication system.

A still further object, feature, or advantage of the present invention is to provide for the encapsulation of a wide area network based system, such as but not limited to, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768 over a variable pulse or impulse encoded fiber optic communication system.

A still further object, feature, or advantage of the present invention is to provide for the encapsulation of a local area network such as, but not limited to, LocalTalk, ARCNET, Token Ring, Ethernet (10base-X), Fast Ethernet (100base-X), FDDI, and Gigabit Ethernet (1000base-X) over a variable pulse or impulse encoded fiber optic communication system.

A still further object, feature, or advantage of the present invention is to provide for the encapsulation of VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco) over a variable pulse or impulse encoded fiber optic communication system.

A still further object, feature, or advantage of the present invention is to provide for the encapsulation of VoIP (Voice over IP) standard media protocols, such as, but not limited to, DVB Digital Video Broadcasting, H.261 Video stream for transport using the real-time transport, H.263 Bitstream in the Real-time Transport Protocol, RTCP RTP Control protocol, and RTP Real-Time Transport over a variable pulse or impulse encoded fiber optic communication system.

A still further object, feature, or advantage of the present invention is to provide for encapsulation of VoIP (Voice over IP) H.323 suite of standard protocols, such as, but not limited to, H.225 Covers narrow-band visual telephone services, H.225 Annex G, H.225E, H.235 Security and authentication, H.323SET, H.245 Negotiates channel usage and capabilities, H.450.1 Series defines Supplementary Services for H.323, H.450.2 Call Transfer supplementary service for H.323, H.450.3 Call diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy Subscribers supplementary service, H.450.10 Call Offer supplementary service, H.450.11 Call Intrusion supplementary service, H.450.12 ANF-CMN supplementary service, RAS Manages registration, admission, status, T.38 IP-based fax service maps, T.125 Multipoint Communication Service Protocol (MCS) over a variable pulse or impulse encoded fiber optic communication system.

A still further object, feature, or advantage of the present invention is to provide for encapsulation of VoIP (Voice over IP) SIP suite of standard protocols, such as, but not limited to, MIME (Multi-purpose Internet Mail Extension), SDP (Session Description Protocol), and SIP (Session Initiation Protocol) over a variable pulse or impulse encoded fiber optic communication system.

A further object, feature, or advantage of the present invention is the use of more than one narrowband sub-carrier frequency to transmit data using ultra wideband pulses or impulses.

A still further object, feature, or advantage of the present invention is the grouping of multiple narrowband sub-carriers to transmit data onto one or more frequency band groups using ultra wideband pulses or impulses.

A further object, feature, or advantage of the present invention is the use of ultra wideband pulses or impulses with the characteristics necessary for the transmission of data at a high rate over a wireless medium.

A further object, feature, or advantage of the present invention is the ultra wideband pulses or impulses wireless transmission of data using orthogonal frequency division multiplexed symbols.

A further object, feature, or advantage of the present invention is the ultra wideband pulses or impulses wireless transmission of data using orthogonal frequency division multiplexed symbols of constant duration.

A further object, feature, or advantage of the present invention is the ultra wideband over wired medium transmission of data framed in packets with variable payloads.

A further object, feature, or advantage of the present invention is the use of ultra wideband pulses or impulses with the characteristics necessary for the transmission of data at a high rate over a hard-wired medium.

A further object, feature, or advantage, object, or advantage of the present invention is the use of variable pulses or impulses encoded fiber optical pulse or impulse networks in conjunction with ultra wideband pulses or impulses over wired transmission networks.

A further object, feature, or advantage, object, or advantage of the present invention is the use of variable pulses or impulses encoded fiber optical pulses or impulses networks in conjunction with ultra wideband pulses or impulses over narrowband wireless transmission networks.

A further object, feature, or advantage, object, or advantage of the present invention is the transmission of VoIP calls over ultra wideband pulses or impulses on wired transmission links or networks.

A further object, feature, or advantage, object, or advantage of the present invention is the transmission of VoIP calls over ultra wideband pulses or impulses on narrowband wireless transmission links or networks.

A further object, feature, or advantage, object, or advantage of the present invention is the encapsulation of VoIP calls over ultra wideband on wired transmission links or networks.

A further object, feature, or advantage, object, or advantage of the present invention is the encapsulation of VoIP calls over ultra wideband pulses or impulses on narrowband wireless transmission links or networks.

A further object, feature, or advantage, object, or advantage of the present invention is the transmission of VoIP calls over a variable pulse or impulse encoded fiber optic communication system.

A further object, feature, or advantage, object, or advantage of the present invention is the encapsulation of VoIP calls over a variable pulse or impulse encoded fiber optic communication system.

A further object, feature, or advantage of the present invention is a UWB pulse or impulse over wired medium interface device configured as one or more microprocessors.

A further object, feature, or advantage of the present invention is a UWB pulse or impulse over wired medium interface device configured as one or more ASICs.

A further object, feature, or advantage of the present invention is a UWB pulse or impulse over wired medium interface device configured as one or more structured ASICs.

A further object, feature, or advantage of the present invention is a UWB pulse or impulse over wired medium interface device configured as one or more FPGAs.

A further object, feature, or advantage of the present invention is a UWB pulse or impulse over wired medium interface device configured to operate in conjunction with a communication's switch.

A further object, feature, or advantage of the present invention is a UWB pulse or impulse over wired medium interface device configured to operate in conjunction with a communication's router.

A further object, feature, or advantage of the present invention is a UWB pulse or impulse over wired medium interface device configured to operate in conjunction with a communication's hub.

A further object, feature, or advantage of the present invention is a UWB pulse or impulse over wired medium interface device configured to operate in conjunction with a communication's repeater.

A further object, feature, or advantage of the present invention is a UWB pulse or impulse over wired medium interface device configured to operate in conjunction with a NIC card.

A further object, feature, or advantage of the present invention is a UWB pulse or impulse over wired medium interface device configured to operate in conjunction with an SDIO card.

A further object, feature, or advantage of the present invention is a UWB pulse or impulse over wired medium interface device configured to operate in conjunction with a PCMCIA card.

A further object, feature, or advantage of the present invention is a UWB pulse or impulse over wired medium interface device configured to operate in conjunction with a form factor such as, but not limited to, modems, PC boards, cell phones, set-top boxes, televisions, GPS receivers, ATM machines, landline phones, VoIP wireless phones, VoIP landline phones, DLC equipment, digital cameras, electrical outlets, interface devices that plug into electrical outlets, iPODs, Rios, etc., DVD players/recorders, on card/board communications, on back-plane communications, RFID readers, computer mouse, PDAs, computers, laptops, notebooks, eternal hard drives, CD burners, DVD burners, gaming equipment—X Box, Nintendo, etc., camcorders, copiers, fax machines, printers, cash registers, bar code readers, LCD projectors, PBXs, home networking devices, entertainment centers, PVRs, wireless/wire line switch (couplers), sensors, clocks, audio speakers, servers, power line jumpers (breaker box), DSLAMs, ISLAMs, amplifiers, monitors, video displays, RFID tags (non-UWB), RFID tags (UWB), smart cards, Cable TV head-end and field equipment, Cable TV CPE equipment, Broadband Power Line (BPL) head-end and field Equipment, BPL CPE equipment, in-building power line communication system controllers, databus controllers, etc.

A further object, feature, or advantage of the present invention is a UWB pulse or impulse over wireless medium interface device configured to operate in conjunction with a form factor such as, but not limited to, modems, PC boards, cell phones, set-top boxes, televisions, GPS receivers, ATM machines, landline phones, VoIP wireless phones, VoIP landline phones, DLC equipment, digital cameras, electrical outlets, interface devices that plug into electrical outlets, iPODs, Rios, etc., DVD players/recorders, on card/board communications, on back-plane communications, RFID readers, computer mouse, PDAs, computers, laptops, notebooks, eternal hard drives, CD burners, DVD burners, gaming equipment—X Box, Nintendo, etc., camcorders, copiers, fax machines, printers, cash registers, bar code readers, LCD projectors, PBXs, home networking devices, entertainment centers, PVRs, wireless/wire line switch (couplers), sensors, clocks, audio speakers, servers, power line jumpers (breaker box), DSLAMs, ISLAMs, amplifiers, monitors, video displays, RFID tags (non-UWB), RFID tags (UWB), smart cards, Cable TV head-end and field equipment, Cable TV CPE equipment, Broadband Power Line (BPL) head-end and field Equipment, BPL CPE equipment, in-building power line communication system controllers, databus controllers, etc.

A further object, feature, or advantage of the present invention is a variable pulse or impulse encoded fiber optic communication system interface device configured to operate in conjunction with a form factor such as, but not limited to, modems, PC boards, cell phones, set-top boxes, televisions, GPS receivers, ATM machines, landline phones, VoIP wireless phones, VoIP landline phones, DLC equipment, digital cameras, electrical outlets, interface devices that plug into electrical outlets, iPODs, Rios, etc., DVD players/recorders, on card/board communications, on back-plane communications, RFID readers, computer mouse, PDAs, computers, laptops, notebooks, eternal hard drives, CD burners, DVD burners, gaming equipment—X Box, Nintendo, etc., camcorders, copiers, fax machines, printers, cash registers, bar code readers, LCD projectors, PBXs, home networking devices, entertainment centers, PVRs, wireless/wire line switch (couplers), sensors, clocks, audio speakers, servers, power line jumpers (breaker box), DSLAMs, ISLAMs, amplifiers, monitors, video displays, RFID tags (non-UWB), RFID tags (UWB), smart cards, Cable TV head-end and field equipment, Cable TV CPE equipment, Broadband Power Line (BPL) head-end and field Equipment, BPL CPE equipment, in-building power line communication system controllers, databus controllers, etc.

A further object, feature, or advantage of the present invention is it is compatible with the Flex Band Plan.

A further object, feature, or advantage of the present invention is it is compatible with Plan 997 (for symmetric operations).

A further object, feature, or advantage of the present invention is it is compatible with Plan 998 (for asymmetric operations).

A still further object, feature, or advantage of the present invention is to provide for encapsulation of physical protocols, such as, but not limited to, LDVS (Low Voltage Differential Signaling), LVTTL (Low Voltage Transistor-Transistor Logic), LVCMOS (Low Voltage Complementary Metal Oxide Semiconductor), LVPECL (Low Voltage Positive Emitter Coupled Logic), PECL (Positive Emitter Coupled Logic), ECL (Emitter Coupled Logic), CML (Current Mode Logic), CMOS (Complementary metal-oxide-semiconductor), TTL (Transistor-Transistor Logic), GTL (Gunning Transceiver Logic), GTLP (Gunning Transceiver Logic Plus), HSTL (High-Speed Transceiver Logic), SSTL (Stub Series Terminated Logic), etc, over a UWB pulse or impulse over narrowband wireless communication system.

A still further object, feature, or advantage of the present invention is to provide for encapsulation of physical protocols, such as, but not limited to, LDVS (Low Voltage Differential Signaling), LVTTL (Low Voltage Transistor-Transistor Logic), LVCMOS (Low Voltage Complementary Metal Oxide Semiconductor), LVPECL (Low Voltage Positive Emitter Coupled Logic), PECL (Positive Emitter Coupled Logic), ECL (Emitter Coupled Logic), CML (Current Mode Logic), CMOS (Complementary metal-oxide-semiconductor), TTL (Transistor-Transistor Logic), GTL (Gunning Transceiver Logic), GTLP (Gunning Transceiver Logic Plus), HSTL (High-Speed Transceiver Logic), SSTL (Stub Series Terminated Logic), etc, over a UWB pulse or impulse over wire communications system.

A still further object, feature, or advantage of the present invention is to provide for encapsulation of physical protocols, such as, but not limited to, LDVS (Low Voltage Differential Signaling), LVTTL (Low Voltage Transistor-Transistor Logic), LVCMOS (Low Voltage Complementary Metal Oxide Semiconductor), LVPECL (Low Voltage Positive Emitter Coupled Logic), PECL (Positive Emitter Coupled Logic), ECL (Emitter Coupled Logic), CML (Current Mode Logic), CMOS (Complementary metal-oxide-semiconductor), TTL (Transistor-Transistor Logic), GTL (Gunning Transceiver Logic), GTLP (Gunning Transceiver Logic Plus), HSTL (High-Speed Transceiver Logic), SSTL (Stub Series Terminated Logic), etc, over a variable pulse or impulse encoded fiber optic communication system.

A still further object, feature, or advantage of the present invention is to provide for the interface of physical protocols, such as, but not limited to, LDVS (Low Voltage Differential Signaling), LVTTL (Low Voltage Transistor-Transistor Logic), LVCMOS (Low Voltage Complementary Metal Oxide Semiconductor), LVPECL (Low Voltage Positive Emitter Coupled Logic), PECL (Positive Emitter Coupled Logic), ECL (Emitter Coupled Logic), CML (Current Mode Logic), CMOS (Complementary metal-oxide-semiconductor), TTL (Transistor-Transistor Logic), GTL (Gunning Transceiver Logic), GTLP (Gunning Transceiver Logic Plus), HSTL (High-Speed Transceiver Logic), SSTL (Stub Series Terminated Logic), etc, with a UWB pulse or impulse over narrowband wireless communication system.

A still further object, feature, or advantage of the present invention is to provide for the interface of physical protocols, such as, but not limited to, LDVS (Low Voltage Differential Signaling), LVTTL (Low Voltage Transistor-Transistor Logic), LVCMOS (Low Voltage Complementary Metal Oxide Semiconductor), LVPECL (Low Voltage Positive Emitter Coupled Logic), PECL (Positive Emitter Coupled Logic), ECL (Emitter Coupled Logic), CML (Current Mode Logic), CMOS (Complementary metal-oxide-semiconductor), TTL (Transistor-Transistor Logic), GTL (Gunning Transceiver Logic), GTLP (Gunning Transceiver Logic Plus), HSTL (High-Speed Transceiver Logic), SSTL (Stub Series Terminated Logic), etc, with a UWB pulse or impulse over wire communications system.

A still further object, feature, or advantage of the present invention is to provide for the interface of physical protocols, such as, but not limited to, LDVS (Low Voltage Differential Signaling), LVTTL (Low Voltage Transistor-Transistor Logic), LVCMOS (Low Voltage Complementary Metal Oxide Semiconductor), LVPECL (Low Voltage Positive Emitter Coupled Logic), PECL (Positive Emitter Coupled Logic), ECL (Emitter Coupled Logic), CML (Current Mode Logic), CMOS (Complementary metal-oxide-semiconductor), TTL (Transistor-Transistor Logic), GTL (Gunning Transceiver Logic), GTLP (Gunning Transceiver Logic Plus), HSTL (High-Speed Transceiver Logic), SSTL (Stub Series Terminated Logic), etc, with a variable pulse or impulse encoded fiber optic communication system.

A still further object, feature, or advantage of the present invention is to provide for encapsulation of memory chip access protocols such as, but not limited to SDR (Software Defined Radio), DDR (Double Data Rate), QDR (Quad Data Rate), etc, on a UWB over narrowband wireless communication system.

A still further object, feature, or advantage of the present invention is to provide for encapsulation of memory chip access protocols such as, but not limited to SDR (Software Defined Radio), DDR (Double Data Rate), QDR (Quad Data Rate), etc, on a UWB over wire communications system.

A still further object, feature, or advantage of the present invention is to provide for encapsulation of memory chip access protocols such as, but not limited to SDR (Software Defined Radio), DDR (Double Data Rate), QDR (Quad Data Rate), etc, over a variable pulse or impulse encoded fiber optic communication system.

A still further object, feature, or advantage of the present invention is to provide for the interface of memory chip access protocols such as, but not limited to SDR (Software Defined Radio), DDR (Double Data Rate), QDR (Quad Data Rate), etc, with a UWB over narrowband wireless communication system.

A still further object, feature, or advantage of the present invention is to provide for the interface of memory chip access protocols such as, but not limited to SDR (Software Defined Radio), DDR (Double Data Rate), QDR (Quad Data Rate), etc, with a UWB over wire communications system.

A still further object, feature, or advantage of the present invention is to provide for the interface of memory chip access protocols such as, but not limited to SDR (Software Defined Radio), DDR (Double Data Rate), QDR (Quad Data Rate), etc, with a variable pulse or impulse encoded fiber optic communication system.

A still further object, feature, or advantage of the present invention is to provide for encapsulation of RS protocols such as, but not limited to RS 232, RS-422-B, RS-423-B, RS-449, RS-485, RS-530, RS 561, RS-562, RS-612, RS-613, etc, over a UWB over narrowband wireless communication system.

A still further object, feature, or advantage of the present invention is to provide for encapsulation of RS protocols such as, but not limited to RS 232, RS-422-B, RS-423-B, RS-449, RS-485, RS-530, RS 561, RS-562, RS-612, RS-613, etc, on a UWB pulse or impulse over wire communications system.

A still further object, feature, or advantage of the present invention is to provide for the interface of RS protocols such as, but not limited to RS 232, RS-422-B, RS-423-B, RS-449, RS-485, RS-530, RS 561, RS-562, RS-612, RS-613, etc, over a variable pulse or impulse encoded fiber optic communication system. A still further object, feature, or advantage of the present invention is to provide for encapsulation of RS protocols such as, but not limited to RS 232, RS-422-B, RS-423-B, RS-449, RS-485, RS-530, RS 561, RS-562, RS-612, RS-613, etc, with a UWB over narrowband wireless communication system.

A still further object, feature, or advantage of the present invention is to provide for the interface of RS protocols such as, but not limited to RS 232, RS-422-B, RS-423-B, RS-449, RS-485, RS-530, RS 561, RS-562, RS-612, RS-613, etc, with a UWB pulse or impulse over wire communications system.

A still further object, feature, or advantage of the present invention is to provide for the interface of RS protocols such as, but not limited to RS 232, RS-422-B, RS-423-B, RS-449, RS-485, RS-530, RS 561, RS-562, RS-612, RS-613, etc, with a variable pulse or impulse encoded fiber optic communication system.

A still further object, feature, or advantage of the present invention is to provide for encapsulation of V-standards protocols such as, but not limited to V.10, V.11, V.24, V.28, V.35, etc, over a UWB over narrowband wireless communication system.

A still further object, feature, or advantage of the present invention is to provide for encapsulation of V-standards protocols such as, but not limited to V.10, V.11, V.24, V.28, V.35, etc, on a UWB over wire communications system.

A still further object, feature, or advantage of the present invention is to provide for encapsulation of V-standards protocols such as, but not limited to V.10, V.11, V.24, V.28, V.35, etc, over a variable pulse or impulse encoded fiber optic communication system.

A still further object, feature, or advantage of the present invention is to provide for the interface of V-standards protocols such as, but not limited to V.10, V.11, V.24, V.28, V.35, etc, with a UWB over narrowband wireless communication system.

A still further object, feature, or advantage of the present invention is to provide for the interface of V-standards protocols such as, but not limited to V.10, V.11, V.24, V.28, V.35, etc, with a UWB over wire communications system.

A still further object, feature, or advantage of the present invention is to provide for the interface of V-standards protocols such as, but not limited to V.10, V.11, V.24, V.28, V.35, etc, with a variable pulse or impulse encoded fiber optic communication system.

A still further object, feature, or advantage of the present invention is to provide for encapsulation of Ethernet (MAC-PHY) protocols such as, but not limited to XGMII (10 Gigabit Media Independent Interface), RGMII (Reduced Gigabit Media Independent Interface), SGMII (Serial Gigabit Media Independent Interface), GMII (Gigabit Media Independent Interface), MII (Media Independent Interface), TBI (Ten Bit Interface), RTBI (Reduced Ten Bit Interface), AUI (Attachment Unit Interface), XAUI (10 Gigabit Attachment Unit Interface), etc, over a UWB over narrowband wireless communication system.

A still further object, feature, or advantage of the present invention is to provide for encapsulation of Ethernet (MAC-PHY) protocols such as, but not limited to XGMII (10 Gigabit Media Impendent Interface), RGMII (Reduced Gigabit Media Independent Interface), SGMII (Serial Gigabit Media Independent Interface), GMII (Gigabit Media Independent Interface), MII (Media Independent Interface), TBI (Ten Bit Interface), RTBI (Reduced Ten Bit Interface), AUI (Attachment Unit Interface), XAUI (10 Gigabit Attachment Unit Interface), etc, over a UWB over wire communications system.

A still further object, feature, or advantage of the present invention is to provide for encapsulation of Ethernet (MAC-PHY) protocols such as, but not limited to XGMII (10 Gigabit Media Impendent Interface), RGMII (Reduced Gigabit Media Independent Interface), SGMII (Serial Gigabit Media Independent Interface), GMII (Gigabit Media Independent Interface), MII (Media Independent Interface), TBI (Ten Bit Interface), RTBI (Reduced Ten Bit Interface), AUI (Attachment Unit Interface), XAUI (10 Gigabit Attachment Unit Interface), etc, over a variable pulse or impulse encoded fiber optic communication system.

A still further object, feature, or advantage of the present invention is to provide for the interface of Ethernet (MAC-PHY) protocols such as, but not limited to XGMII (10 Gigabit Media Impendent Interface), RGMII (Reduced Gigabit Media Independent Interface), SGMII (Serial Gigabit Media Independent Interface), GMII (Gigabit Media Independent Interface), MII (Media Independent Interface), TBI (Ten Bit Interface), RTBI (Reduced Ten Bit Interface), AUI (Attachment Unit Interface), XAUI (10 Gigabit Attachment Unit Interface), etc, with a UWB over narrowband wireless communication system.

A still further object, feature, or advantage of the present invention is to provide for the interface of Ethernet (MAC-PHY) protocols such as, but not limited to XGMII (10 Gigabit Media Impendent Interface), RGMII (Reduced Gigabit Media Independent Interface), SGMII (Serial Gigabit Media Independent Interface), GMII (Gigabit Media Independent Interface), MII (Media Independent Interface), TBI (Ten Bit Interface), RTBI (Reduced Ten Bit Interface), AUI (Attachment Unit Interface), XAUI (10 Gigabit Attachment Unit Interface), etc, with a UWB over wire communications system.

A still further object, feature, or advantage of the present invention is to provide for the interface of Ethernet (MAC-PHY) protocols such as, but not limited to XGMII (10 Gigabit Media Impendent Interface), RGMII (Reduced Gigabit Media Independent Interface), SGMII (Serial Gigabit Media Independent Interface), GMII (Gigabit Media Independent Interface), MII (Media Independent Interface), TBI (Ten Bit Interface), RTBI (Reduced Ten Bit Interface), AUI (Attachment Unit Interface), XAUI (10 Gigabit Attachment Unit Interface), etc, with a variable pulse or impulse encoded fiber optic communication system.

A still further object, feature, or advantage of the present invention is to provide for encapsulation of PCB Level Control protocols such as, but not limited to SPI (Serial Peripheral Interface Bus), I²C (Inter-Integrated Circuit), MDIO (Management Data Input/Output Bus), JTAG (Joint Test Action Group), over a UWB over narrowband wireless communication system.

A still further object, feature, or advantage of the present invention is to provide for encapsulation of PCB Level Control protocols such as, but not limited to SPI (Serial Peripheral Interface Bus), I²C (Inter-Integrated Circuit), MDIO (Management Data Input/Output Bus), JTAG (Joint Test Action Group), etc. on a UWB over wire communications system.

A still further object, feature, or advantage of the present invention is to provide for encapsulation of PCB Level Control protocols such as, but not limited to SPI (Serial Peripheral Interface Bus), I²C (Inter-Integrated Circuit), MDIO (Management Data Input/Output Bus), JTAG (Joint Test Action Group), over a variable pulse or impulse encoded fiber optic communication system.

A still further object, feature, or advantage of the present invention is to provide for the interface of PCB Level Control protocols such as, but not limited to SPI (Serial Peripheral Interface Bus), I²C (Inter-Integrated Circuit), MDIO (Management Data Input/Output Bus), JTAG (Joint Test Action Group) with a UWB over narrowband wireless communication system.

A still further object, feature, or advantage of the present invention is to provide for the interface of PCB Level Control protocols such as, but not limited to SPI (Serial Peripheral Interface Bus), I²C (Inter-Integrated Circuit), MDIO (Management Data Input/Output Bus), JTAG (Joint Test Action Group), etc. on a UWB over wire communications system.

A still further object, feature, or advantage of the present invention is to provide for the interface of PCB Level Control protocols such as, but not limited to SPI (Serial Peripheral Interface Bus), I²C (Inter-Integrated Circuit), MDIO (Management Data Input/Output Bus), JTAG (Joint Test Action Group) with a variable pulse or impulse encoded fiber optic communication system.

A still further object, feature, or advantage of the present invention is to provide for encapsulation of fiber optic protocols such as, but not limited to SDH (Synchronous Digital Hierarchy) standard developed by the International Telecommunication Union (ITU) documented in standard G.707 and its extension G.708, which can be used to encapsulate earlier digital transmission standards, such as the PDH (Plesiochronous Digital Hierarchy) standard, or used directly to support either ATM or Packet over SONET/SDH over a UWB over narrowband wireless communication system.

A still further object, feature, or advantage of the present invention is to provide for encapsulation of fiber optic protocols such as, but not limited to SDH (Synchronous Digital Hierarchy) standard developed by the International Telecommunication Union (ITU) documented in standard G.707 and its extension G.708, which can be used to encapsulate earlier digital transmission standards, such as the PDH (Plesiochronous Digital Hierarchy) standard, or used directly to support either ATM or Packet over SONET/SDH over a UWB over wire communications system.

A still further object, feature, or advantage of the present invention is to provide for encapsulation of fiber optic protocols such as, but not limited to SDH (Synchronous Digital Hierarchy) standard developed by the International Telecommunication Union (ITU) documented in standard G.707 and its extension G.708, which can be used to encapsulate earlier digital transmission standards, such as the PDH (Plesiochronous Digital Hierarchy) standard, or used directly to support either ATM or Packet over SONET/SDH over a variable pulse or impulse encoded fiber optic communication system.

A still further object, feature, or advantage of the present invention is to provide for the interface of fiber optic protocols such as, but not limited to SDH (Synchronous Digital Hierarchy) standard developed by the International Telecommunication Union (ITU) documented in standard G.707 and its extension G.708, which can be used to encapsulate earlier digital transmission standards, such as the PDH (Plesiochronous Digital Hierarchy) standard, or used directly to support either ATM or Packet over SONET/SDH with a UWB over narrowband wireless communication system.

A still further object, feature, or advantage of the present invention is to provide for the interface of fiber optic protocols such as, but not limited to SDH (Synchronous Digital Hierarchy) standard developed by the International Telecommunication Union (ITU) documented in standard G.707 and its extension G.708, which can be used to encapsulate earlier digital transmission standards, such as the PDH (Plesiochronous Digital Hierarchy) standard, or used directly to support either ATM or Packet over SONET/SDH with a UWB over wire communications system.

A still further object, feature, or advantage of the present invention is to provide for the interface of fiber optic protocols such as, but not limited to SDH (Synchronous Digital Hierarchy) standard developed by the International Telecommunication Union (ITU) documented in standard G.707 and its extension G.708, which can be used to encapsulate earlier digital transmission standards, such as the PDH (Plesiochronous Digital Hierarchy) standard, or used directly to support either ATM or Packet over SONET/SDH with a variable pulse or impulse encoded fiber optic communication system.

A still further object, feature, or advantage of the present invention is to provide for encapsulation of backplane protocols such as, but not limited to VMEbus is a computer bus standard, originally developed for the Motorola 68000 line of CPUs, but later widely used for many applications and standardized by the IEC as ANSI/IEEE 1014-1987, ATCA (Advanced Telecommunications Computing Architecture) the official specification designation is PICMG 3.x. over a UWB over narrowband wireless communication system.

A still further object, feature, or advantage of the present invention is to provide for encapsulation of backplane protocols such as, but not limited to VMEbus is a computer bus standard, originally developed for the Motorola 68000 line of CPUs, but later widely used for many applications and standardized by the IEC as ANSI/IEEE 1014-1987, ATCA (Advanced Telecommunications Computing Architecture) the official specification designation is PICMG 3.x. on a UWB over wire communications system.

A still further object, feature, or advantage of the present invention is to provide for encapsulation of backplane protocols such as, but not limited to VMEbus is a computer bus standard, originally developed for the Motorola 68000 line of CPUs, but later widely used for many applications and standardized by the IEC as ANSI/IEEE 1014-1987, ATCA (Advanced Telecommunications Computing Architecture) the official specification designation is PICMG 3.x. over a variable pulse or impulse encoded fiber optic communication system.

A still further object, feature, or advantage of the present invention is to provide for the interface of backplane protocols such as, but not limited to VMEbus is a computer bus standard, originally developed for the Motorola 68000 line of CPUs, but later widely used for many applications and standardized by the IEC as ANSI/IEEE 1014-1987, ATCA (Advanced Telecommunications Computing Architecture) the official specification designation is PICMG 3.x. with a UWB over narrowband wireless communication system.

A still further object, feature, or advantage of the present invention is to provide for the interface of backplane protocols such as, but not limited to VMEbus is a computer bus standard, originally developed for the Motorola 68000 line of CPUs, but later widely used for many applications and standardized by the IEC as ANSI/IEEE 1014-1987, ATCA (Advanced Telecommunications Computing Architecture) the official specification designation is PICMG 3.x. with a UWB over wire communications system.

A still further object, feature, or advantage of the present invention is to provide for the interface of backplane protocols such as, but not limited to VMEbus is a computer bus standard, originally developed for the Motorola 68000 line of CPUs, but later widely used for many applications and standardized by the IEC as ANSI/IEEE 1014-1987, ATCA (Advanced Telecommunications Computing Architecture) the official specification designation is PICMG 3.x. with a variable pulse or impulse encoded fiber optic communication system.

A still further object, feature, or advantage of the present invention is to provide for encapsulation of microprocessor protocols such as, but not limited to PC104 which is an embedded computer standard controlled by the PC/104 Consortium which defines both a form factor and computer bus, SBus is a computer bus system that was used in most SPARC-based computers from Sun Microsystems and others during the 1990s over a UWB over narrowband wireless communication system.

A still further object, feature, or advantage of the present invention is to provide for encapsulation of microprocessor protocols such as, but not limited to PC104 which is an embedded computer standard controlled by the PC/104 Consortium which defines both a form factor and computer bus, SBus is a computer bus system that was used in most SPARC-based computers from Sun Microsystems and others during the 1990s on a UWB over wire communications system.

A still further object, feature, or advantage of the present invention is to provide for encapsulation of microprocessor protocols such as, but not limited to PC104 which is an embedded computer standard controlled by the PC/104 Consortium which defines both a form factor and computer bus, SBus is a computer bus system that was used in most SPARC-based computers from Sun Microsystems and others during the 1990s over a variable pulse or impulse encoded fiber optic communication system.

A still further object, feature, or advantage of the present invention is to provide for the interface of microprocessor protocols such as, but not limited to PC104 which is an embedded computer standard controlled by the PC/104 Consortium which defines both a form factor and computer bus, SBus is a computer bus system that was used in most SPARC-based computers from Sun Microsystems and others during the 1990s with a UWB over narrowband wireless communication system.

A still further object, feature, or advantage of the present invention is to provide for the interface of microprocessor protocols such as, but not limited to PC104 which is an embedded computer standard controlled by the PC/104 Consortium which defines both a form factor and computer bus, SBus is a computer bus system that was used in most SPARC-based computers from Sun Microsystems and others during the 1990s with a UWB over wire communications system.

A still further object, feature, or advantage of the present invention is to provide for interface of microprocessor protocols such as, but not limited to PC 104 which is an embedded computer standard controlled by the PC/104 Consortium which defines both a form factor and computer bus, SBus is a computer bus system that was used in most SPARC-based computers from Sun Microsystems and others during the 1990s with a variable pulse or impulse encoded fiber optic communication system.

A still further object, feature, or advantage of the present invention is to provide for encapsulation of other protocols such as, but not limited to GFP (Generic Framing Procedure) which is defined by ITU-T G.7041. This allows mapping of variable length, higher-layer client signals over a transport network like SDH/SONET. The client signals can be protocol data unit (PDU) oriented (like IP/PPP or Ethernet Media Access Control) or can be block-code oriented (like fiber channel), over a UWB over narrowband wireless communication system.

A still further object, feature, or advantage of the present invention is to provide for encapsulation of other protocols such as, but not limited to GFP (Generic Framing Procedure) which is defined by ITU-T G.7041. This allows mapping of variable length, higher-layer client signals over a transport network like SDH/SONET. The client signals can be protocol data unit (PDU) oriented (like IP/PPP or Ethernet Media Access Control) or can be block-code oriented (like fiber channel), on a UWB over wire communications system.

A still further object, feature, or advantage of the present invention is to provide for encapsulation of other protocols such as, but not limited to GFP (Generic Framing Procedure) which is defined by ITU-T G.7041. This allows mapping of variable length, higher-layer client signals over a transport network like SDH/SONET. The client signals can be protocol data unit (PDU) oriented (like IP/PPP or Ethernet Media Access Control) or can be block-code oriented (like fiber channel), over a variable pulse or impulse encoded fiber optic communication system.

A still further object, feature, or advantage of the present invention is to provide for the interface of other protocols such as, but not limited to GFP (Generic Framing Procedure) which is defined by ITU-T G.7041. This allows mapping of variable length, higher-layer client signals over a transport network like SDH/SONET. The client signals can be protocol data unit (PDU) oriented (like IP/PPP or Ethernet Media Access Control) or can be block-code oriented (like fiber channel) over a second system or device which is operating a UWB over narrowband wireless communication system.

A still further object, feature, or advantage of the present invention is to provide for the interface of other protocols such as, but not limited to GFP (Generic Framing Procedure) which is defined by ITU-T G.7041. This allows mapping of variable length, higher-layer client signals over a transport network like SDH/SONET. The client signals can be protocol data unit (PDU) oriented (like IP/PPP or Ethernet Media Access Control) or can be block-code oriented (like fiber channel) over a second system or device which is operating a UWB over wire communications system.

A still further object, feature, or advantage of the present invention is to provide for the interface of other protocols such as, but not limited to GFP (Generic Framing Procedure) which is defined by ITU-T G.7041. This allows mapping of variable length, higher-layer client signals over a transport network like SDH/SONET. The client signals can be protocol data unit (PDU) oriented (like IP/PPP or Ethernet Media Access Control) or can be block-code oriented (like fiber channel) over a second system or device which is operating a variable pulse or impulse encoded fiber optic communication system.

A still further object, feature, or advantage of the present invention is to provide for encapsulation of other protocols such as, but not limited to Motorola's RapidIO, which is a high speed serial, high-performance, packet-switched, interconnect technology, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), Xilinx PowerPC microprocessor busses including, but not limited to, On-chip Peripheral Bus (OPB), Processor Local Bus (PLB), Device Control Register (DCR) bus, Altera Nios II microprocessor bus including, but not limited to, Avalon Interface, and Latice Micro32 open IP microprocessor core bus including, but not limited to, Wishbone which is his is a common open IP core interface over a UWB over narrowband wireless communication system.

A still further object, feature, or advantage of the present invention is to provide for encapsulation of other protocols such as, but not limited to Motorola's RapidIO, which is a high speed serial, high-performance, packet-switched, interconnect technology, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), Xilinx PowerPC microprocessor busses including, but not limited to, On-chip Peripheral Bus (OPB), Processor Local Bus (PLB), Device Control Register (DCR) bus, Altera Nios II microprocessor bus including, but not limited to, Avalon Interface, and Latice Micro32 open IP microprocessor core bus including, but not limited to, Wishbone which is a common open IP core interface on a UWB over wire communications system.

A still further object, feature, or advantage of the present invention is to provide for encapsulation of other protocols such as, but not limited to Motorola's RapidIO, which is a high speed serial, high-performance, packet-switched, interconnect technology, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), Xilinx PowerPC microprocessor busses including, but not limited to, On-chip Peripheral Bus (OPB), Processor Local Bus (PLB), Device Control Register (DCR) bus, Altera Nios II microprocessor bus including, but not limited to, Avalon Interface, and Latice Micro32 open IP microprocessor core bus including, but not limited to, Wishbone which is a common open IP core interface over a variable pulse or impulse encoded fiber optic communication system.

A still further object, feature, or advantage of the present invention is to provide for the interface of other protocols such as, but not limited to Motorola's RapidIO, which is a high speed serial, high-performance, packet-switched, interconnect technology, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), Xilinx PowerPC microprocessor busses including, but not limited to, On-chip Peripheral Bus (OPB), Processor Local Bus (PLB), Device Control Register (DCR) bus, Altera Nios II microprocessor bus including, but not limited to, Avalon Interface, and Latice Micro32 open IP microprocessor core bus including, but not limited to, Wishbone which is his is a common open IP core interface over a second system or device which is operating a UWB over narrowband wireless communication system.

A still further object, feature, or advantage of the present invention is to provide for the interface of other protocols such as, but not limited to Motorola's RapidIO, which is a high speed serial, high-performance, packet-switched, interconnect technology, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), Xilinx PowerPC microprocessor busses including, but not limited to, On-chip Peripheral Bus (OPB), Processor Local Bus (PLB), Device Control Register (DCR) bus, Altera Nios II microprocessor bus including, but not limited to, Avalon Interface, and Latice Micro32 open IP microprocessor core bus including, but not limited to, Wishbone which is his is a common open IP core interface over a second system or device which is operating a UWB over wire communications system.

A still further object, feature, or advantage of the present invention is to provide for the interface of other protocols such as, but not limited to Motorola's RapidIO, which is a high speed serial, high-performance, packet-switched, interconnect technology, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), Xilinx PowerPC microprocessor busses including, but not limited to, On-chip Peripheral Bus (OPB), Processor Local Bus (PLB), Device Control Register (DCR) bus, Altera Nios II microprocessor bus including, but not limited to, Avalon Interface, and Latice Micro32 open IP microprocessor core bus including, but not limited to, Wishbone which is his is a common open IP core interface over a second system or device which is operating a variable pulse or impulse encoded fiber optic communication system.

A general feature of the present invention is the provision of a system, method and apparatus for increasing the bandwidth of wireless and hard-wired mediums, which overcomes the problems found in the prior art.

A further feature of the present invention is the grouping of multiple sub-carriers to transmit data via a hard-wired medium into one or more frequency band groups.

A further feature of the present invention is the use of ultra wideband pulses or impulses with the characteristics necessary for the transmission of data at a high rate over a hard-wired medium Yet another object, feature, or advantage of the present invention is to provide a UWB system that is adapted for multiple access, supporting multiple users, multiple devices, or combinations of multiple users and multiple devices.

A further object, feature, or advantage of the present invention is to provide for a multi-band UWB communication system.

A still further object, feature, or advantage of the present invention is to provide for interfacing between a first UWB communication system and a second communication system which may also be a UWB communication system.

A still further object, feature, or advantage of the present invention is to provide for interfacing between a first UWB communication system and a second communication system which may be a non-UWB communication system.

A still further object, feature, or advantage of the present invention is to provide transceiver, or transmitter, or receiver capability via a stand-alone telecommunication device to and from devices including, but not limited to, modems, PC boards, cell phones, and set-top boxes. Televisions, GPS receivers, ATM Machines, landline phones, VoIP mobile phones, VoIP phones, DLC equipment, digital cameras, electrical outlets, DVD players, DVD records, RFID readers, RFID tags (UWB), RFID tags (non-UWB), computer mice, PDAs, computers, notebook computers, laptop computers, external hard drives, CD burners, DVD burners, gaming equipment, personal computers, desktop computer, laptop computers, notebook computers, external hard drives, CD Burners, DVD Burners, gaming equipment, camcorders, copiers, fax machines, scanners, printers, cash registers, bar code readers, LCD projectors, PBXs, mobile PBXs, home networking devices, entertainment center components, PVRs, wireless and wire line switches and couplers, clocks, audio speakers, servers, power line jumpers, DSLAMs, monitors, video displays, smart card equipment, cable TV (CATV) head end and field equipment, broadband power line (BPL) head end and field equipment, databus controllers, and external computer buses.

A still further object, feature, or advantage of the present invention is to provide transceiver, or transmitter, or receiver capability via an integrated telecommunication device to and from deices including, but not limited to, modems, PC boards, cell phones, set-top boxes, televisions, GPS receivers, ATM machines, landline phones, VoIP wireless phones, VoIP landline phones, DLC equipment, digital cameras, electrical outlets, interface devices that plug into electrical outlets, iPODs, Rios, etc., DVD players/recorders, on card/board communications, on back-plane communications, RFID readers, computer mouse, PDAs, computers, laptops, notebooks, eternal hard drives, CD burners, DVD burners, gaming equipment—X Box, Nintendo, etc., camcorders, copiers, fax machines, printers, cash registers, bar code readers, LCD projectors, PBXs, home networking devices, entertainment centers, PVRs, wireless/wire line switch (couplers), sensors, clocks, audio speakers, servers, power line jumpers (breaker box), DSLAMs, ISLAMs, amplifiers, monitors, video displays, RFID tags (non-UWB), RFID tags (UWB), smart cards, Cable TV head-end and field equipment, Cable TV CPE equipment, Broadband Power Line (BPL) head-end and field Equipment, BPL CPE equipment, in-building power line communication system controllers, databus controllers, etc.

A still further object, feature, or advantage of the present invention is to provide an interface to the telecommunication systems outlined in Verizon FIOS, AT&T U-verse, and BAXL Merlot.

A still further object, feature, or advantage of the present invention is to estimate the channel and balance the spectrum of DSL running on the same hard-wired medium as the present invention using the efficient John Papandriopoulos' method for dynamic spectrum management, by power spectrum balancing, using algorithms called SCALE and SCAWF.

A still further object, feature, or advantage of the present invention is to estimate the channel and balance the spectrum for MegaBand/Multi-MegaBand using the efficient John Papandriopoulos' method for dynamic spectrum management, by power spectrum balancing, using algorithms called SCALE and SCAWF.

A still further object, feature, or advantage of the present invention is the implantation of a multi-channel embodiment implemented using combination "Fast Fourier Transforms and Inverse Fast Fourier Transforms" on both the transmit and receive side which is implemented using Digital Signal Processing (DSP).

One or more of these and/or other objects, features, or advantages of the present invention will become apparent from the specification and claims that follow.

SUMMARY OF THE INVENTION

Figure 1A:
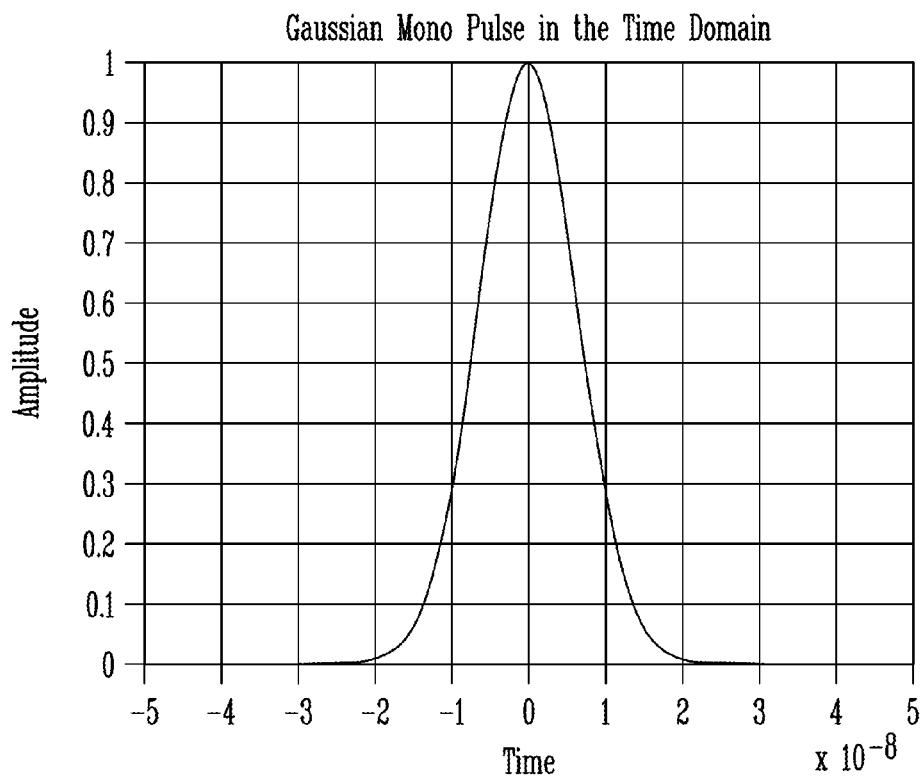
FIG. 1A is a graph of a Gaussian mono pulse in the time domain.
Figure 1B:
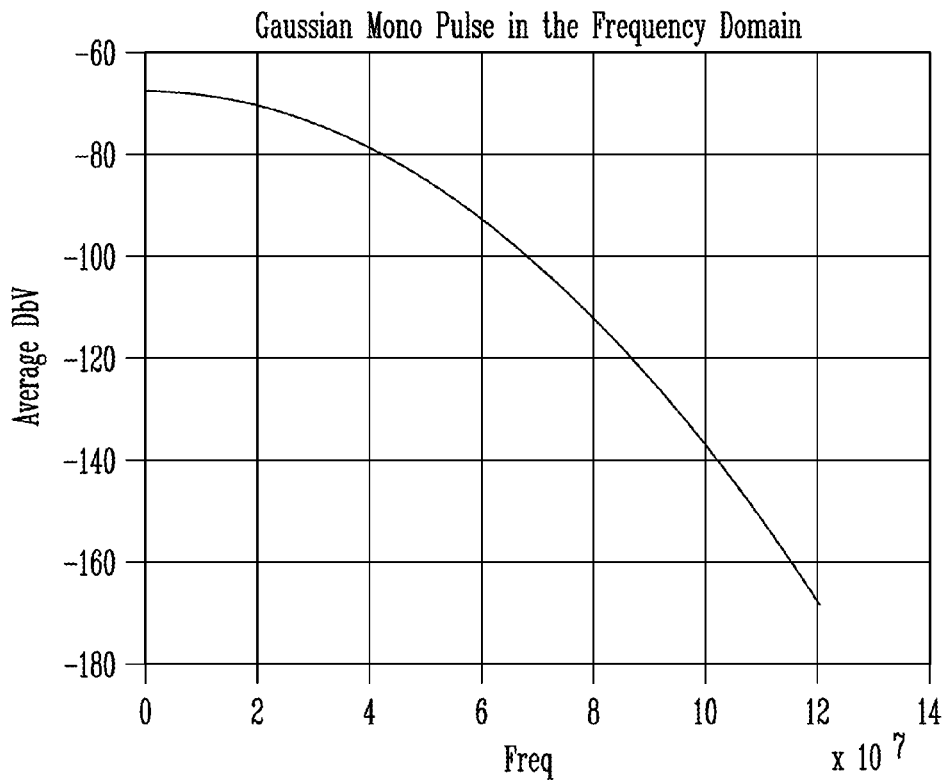
FIG. 1B is a graph of a Gaussian mono pulse in the frequency domain.
Figure 1C:
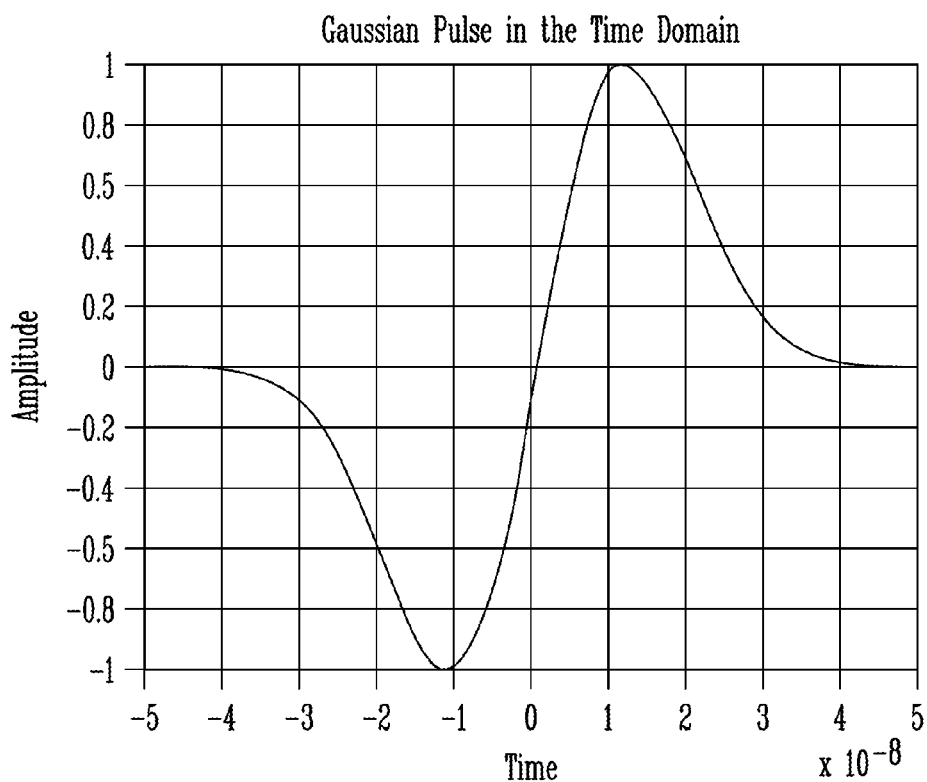
FIG. 1C a graph of a Gaussian pulse in the time domain.
Figure 1D:
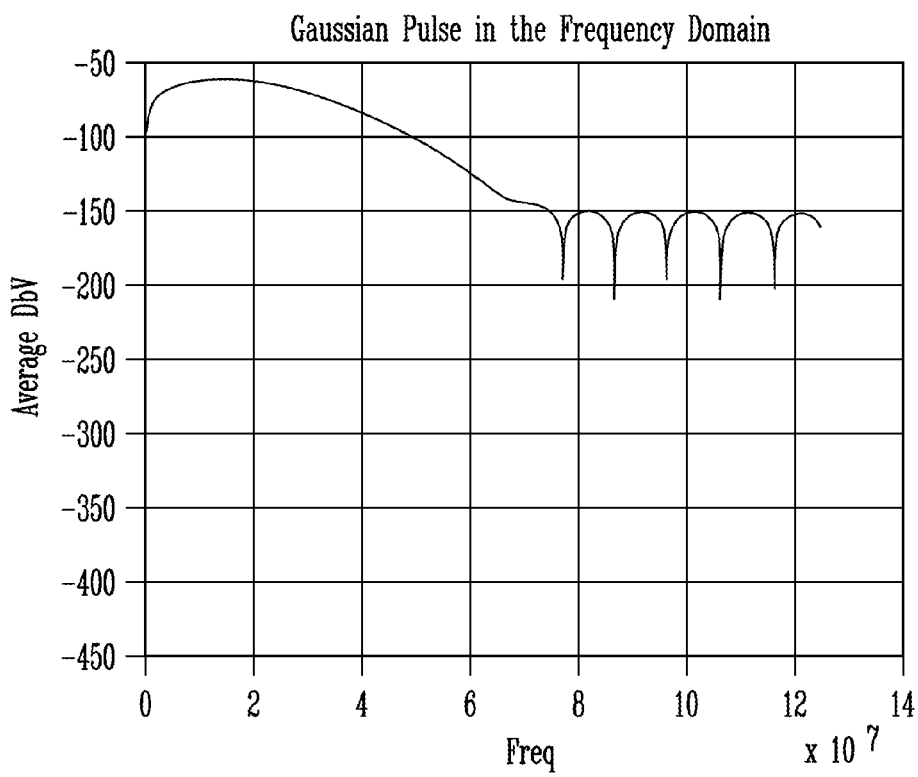
FIG. 1D is a graph of a Gaussian pulse in the frequency domain.
Figure 1E:
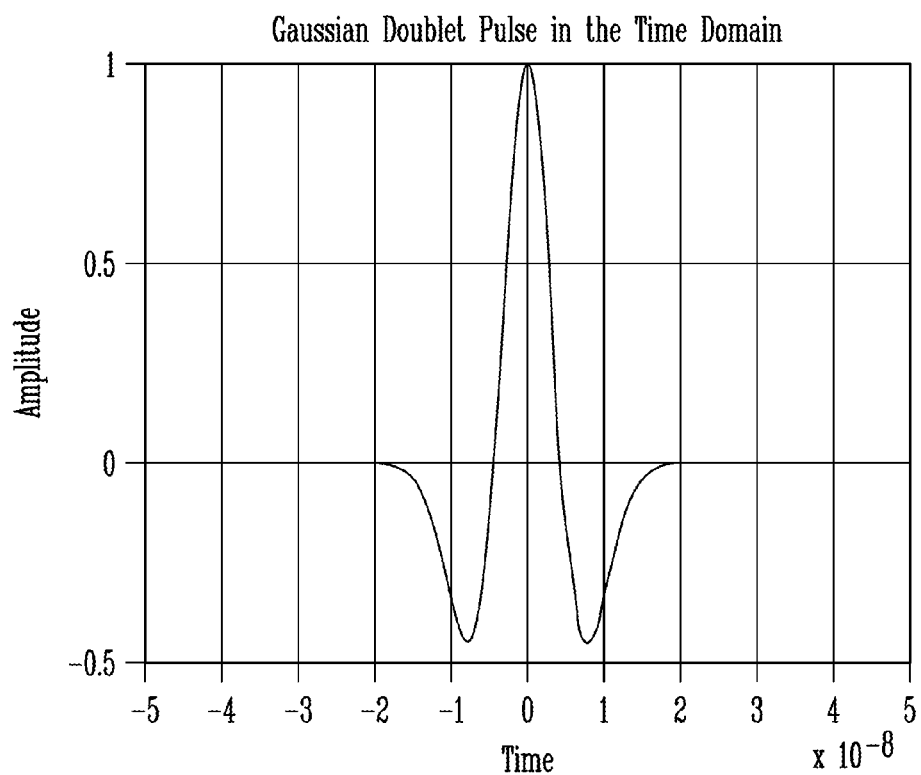
FIG. 1E a graph of a Gaussian doublet pulse in the time domain.
Figure 1F:
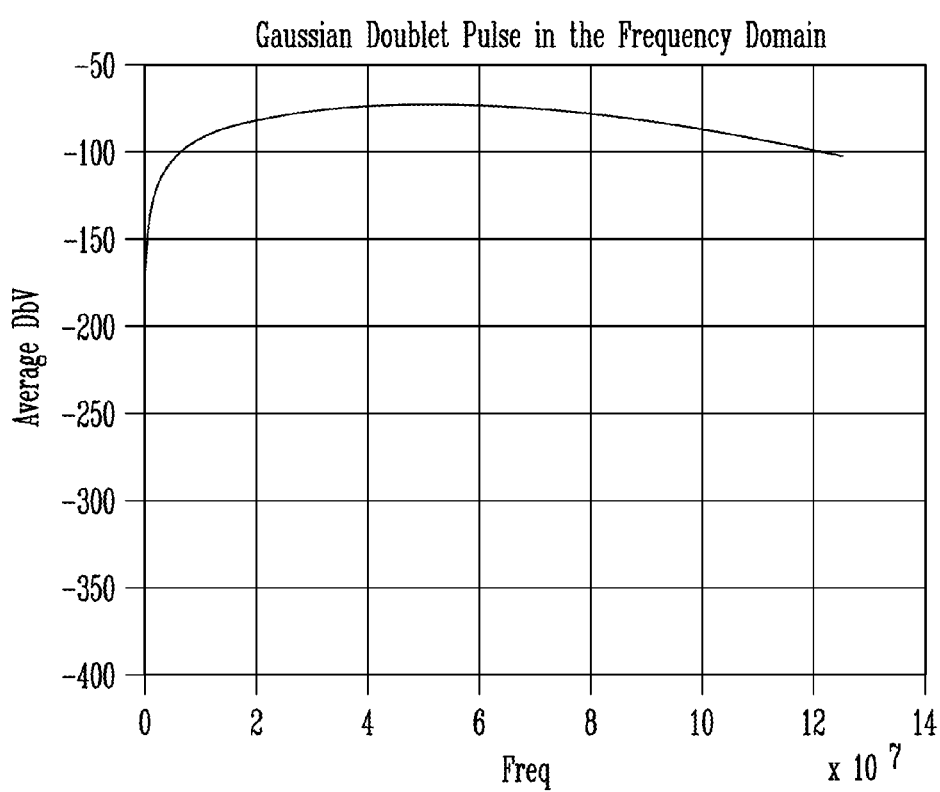
FIG. 1F is a graph of a Gaussian doublet pulse in the frequency domain.

The present invention is a guided line technology that is very high speed, very low power, low probability of detection and intercept, works on any guided line to a home or business, and throughout a home or business. Some of the benefits include a single technology for use with multiple mediums.

Wired communications began in the 1800's with the transmission of electrical pulses down a telegraph wire. Back then, a pulse might occupy slightly less than a second of time. Today, with semiconductor technology, the pulses or impulses can occur in billionths of a second. The invention of combining this traditional wire line communication method with the concepts of Ultra Wideband enabled the inventors to introduce a new wireline technology which is the subject of the present invention.

The present invention is a fundamentally "clean sheet of paper" application of wide-band signal processing to wireline communications on all wire types. The nature of the technology has application in the "To the Home" implementations such as Digital Subscriber Loop (DSL), Broadband Power Line (BPL) and CATV transport. The technology also excels in "Through the Home" applications for home networking on twisted pair, coax and power line. The key benefits of the technology are high data throughput, very low power, and precise frequency control and flexible implementation options.

A new wireline technology needs to have some very specific needs to meet the requirements of the future. The wires are known, but the need for more speed requires more frequency bandwidth. This frequency bandwidth creates challenges. Many of the applications are known, many are not yet known. The need to flexibly control the quality of service of the data is well known. The implementations of the past as shown in Table 1 focused on point to point "To the Home" technologies and separate "Through the Home" networking technologies. A converged platform for wired delivery will ease installation, management and cost.

TABLE 1

| Current Technolgy | Basic Technology | Application | Total PHY Speed | Through-Put | Prior Technology |
|---|---|---|---|---|---|
| ADSL2 ADSL2+ VDSL, VDSL2 VDSL DSM | 512-4096 Bin DMT | 'To the Home' Twisted Pair | 385 Mbps | 80-120 Mbps | ADSL |
| Broadband Power line | Proprietary QAM | 'To the Home' Twisted Pair | 50 Mbps | 5-10 Mbps | N/A |
| CATV | 6 Mhz QAM | 'To the Home' Coax | 30 Mbps | 30 Mbps | N/A |
| Home Phoneline 3.0 | QAM, FDQAM | 'Through the Home' Twisted Pair Coax | 128 Mbps | 40-50 Mbps | HomePNA 1.0 |
| MOCA | Proprietary OFDM | 'Through the Home' Coax | 270 Mbps | 80-100 Mbps | N/A |
| Home Plug AV | 917 Bin Windowed OFDM | 'Through the Home' Power line | 200 Mbps | 20-25 Mbps | HomePlug 1.0, 2.0 |

The present invention relates generally to a system, method and apparatus for interfacing "non-ultra wideband pulse or impulse-based networks" with guided line networks that receive and transmit data encoded and modulated using "ultra-wideband pulse or impulse transmissions".

The ultra wideband pulses or impulses of the present invention are short, low duty cycle and exhibit a fast rise time, ultra-wide frequency spread, unique time domain and frequency domain signatures, etc.

The present invention, also known as MegaBand, or Megaband, or Multi-MegaBand, or Multi-Megaband, or Multi MegaBand, or Multi Megaband, combines the knowledge and skills gained from the study of GPS, UWB, and existing last mile and last 100 feet network technologies. The present invention provides a communication solution for many environments that is low cost, lower power consumption, large range of service, resistant to interference, and easily implemented over any hard wired medium. The present invention is designed to meet the demands of the emerging digital evolution, which must support the simultaneous delivery of multiple streams of video and data content.

The present invention is also known as MegaBand, or Megaband, or Multi-MegaBand, or Multi-Megaband, or Multi MegaBand, or Multi Megaband.

In one embodiment of present invention, known as MegaBand, a train of uniquely formed; short duration pulses or impulses to convey digital data are used. It functions by the generation and detection of a pulse or impulse versus the modulation of radio frequency waves, used in DSL, as an example. These pulses or impulses are spread over wide frequency ranges, utilizing an ultra wideband of available frequencies in the wire to improve detectability, and are easily restricted to the various frequency profile envelopes defined in today's standards for DSL technology. This dramatically extends the rate/reach of the present invention and significantly lowers the interference issues (cross talk) commonly found in other communication technologies.

The present invention enables fiber-like application capabilities over any media, while preserving the legacy network. It delivers broadband digital services over existing copper wires, which can be enhanced with increased amounts of fiber as successful broadband applications require. This enables the benefits of fiber optics without the expense of reconstructing the last and most expensive miles.

Once inside the home or business, signals may be distributed using telephone wiring, power line wiring, or coax wiring to reach virtually any device. A single technology capable of delivering content across any media to any device in the premises offers significant advancements and options in Home and Local Area Networking.

The inventors have successfully built a transceiver for the MegaBand prototype. This FPGA-based (programmable semiconductor) prototype is operational and has completed testing on 400' to 24,000' of various wire mediums at speeds exceeding 100 Mbps, dependent on the medium and distance.

The inventors have also successfully tested a very high data rate (>500 Mbps) version of the prototype known as Multi-MegaBand. This version of the prototype currently uses the following sequence to transmit and receive data via UWB impulses over a hard-wired medium: receiving at least one stream of binary data; framing the stream of data using Generic Frame Protocol (GFP); encoding the GFP bytes with control data to provide control data encoded bytes; encoding the control data encoded bytes with a Reed Solomon encoder to provide Reed Solomon encoded data; interleaving the Reed Solomon encoded data; determining bit loading per frequency bin based on channel estimation data to create a data symbol; performing a Fast Fourier Transform (FFT) on the interleaved data symbol array; mapping FFT data output sub-channel to a frequency bin to provide frequency mapped data; performing an Inverse Fast Fourier Transform (IFFT) on the frequency mapped data; repeating the previous steps until the IFFT memory is full; then serially transmitting the IFFT data as one-dimensional amplitude modulated ultra wideband impulses over a hard-wired medium; then receiving the ultra wideband impulses over the hard-wired medium; then recovering the IFFT data from the ultra wideband impulses by performing an FFT on the IFFT data; mapping frequency to sub-channel; equalizing the mapped data by sub-channel; performing an IFFT; mapping the IFFT output to data symbols; de-interleaving the data symbols; decoding the symbols using a Reed Solomon decoder to provide the control data encoded bytes; and decoding the control data encoded bytes to create GFP bytes.

One of the primary differences between the MegaBand and Multi-MegaBand embodiments of the present invention is the transmit and receive "combination FFT/iFFT algorithms" developed by the inventors.

Currently, the Multi-MegaBand embodiment of the present invention generally consists of a full duplex communications connection realized with two FPGAs over a single wire channel such as twisted pair, coax, power line, etc. This is accomplished using frequency division multiplexing over the desired range digitally with the use of the FFT function.

In both the MegaBand and Multi-MegaBand embodiments of the present invention pulse amplitude modulated UWB pulses or impulses are used to transmit and receive data, the LDL Protocol based on GFP is used, Reed Solomon encoding and interleaving are used, and the channel is estimated. In the MegaBand embodiment, the channel is estimated for the digital transmit and receive filters. In the Multi-MegaBand embodiment, the channel is estimated to determine the bit loading for each frequency bin in the IFFT memory. In the MegaBand embodiment of the present invention the coefficients for the multi-tap equalizer on the receiver is calculated for the entire frequency range. In the Multi-MegaBand embodiment, the equalizer is calculated per frequency bin for fine equalization of the received signal which results in far greater bandwidth than the MegaBand embodiment of the present invention.

Optionally, either embodiment of the present invention can be implemented in the baseband, or modulated onto one or more subcarrier frequencies.

One prototype fully implements our Lightwaves Data Link (LDL) protocol described in the present invention, which is a low overhead protocol based on the variable frame Generic Frame Protocol Standard (GFP). One prototype currently delivers Ethernet and MPEG 2 video. Another prototype delivers Gigabit Ethernet.

Initially, the present invention will be a two-chip solution (chipset) consisting of a Digital Back End (DBE) and an Analog Front End (AFE). The DBE contains the digital implementation of the present invention with the AFE serving as the interface to the wired medium, including, but not limited to, telephone twisted pair (TTP), coax, indoor and outdoor power lines, etc.

Eventually, the present invention will be in the form factor of a semiconductor chip that will enable the technology in various forms including performance, media, interface, and port density. The present invention can be used to enhance virtually any existing equipment, provide a scalable platform for new equipment, and adapt to new network architectures.

According to one aspect of the invention, a method is provided for operating in a public switched telephone network (PSTN). Ultra wideband pulses or impulses are transmitted and received near, or in the noise range of the PSTN network, which may also be providing other services such as voice, video, and data, by means other than the ultra wideband pulses or impulses of the present invention. In addition, a plurality of applications and components are provided that are used for the support, operation, management and delivery of services and products.

According to another aspect of the present invention, a method is provided for operating in a Cable Television (CATV) network. Within this embodiment, ultra wideband pulses or impulses are transmitted and received near, or in the noise range of the CATV network, which may also be providing other services such as voice, video, and data by means other than the ultra wideband pulses or impulses of the present invention.

According to another aspect of the present invention, a method is provided for operating in a Broadband Power Line (BPL) network. Within this embodiment, ultra wideband pulses or impulses are transmitted and received near, or in the noise range of the BPL network, which may also be providing other services such as electrical power, voice, video, and data by means other than the ultra wideband pulses or impulses of the present invention.

According to another aspect of the present invention, a method is provided for operating with a LAN, which transmits and receives ultra wideband pulses or impulses operating near, or in the noise range of the LAN network, which may be running voice, video, and data traffic by means other than the ultra wideband pulses or impulses of the present invention.

According to another aspect of the present invention, a method is provided for use with a data bus, which transmits and receives ultra wideband pulses or impulses operating near, or in the noise range of the data bus, which may be running voice, video, and data traffic by means other than the ultra wideband pulses or impulses of the present invention.

According to another aspect of the invention, a method is provided for operating in a public switched telephone network (PSTN). Alternating counter pulses or impulses are transmitted and received near, or in the noise range of the PSTN network, which may also be providing other services such as voice, video, and data, by means other than the alternating counter pulses or impulses of the present invention. In addition, a plurality of applications and components are provided that are used for the support, operation, management and delivery of services and products.

According to another aspect of the present invention, a method is provided for operating in a Cable Television (CATV) network. Within this embodiment, alternating counter pulses or impulses are transmitted and received near, or in the noise range of the CATV network, which may also be providing other services such as voice, video, and data by means other than the alternating counter pulses or impulses of the present invention.

According to another aspect of the present invention, a method is provided for operating in a BPL network. Within this embodiment, alternating counter pulses or impulses are transmitted and received near, or in the noise range of the BPL network, which may also be providing other services such as electrical power, voice, video, and data by means other than the alternating counter pulses or impulses of the present invention.

According to another aspect of the present invention, a method is provided for operating with a LAN, which transmits and receives alternating counter pulses or impulses operating near, or in the noise range of the LAN network, which may be running voice, video, and data traffic by means other than the alternating counter pulses or impulses of the present invention.

According to another aspect of the present invention, a method is provided for use with a data bus, which transmits and receives alternating counter pulses or impulses operating near, or in the noise range of the data bus, which may be running voice, video, and data traffic by means other than the alternating counter pulses or impulses of the present invention.

According to another aspect of the present invention is provided for transceiver, or transmitter, or receiver capability via a stand-alone telecommunication device to and from devices including, but not limited to, modems, PC boards, cell phones, set-top boxes. Televisions, GPS receivers, ATM Machines, landline phones, VoIP mobile phones, VoIP phones, DLC equipment, digital cameras, electrical outlets, DVD players, DVD records, RFID readers, RFID tags (UWB), RFID tags (non-UWB), RFID tags (non-UWB), computer mice, PDAs, computers, notebook computers, laptop computers, external hard drives, CD burners, DVD burners, gaming equipment, personal computers, desktop computer, laptop computers, notebook computers, external hard drives, CD Burners, DVD Burners, gaming equipment, camcorders, copiers, fax machines, scanners, printers, cash registers, bar code readers, LCD projectors, PBXs, mobile PBXs, home networking devices, entertainment center components, PVRs, wireless and wire line switches and couplers, clocks, audio speakers, servers, power line jumpers, DSLAMs, monitors, video displays, smart card equipment, cable TV (CATV) head end and field equipment, broadband power line (BPL) head end and field equipment, databus controllers, and external computer buses.

According to another aspect of the present invention is provided for transceiver, or transmitter, or receiver capability via an integrated telecommunication device to and from the list of devices in modems, PC boards, cell phones, set-top boxes. Televisions, GPS receivers, ATM Machines, landline phones, VoIP mobile phones, VoIP phones, DLC equipment, digital cameras, electrical outlets, DVD players, DVD records, RFID readers, RFID tags (UWB), RFID tags (non-UWB), computer mice, PDAs, computers, notebook computers, laptop computers, external hard drives, CD burners, DVD burners, gaming equipment, personal computers, desktop computer, laptop computers, notebook computers, external hard drives, CD Burners, DVD Burners, gaming equipment, camcorders, copiers, fax machines, scanners, printers, cash registers, bar code readers, LCD projectors, PBXs, mobile PBXs, home networking devices, entertainment center components, PVRs, wireless and wire line switches and couplers, clocks, audio speakers, servers, power line jumpers, DSLAMs, monitors, video displays, smart card equipment, cable TV (CATV) head end and field equipment, broadband power line (BPL) head end and field equipment, databus controllers, and external computer buses.

According to another aspect of the present invention is provided to interface to the telecommunication systems such as, but limited to, Verizon FIOS, AT&T U-verse, and BAXL Merlot.

According to another aspect of the present invention is provided to balance the spectrum of DSL running on the same hard-wired medium as the present invention using the efficient John Papandriopoulos' method for dynamic spectrum management, by power spectrum balancing, using algorithms called SCALE and SCAWF.

According to another aspect of the present invention is provided to estimate the channel and balance the spectrum for MegaBand/Multi-MegaBand using the efficient John Papandriopoulos' method for dynamic spectrum management, by power spectrum balancing, using algorithms called SCALE and SCAWF.

According to another aspect of the present invention is provided for a multi-channel embodiment, Multi-MegaBand, using "combined pairs of Fast Fourier Transforms and Inverse Fast Fourier Transforms" on both the transmit and receive side which are implemented using Digital Signal Processing (DSP).

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE PRESENT INVENTION

The present invention is a departure from existing impulse radio techniques used for wireless transmission of data. In order to introduce the reader to the present invention, the following technology overview is provided as a precursor to the specific embodiments of the present invention. The intention of this overview is to assist the reader with the understanding of the present invention, and should not be used to limit the scope of the present invention.

One aspect of the present invention refers to a radio frequency system designed for use in high attenuation and capacitance environments which are commonly found on metallic guided-line conductors, such as but not limited to, telephone twisted pair, coaxial cable, Category 5 cable, power lines, other conductive mediums, such as but not limited to, metallic car and truck bodies, ship and submarine hulls, decks and bulkheads, aircraft fuselages, structural steel, missile bodies, tank bodies, water pipes, etc.

The pulses or impulses of the present invention are short, low duty cycle pulses or impulses. The duration and duty cycle of the pulses or impulses vary with the particular medium being used. For a guided media such as telephone twisted pair the practical range of duration of the center channel frequency of the pulses or impulses is between 300 kHz and 150 MHz, which equate to pulse or impulse durations of 2650 nanoseconds to 6.67 nanoseconds respectively. The upper center channel frequency on telephone twisted pair is limited by the phenomenon of radiation which begins to occur around 100 MHz. The overall duty cycle per unit of time is variable, and is dependant on the product of the pulse or impulse repetition frequency times a given pulse or impulse duration. The minimum practical pulse or impulse repetition frequency is dependant on the acceptable jitter for a given window of time. The length of the telephone twisted pair loop also plays a factor in which center channel frequency is used to achieve the maximum data rate at any particular transmission distance. The longer the loop, the lower the acceptable pulse or impulse center channel frequency.

For a guided media such as a coaxial cable the practical range of duration of the center channel frequency of the pulses or impulses is between 300 kHz and up to 2 GHz, which equate to pulse or impulse durations of 2650 nanoseconds to 0.50025 nanoseconds. One skilled in the art will recognize that the appropriate center channel frequency is dependant on the gauge, or mixture of gauges of the guided medium, the proximity to sources of interference, the quality of the insulation, grounding, whether or not the cable is shielded, and other factors as may exist in a particular application or environment The pulses or impulses of the present invention are ultra wideband, and may be based on the Gaussian waveform, which are not gated sine waves, and various derivatives including, but not limited to, a first derivative Gaussian monopulse, a second derivative Gaussian doublet, impulse, etc., or combinations of one or more of these types of pulses or impulses.

These pulses or impulses can also be formed by one or more waveforms that produce desired characteristics including, but not limited to fast rise time, ultra-wide frequency spread, unique time domain and frequency domain signatures, etc. The present invention's time domain signature is a result of the time shift keying of periodic pulses or impulses, which have well-defined zero crossing and peaks. The present invention's pulses or impulses are recovered in the time domain by searching for the location of a specific amount of energy in a sample window. The sent and received pulses or impulses are a time reference against which other pulses or impulses are measured.

The present invention may also employ an alternating counter pulse or impulse method in which alternating counter pulses or impulses of any type are used to reduce inter-symbol interference, shorten the channel, and provide a signal integrity that may result in higher data rates and a lower bit error rate (BER).

The frequency domain signature is ultra wideband in nature because fast rise time pulses or impulses are used. The pulses or impulses are therefore transmitted over a huge spread of frequency, and narrow-band, periodic signals are therefore excluded from consideration, including frequency domain signatures of sine-based waveforms, sawtooth waveforms, triangular waveforms, square waveforms, gated sine waveforms, and variants of those waveforms.

The pulse or impulse characteristics enable increased distance and data throughput performance of the system over existing technologies. Particular attention must be paid to the radiation of the pulse or impulse energy in unshielded metallic environments, such as telephone twisted pairs. For example, radiation occurs at approximately 100 MHz on a telephone twisted pair, which means relatively wide pulses or impulses, compared to those used over air, or a coaxial cable, must be designed for use in this high attenuation, high capacitance medium.

The advantage of the pulses or impulses of the present invention is their unique time domain signature. This signature enables a receiving device to determine the location of a pulse or impulse through a process called correlation. Correlation indicates a coincidence of energy when a replica of the sent pulses or impulses is multiplied by a received pulse or impulse signal. This coincidence known as the auto-correlation (a form of correlation), enables the detection of the pulse or impulse position in very specific time locations. The correlation process is used to detect pulses or impulses at very low signal to noise (SNR) levels, even down into the noise floor. The detection of these low SNR level signals is possible due to the coincidence of energy versus the signal with respect to noise.

There are two advantages of these UWB pulses or impulses in the frequency domain: the ability to coexist with existing telecommunications technologies on copper wires, and the ability to filter and correlate the received signal.

A pulse or impulse of the present invention spreads energy to beyond 25% of the center frequency which causes the signal to appear as noise to most narrowband, wave-oriented communication systems. On a telephone loop, this characteristic limits the far-end and near-end crosstalk interference with other technologies operating on adjacent wires. In addition, this characteristic allows pulse or impulse based services of the present invention to co-exist on the same wire operating with other services such as, but not limited to voice, DSL, etc.

The present invention is a lower power technology and transmits energy typically 10-25 dBm lower in power than a DMT/OFDM system. The frequency distribution is very tame and ordered with little concentrated energy. This results in four main benefits. The first is lower crosstalk in systems that use parallel wires such as twisted pair. The lower crosstalk combined with the lower bit SNR requirement removes the limitation of crosstalk that typically binds DMT/OFDM-based systems.

The second benefit is lower radiation and interference to other services on the same or adjacent wires. This is particularly useful in power line and in home twisted pair applications. As the frequencies of transmission rise the opportunity for interference and coupling rises dramatically with victim wired and wireless technologies.

The third benefit is the reduction of high voltage analog components and power supplies, which results in lower operational costs and heat. The present invention does not require a 12V supply for amplification. A typical signal of the present invention does not exceed 2 Volts peak to peak.

The last concerns the nature of high frequencies. As frequency increases, all of the parts of the system react less favorably. The amplifiers react poorly to high power, high frequency signals as measured by harmonic distortion. The same is true with channelizing hybrids, the transfer of near end energy to adjacent receivers and the far end energy to remote receivers. The general exponential shape of the frequency distribution of far end crosstalk in the present invention is repeated in virtually the whole system component by component. This represents a significant advantage of the present invention versus DMT/OFDM. DMT/OFDM exasperate the electronics and the channel much more significantly. This also reduces the headroom of these systems because of the high peak to average (PAR) levels of the system.

In order to apply the present invention to multiple applications, meet standard frequency masks and eliminate interference concerns, precise frequency control is required. The present invention employs an advanced filtering method that enables very sophisticated filtering and banding. The filtering system is capable of exceeding the extreme demands of VDSL 6 band downstream/upstream separation and the simplicity of Ham-band notching. This flexibility enables the present invention to mimic any standardized frequency structure. The filtering is software defined, enabling adjustment while in service.

The present invention experiences the same noise and interference that other technologies on the wire experience. As with these other systems error correction coding and convolutional interleaving are required to build an immunity to impulse noise. These random noise events can occur at high voltages at varying durations, from a few microseconds to multiple milliseconds. Since the present invention is a short pulse or impulse based technology, the disruption only occurs for the number of symbols equal to the duration of the impulse. By contrast, an DMT/OFDM system could lose 2-3 symbols, and those symbols carry substantial numbers of bits. The present invention will return to operation immediately upon completion of the impulse event. Other noise sources such as outside communications disturbers, radio stations and other consistent noise sources rarely correlate with the rapid pulse or impulse rate of the system. Most interferers are narrowband in nature and have a small de-minimus effect on the equalization of the pulses or impulses and its further decoding. In power line applications, the various noise sources and frequencies of the noise will have various effects on the performance of the system, but in this environment a deeper error correction and interleaving functionality provide the required information correction, albeit at a loss of data bandwidth.

The present invention can be implemented in multiple methods. It can be a dual channel, point to point system or a multi-user/multi-channel system. In "Through the Home" applications and Broadband Power Line applications, multiple devices share the same wire. The present invention can be implemented to enable multi-user, multi-application, multiple media implementations. This enables a very full utilization of the media bandwidth without the extreme orthogonality tricks required for DMT/OFDM systems. Operating as completely independent channels, the idea of a single system across all three wires of a home is possible. The number of channels can vary from 1 to thousands by appropriate implementation of the present invention. For example, a thousand channels could be built for a power line load control system or a system of up to 512 channels could be built for a home networking application. The technology supports dramatic flexibility to distribute its bandwidth.

The present invention also introduces the concept of "plug and play" to "Through the Home" implementations. With adequate data bandwidth and advanced channelization capabilities, one can build an automatic install network methodology. By pre-defining a configuration with a single system across multiple medias, the cost/speed of installation and maintenance can be dramatically reduced. As many service providers are implementing high speed fiber and copper systems for the delivery of new digital services, the need for a "plug and play" networking system is substantial. Home networking represents a substantial cost of implementation of these new digital systems and a future cost of maintenance.

The pulses or impulses illustrated in FIG. 1A-1F are spread in frequency in excess of 400% of the center frequency. The pulses or impulses of the present invention create power spectra that are dramatically wider than traditional spread spectrum technologies, which allow signals to be transmitted faster and further than traditional narrowband methods.

Figure 2A:
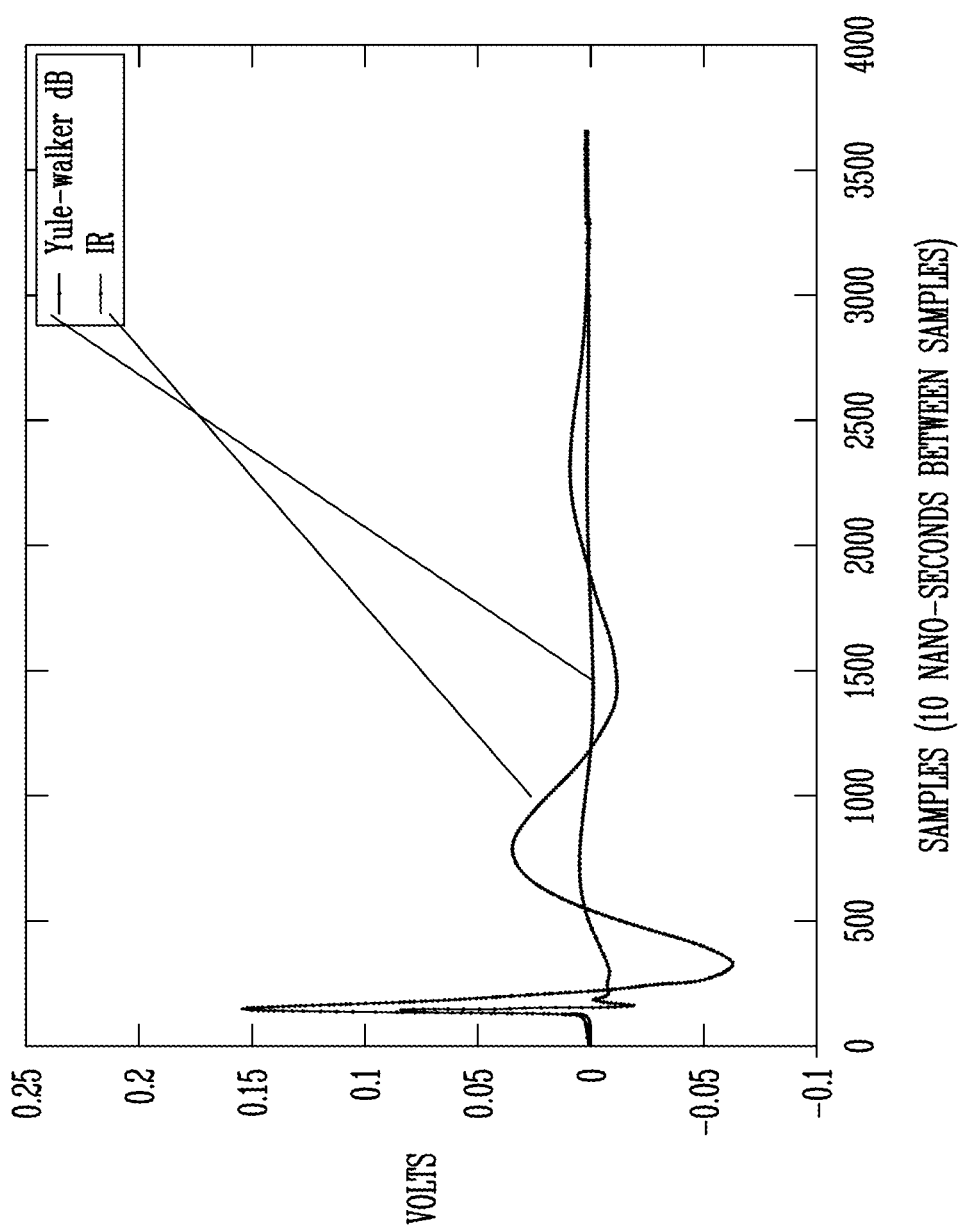
FIG. 2A is an illustration of a single impulse response, and the corresponding effect of equalization on a single impulse.

Alternating counter pulses or impulses are pulses or impulses in which the polarity of each pulse or impulse is 180 degrees out of phase with respect to the previous pulses or impulses. When ultra wideband pulses or impulses are modulated without using alternating counter pulses or impulses, the pulse or impulse train will begin to experience what is known as a DC offset. The DC offset has a cumulative effect which drives the signal out of a suitable dynamic range. In addition, when ultra wideband pulses and impulses are modulated without using alternating counter pulses and impulses, the channel becomes very long. FIG. 2A is an illustration of a single impulse response effect of the present invention's equalizer on that impulse. This effect combats the cumulative DC offset, so that the received signal can be decoded using a peak-detect methodology. An example of DC offset is shown in FIG. 2C.

Figure 2B:
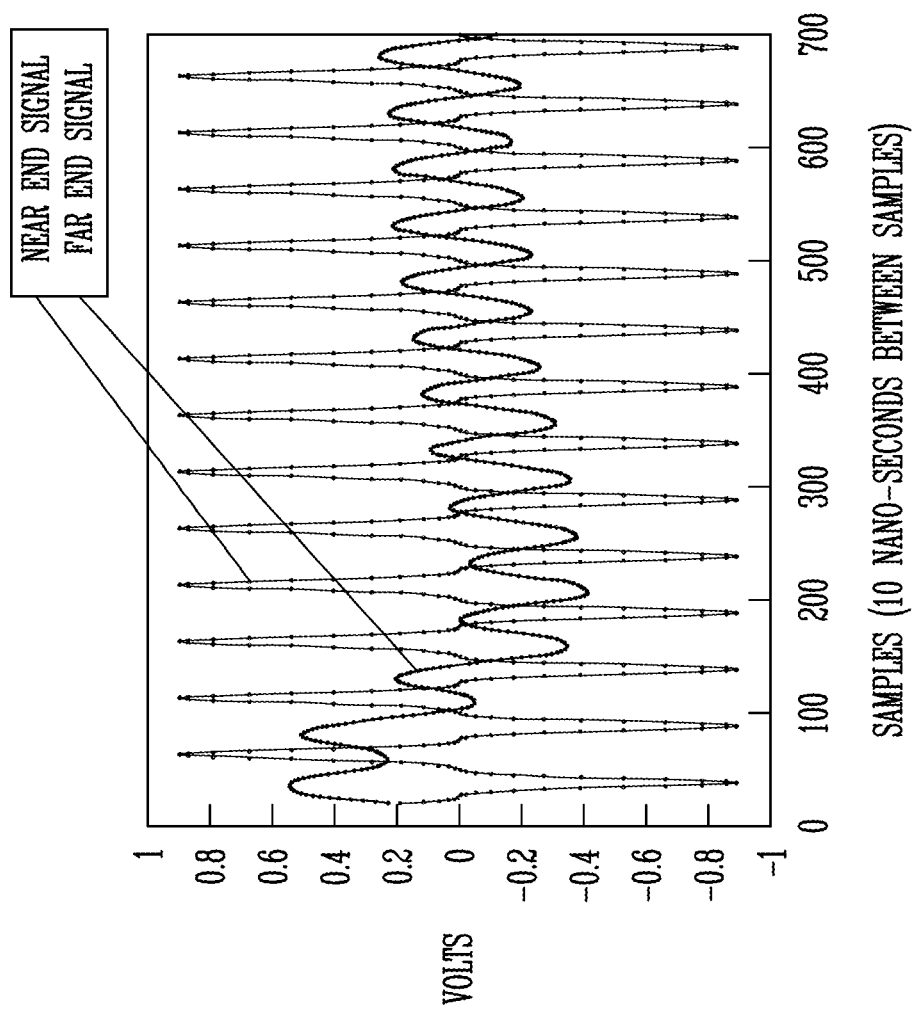
FIG. 2B is an illustration of the effect of alternating counter pulses which have been time modulated showing the near end and far end signals.

FIG. 2B is an illustration of the present invention's alternating counter pulse or impulse scheme in which each pulse or impulse is generated 180 degrees out of the phase with respect to the previous pulse or impulse. The signal is modulated to represent data using a single pulse or impulse amplitude and sixteen pulse or impulse position offsets. It is obvious to one skilled in the art that the pulse or impulse train's channel has been shortened dramatically. In addition, it is obvious to one skilled in the art that the received signal is very stable and the effect of DC offset has been successfully mitigated in order that the received signal can be easily decoded using a wide variety of methods.

Figure 2C:
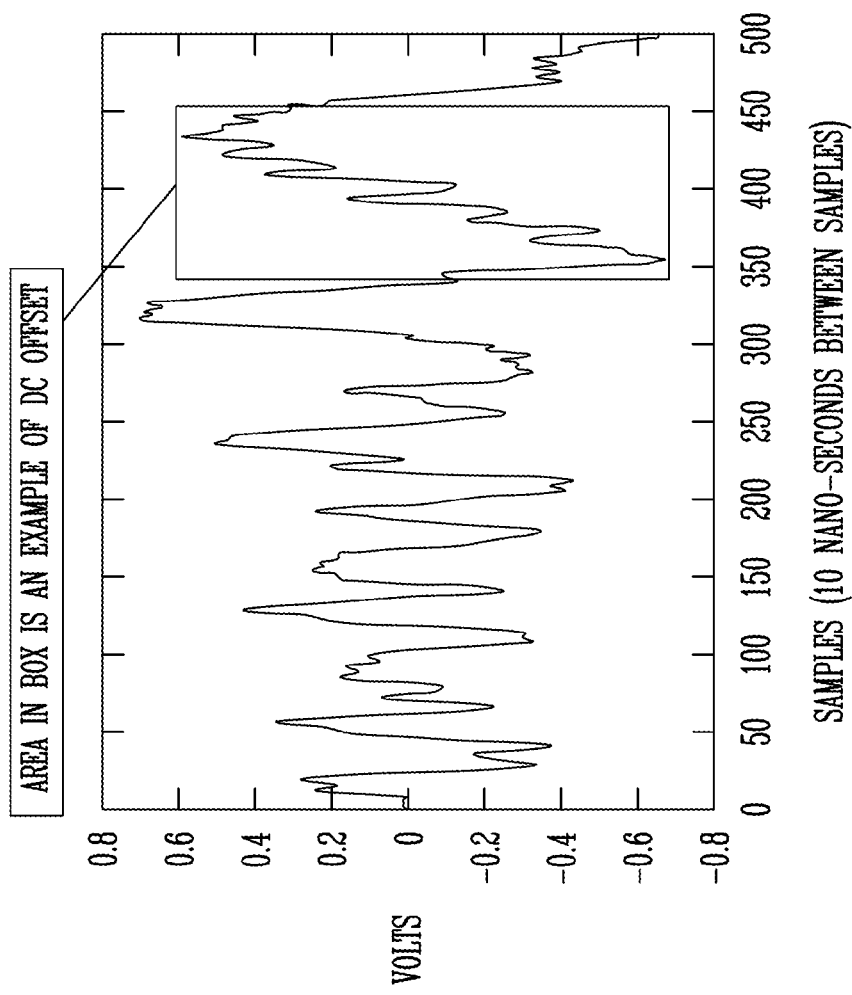
FIG. 2C is an illustration of the effect of alternating counter pulses which have been modulated using a 4 PPM/4 PAM scheme to represent data.

FIG. 2C is an illustration of the present invention's alternating counter pulse or impulse scheme in which the signal is being modulated using a 4 PPM/4 PAM scheme. The benefit of being able to modulate the signal using 4 pulse or impulse positions (PPM) and 4 pulse or impulse amplitudes (PAM) means the broadband system of the present invention has more bandwidth than when the signal is modulated using a single amplitude and 4 pulse or impulse positions to represent data. There is a DC offset in the received signal, but it has not driven the received signal out of a suitable dynamic range.

In addition, the pulses or impulses of the present invention may be shaped spectrally to control the signal bandwidth, limit out of band emissions, in-band spectral flatness, time domain peak power, or adequate on-off attenuation ratios, etc. The pulses or impulses may be produced by various methods that are known to one of ordinary skill in the art.

The system of the present invention can also be used to transmit one or more data bits per pulse or impulse, or may use multiple pulses or impulses to transmit a single data bit. An uncoded, unmodulated pulse or impulse train containing a regularly occurring pattern of pulses or impulses will produce in the frequency domain a set of comb lines within the power spectrum of a single pulse or impulse. These comb lines identify areas of peak power and can cause interference with other services transmitting on the same or nearby wire.

Optionally, in order to reduce the areas of peak power noted in the comb lines discussed above, the energy can be spread more uniformly by using pseudo-random noise (PN) codes to dither each pulse or impulse in a pulse or impulse train relative to each pulse or impulse nominal position. A PN code is a set of time positions that define the positioning for each pulse or impulse in a sequence of pulses or impulses.

The PN code can also be used to provide a method of establishing independent communication channels for multiple users, or devices operating over a single metallic medium. Multiple users, or devices, operating random individual clocks and different PN codes can be designed to have low cross correlation. Therefore, a pulse or impulse train using one PN code will statistically seldom collide with pulses or impulses using another PN code.

In addition to PN codes, there are other methods of channelization on the same metallic medium, such as, but not limited to time division multiplexing, frequency division multiplexing, etc.

The finely-tuned transmit and receive capabilities of the Multi-MegaBand embodiment uses a static pulse repetition frequency.

The present invention can be implemented in a wide variety form factors, such as, but not limited to, modems, PC boards, cell phones, set-top boxes, televisions, GPS receivers, ATM machines, landline phones, VoIP wireless phones, VoIP landline phones, DLC equipment, digital cameras, electrical outlets, interface devices that plug into electrical outlets, iPODs, Rios, DVD players/recorders, on card/board communications, on back-plane communications, RFID readers, computer mouse, PDAs, computers, laptops, notebooks, external hard drives, CD burners, DVD burners, gaming equipment, camcorders, copiers, fax machines, printers, cash registers, bar code readers, LCD projectors, PBXs, home networking devices, entertainment centers, PVRs, wireless/wire line switch (couplers), sensors, clocks, audio speakers, servers, power line jumpers (breaker box), DSLAMs, ISLAMs, amplifiers, monitors, video displays, RFID tags (non-UWB), RFID tags (UWB), smart cards, Cable TV head-end and field equipment, Cable TV CPE equipment, Broadband Power Line (BPL) head-end and field Equipment, BPL CPE equipment, in-building power line communication system controllers, databus controllers, IP enabled PBX systems, IP enabled Centrex systems, IP enabled Central Office systems, IP enabled telephones, IP enabled cell phones, IP enabled voice mail systems, and IP enabled fax machines, etc.

Any characteristics, or combinations of characteristics, of pulse or impulse waveforms can be modulated to convey information. These include, but are not limited to, amplitude modulation, phase modulation, frequency modulation, time shift modulation, polarity (flip) modulation, pulses or impulses shape modulation, M-ary, QPSK, etc, and those described in U.S. patent application Ser. No. 09/812,545, to Melick, et al, entitled SYSTEM AND METHOD OF USING VARIABLE PULSES OR IMPULSES FOR SYMBOLOGY, and U.S. Continuation-in-Part patent application filed on Oct. 18, 2004, to Melick, et al, entitled, SYSTEM AND METHOD OF USING VARIABLE PULSES FOR SYMBOLOGY, both which are herein incorporated in entirety by their reference. Modulation may be in either analog or digital forms.

Various methods and apparatuses that are suitable for use within the present invention include the following patents or applications: U.S. patent application Ser. No. 11/622,824, entitled Globally Referenced Positioning in a Shielded Environment, filed on Jan. 12, 2007; U.S. patent application Ser. No. 10/427,039, entitled High Bandwidth Data Transport System, filed on Apr. 30, 2003; U.S. patent application Ser. No. 10/967,850, entitled Improved High Bandwidth Data Transport System, filed on Oct. 18, 2004; U.S. patent application Ser. No. 11/118,928, entitled Method and Apparatus for Multi-Band UWB Communications, filed on Apr. 29, 2005; U.S. patent application Ser. No. 11/170,489, entitled Transmitting Data Including a Structured Linear Database, filed on Jun. 29, 2005; U.S. patent application Ser. No. 11/318,283, entitled Method for Routing Data Packets, filed on Dec. 23, 2005; U.S. patent application Ser. No. 09/812,545, entitled System and Method of Using Variable Pulses or impulses for Symbology, filed on Mar. 20, 2001; U.S. patent application Ser. No. 10/967,859, entitled System and Method of Using Variable Pulses or impulses for Symbology, filed on Oct. 18, 2004; U.S. patent application Ser. No. 10/963,034, entitled System and Method of Using Variable Pulses or impulses for Symbology, filed on Oct. 11, 2004; U.S. patent application Ser. No. 10/345,766, entitled System and Method for Storing/Caching, Searching and Accessing Data, filed on Jan. 16, 2003; U.S. patent application Ser. No. 10/413,801, entitled Unified Messaging System, filed on Apr. 15, 2003; and U.S. patent application Ser. No. 11/677,408, entitled Improved High Bandwidth Data Transport System. All the above-identified patent applications are herein incorporated by reference in its entirety.

Exemplary Embodiments

The exemplary embodiments of the present invention relate generally to systems, methods and apparatuses for interfacing "non-ultra wideband" pulse or impulse based networks with guided line networks that receive and transmit data encoded and modulated using "ultra-wideband pulse or impulse transmissions".

The basis of the present invention is the specific, prior knowledge of the transmission timing, and the existence and characteristics of a particular ultra wideband pulse or impulse. Whereas wave-oriented communications seek to extract the meaning of a wave, the present invention focuses simply on the existence of a pre-defined ultra wideband pulse or impulse, within a pre-defined window of time, on an electrically conducting wave guide such as a metallic medium. The key components of the broadband technology are the ultra wideband pulses or impulses, the modulation of the ultra wideband pulses or impulses in time, and/or amplitude and/or shape, and/or frequency, and/or phase, and/or combinations of these, and the control of transmission power.

Recent advances in wireless communications technology have resulted in an emerging; revolutionary ultra wide band technology (UWB) called impulse radio communications systems (hereinafter called impulse radio). Although ultra wideband pulses or impulses are wideband in nature and similar to ones found in wireless UWB or impulse radio, the science of using them over long distances on high attenuation and capacitance metallic mediums such as telephone twisted pair loops, coaxial cable, and power lines is significantly different.

It is often desirable when building wireless pulse or impulse radio receivers to include a sub-carrier with the baseband signal to help reduce the effects of amplifier drift and low frequency noise. The sub-carrier that is typically implemented alternately reverses modulation according to a known pattern at a rate faster than the data rate. This same pattern is then used to reverse the process and restore the original data pattern.

The present invention may be configured to use a wide variety of network topologies. The following chart includes, but is not limited to, network topologies which may be configured as point-to-point, point-to-multi-point, multi-point-to-point, or any combination thereof.

CHART 1

NETWORK TOPOLOGY DEFINITIONS

SWITCHED ACCESS NETWORKS

| | |
|---|---|
| Telephone | Single Interface/User |
| Telephone | Multiple Interfaces/User |

SHARED ACCESS NETWORKS

| | |
|---|---|
| Cable TV | Single Interface/User |
| Cable TV | Multiple Interfaces/User |
| Community Access Television Network | Single Interface/User |
| Community Access Television Network | Multiple Interface/User |
| Power Line | Single Interface/User |
| Power Line | Multiple Interfaces/User |
| LAN | Single Interfaces/User |
| LAN | Multiple Interfaces/User |
| BUS | Single Interface/User |
| BUS | Multiple Interfaces/User |

HYBRID NETWORKS

| | |
|---|---|
| Any Combination of Telephone, Cable TV, Power Line, Wireless, LAN, PAN, BUS | Single Interface/User |
| Any Combination of Telephone, Cable TV, Power Line, Wireless, LAN, PAN, BUS | Multiple Interfaces/User |

The present invention's network topologies may be configured to use a wide variety of mediums for transporting data. The chart below includes, but is not limited to, the following transport mediums:

CHART 2

TRANSPORT MEDIUMS

GUIDED MEDIUMS

Un-bonded Telephone Twisted Pairs (TTP)
Bonded Telephone Twisted Pairs (TTP)
Coaxial Cables
Differential Pairs
CAT-5 Wiring
Power Lines (Long Distance Power Distribution)
Power Lines (In-Building)
Metallic Pipes
Railroad Rails
Drill Stem
Highway Rebar
Vehicle Frames & Bodies (Including Cars, Trucks, Tanks, Airplanes, Tanks, Cranes, Etc.)
Missile & Rocket Bodies
Metal Desks
Desks & Benches With Metallic Bus Strips (Including Wooden Desks, Kitchen Counters, Lab Benches, Etc.)
Compute Device Backplanes
Ultra Wideband Pulses or impulses on Narrow Band Sine-Wave Carriers Operating Over Guided Mediums

NON-GUIDED MEDIUMS

Ultra Wideband Pulses or impulses on Narrow Band Sine-Wave Carriers Operating Over Non-Guided Mediums The present invention's network topologies may be configured to use a wide variety of directions and methods for transporting data. The chart below includes, but is not limited to, the following common methods:

CHART 3

TRANSPORT DIRECTIONS, METHODS

TRANSMISSION DIRECTIONS

Simplex - One direction only.
Half-Duplex - Bi-directional, one direction at a time.
Full-Duplex - Bi-directional, both directions at the same time.
The upstream and downstream directions may be symmetrical, or asymmetrical in bandwidth.

METHODS FOR ACCOMMODATING MULTIPLE USERS/DEVICES

Figure 3:
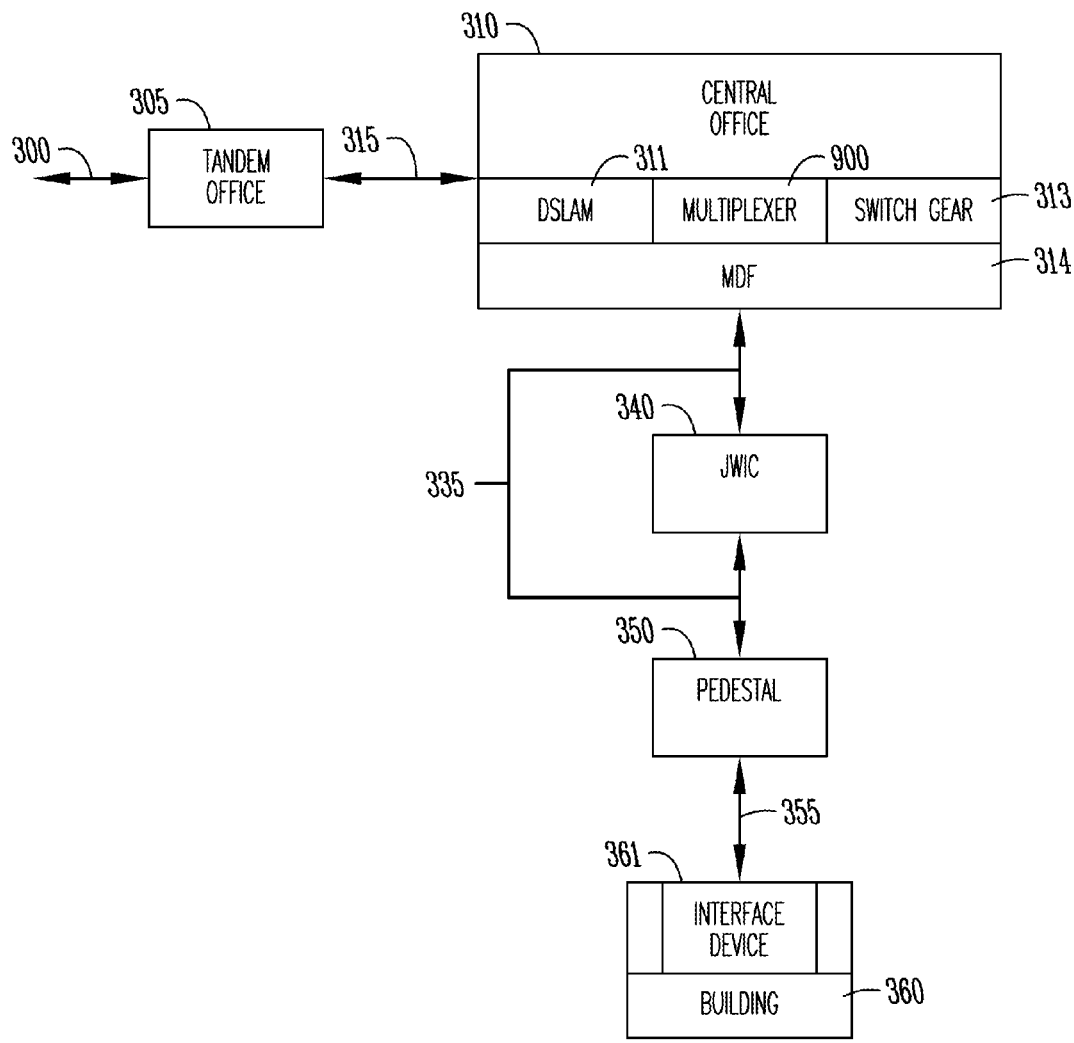
FIG. 3 is a block diagram of a PSTN network topology configured in accordance with the preferred embodiment of the present invention.
Figure 4:
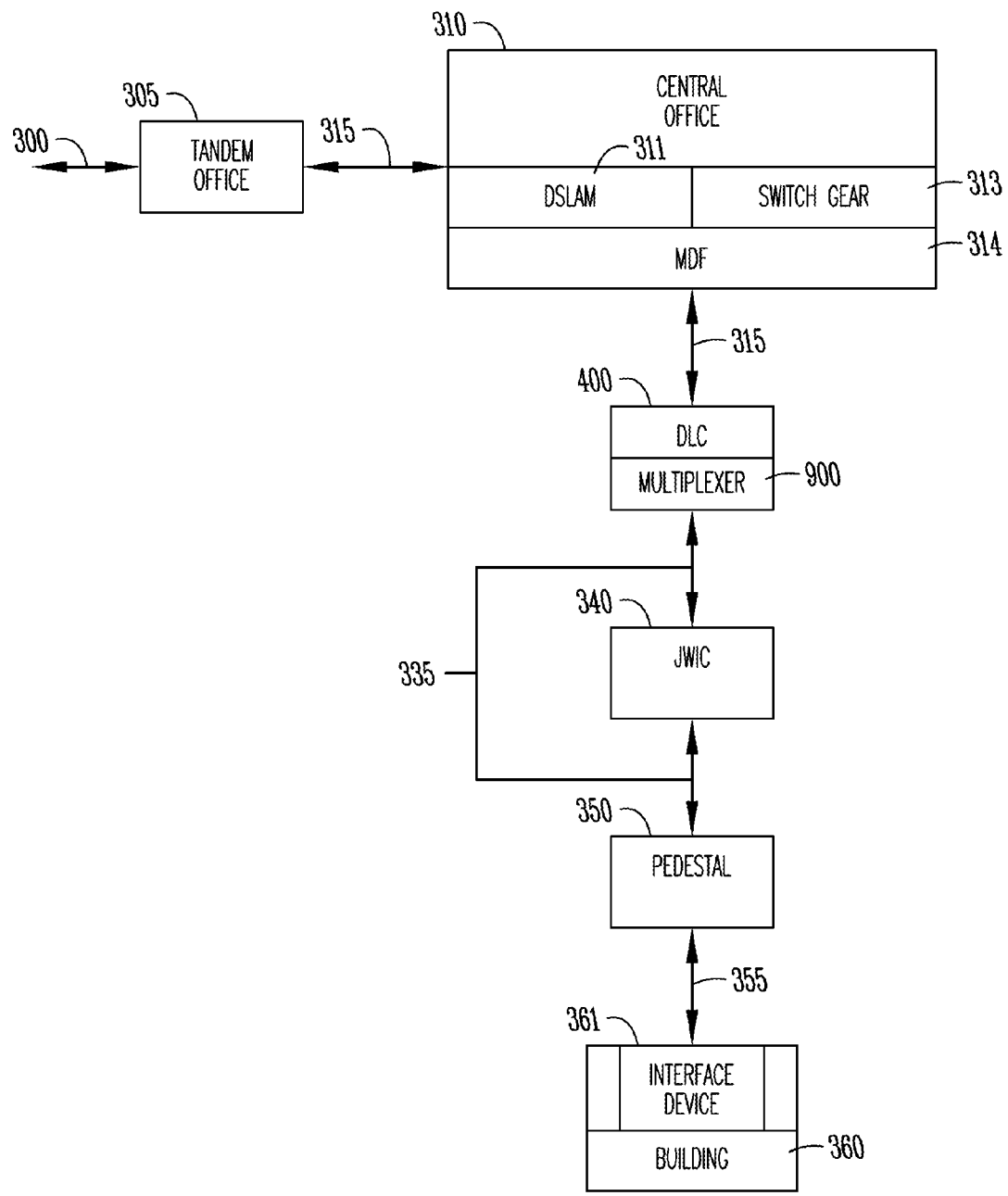
FIG. 4 is an illustration of a PSTN network topology with intermediate field electronics configured in accordance with an alternate embodiment of the present invention.

Synchronous Time Division Multiplexed
Asynchronous Time Division Multiplexed
Code Division Multiplexed
Frequency Division Multiplexed
Orthogonal Frequency Division Multiplexed Specific Topologies "Last Mile" Access Network Topologies—FIG. 3 illustrates the preferred embodiment of the present invention and is configured as a Public Switched Telephone Network (PSTN) topology without any intermediate field electronics, such as a Digital Loop Carrier (DLC) 400 as shown in FIG. 4. The present invention deployed on a PSTN may operate a single private multiplexed downstream and upstream of ultra wideband pulses or impulses, or a plurality of private downstreams and upstreams of ultra wideband pulses or impulses. In addition, these pulses or impulses may be alternating counter pulses or impulses.

The PSTN is a circuit switched network, which is normally accessed by telephones, key telephone systems, private branch exchange trunks, and data arrangements. The circuit between the call originator and call receiver in a PSTN is completed using network signaling in the form of dial pulses or impulses or multi-frequency tones. Even though long distance carriers generally operate fiber optic networks, the Local Exchange Carriers (LEC) and Competitive Local Exchange Carriers (CLEC) are the primary "last mile" link, which generally utilize telephone twisted pair to the home, or business.

Figure 9:
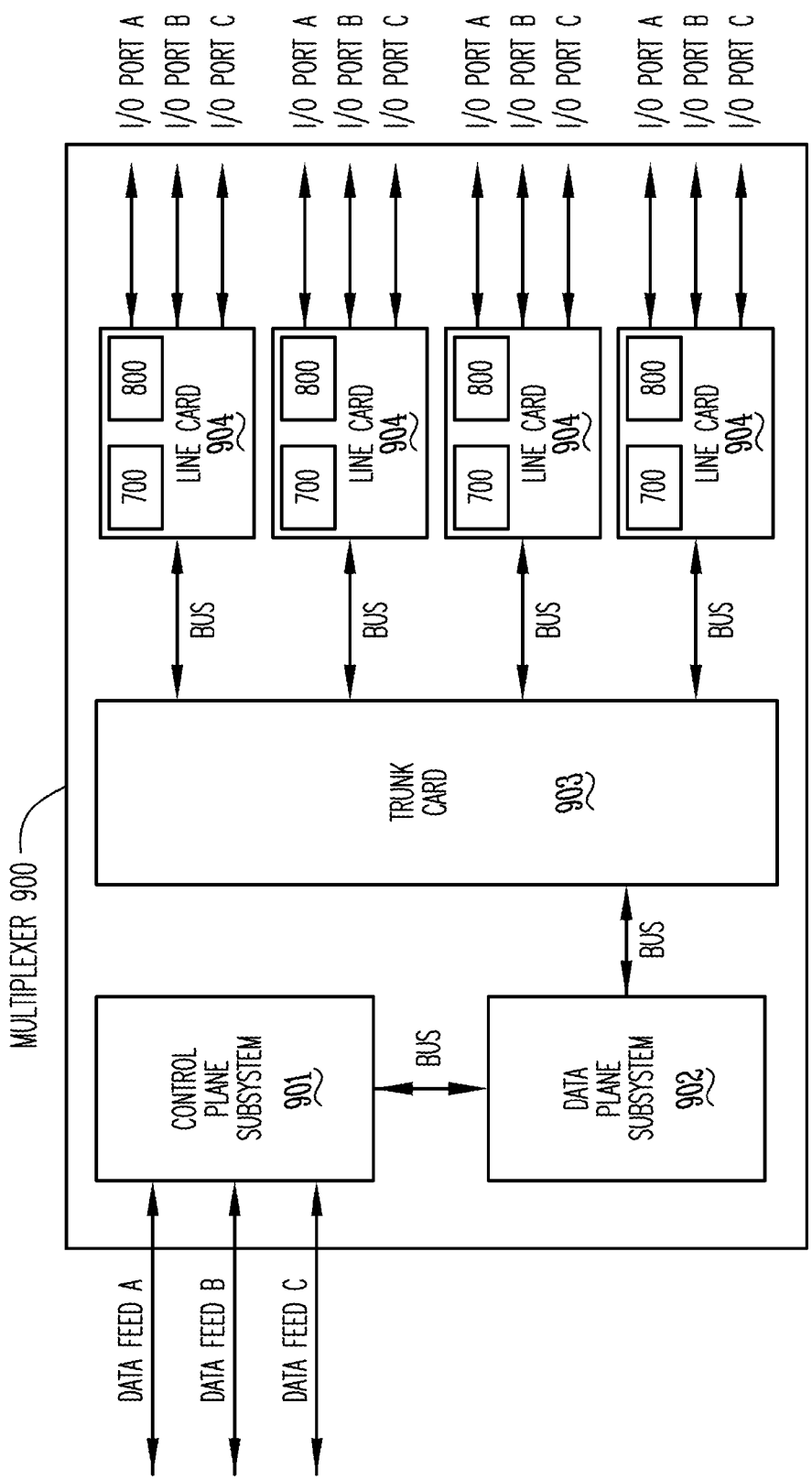
FIG. 9 is a block diagram of a multiplexer according to one embodiment of the present invention.

The preferred embodiment of the present invention as shown in FIG. 3 is a typical LEC PSTN network topology configured without any intermediate field electronics, and with the addition of a multiplexer 900, which may also be referred to as a UWB unit or telecommunications interface and is shown in FIG. 9. The tandem office 305 is the toll administration office that connects the LEC, via transmission medium 300, which may be fiber optic cable, a wireless system, etc., to other LECs through long distance Interchange Carriers (IXC), Internet Service Providers (ISP), Application Service Providers (ASP), to peering points, such as, but not limited to another computer, a server farm, and data reverberating over a network. The tandem office 305 is connected to one or more Central Offices (CO) 310 via the underground plant 315. The underground plant 315 usually consists of transport medium, such as, but not limited to, fiber optic lines for the transport of multiplexed, digital data streams.

CO 310 is the switching center for the LEC. The CO 310 is the co-location point for any DSL equipment the LEC is operating, such as, but not limited to a Digital Subscriber Lines Access Multiplexer (DSLAM), etc. The DSLAM 311 generates, modulates, transmits, and receives DSL signals to and from the Main Distribution Frame (MDF) 314. The CO 310 also houses the switching gear 313 for completing circuits between two, or more customers, and the MDF 314, which is the main termination block for all of a LEC's telephone twisted pairs. The CO 310, will also be the co-location point for the present invention's multiplexer 900. This equipment generates, modulates, transmits, and receives signals to and from the MDF 314. The ultra wideband pulses or impulses may be non-convolved or convolved prior to transmission. The present invention may be configured on a blade in order to co-exist in a DSLAM cabinet which may be operating DSL blades.

MDF 314 is connected to the end-user via feeder distribution network 335, which are telephone twisted pairs grouped together in binders of 25 or 50, Junctor Wire Interface Cabinets (JWIC) 340, and pedestal(s) 350. JWIC 340 is a mechanical cross-connect cabinet that connects the telephone twisted pairs coming from MDF 314 to the various pedestals 350, via feeder distribution network 335 in a LEC's network. The telephone twisted pairs that comprise the network may be un-bonded or bonded pairs.

Figure 10:
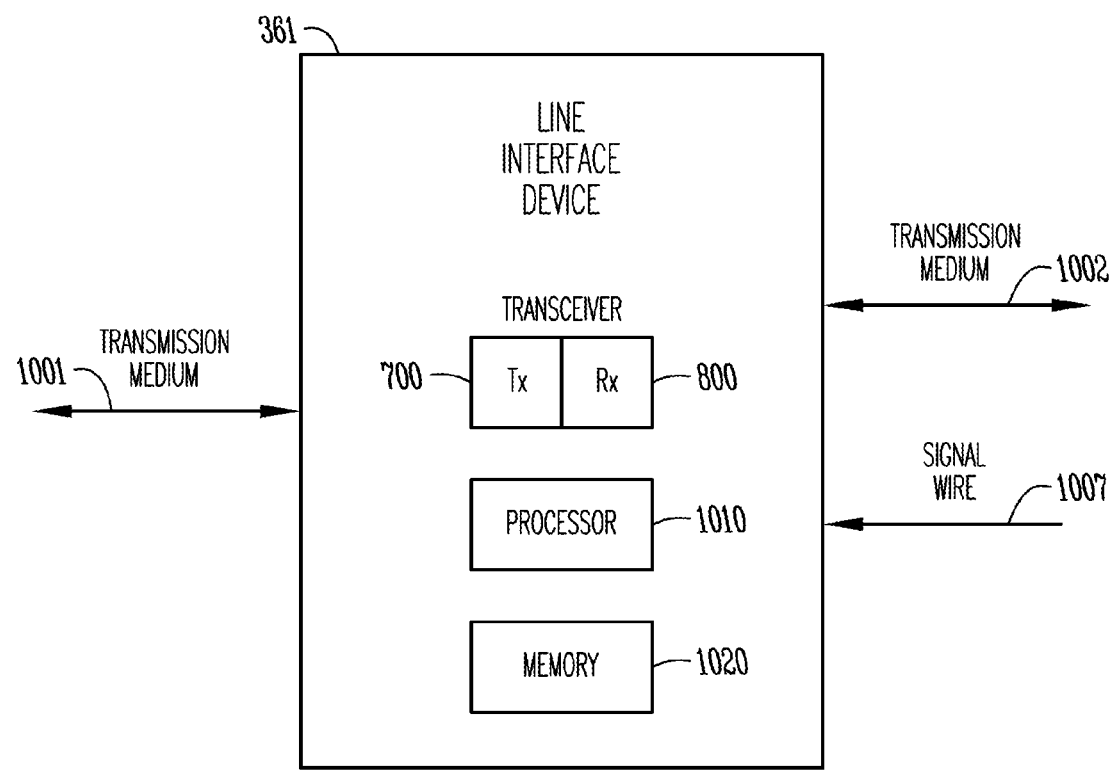
FIG. 10 is a block diagram of a line interface device according to one embodiment of the present invention.

Pedestal 350 is a junction box where customer drops 355 are terminated in a neighborhood. Customer drops 355 are telephone twisted pairs from the pedestal 350 to the interface device 361, as shown in FIG. 10, which can be located inside, or outside a customer's building 360.

The LEC described in FIG. 3 may continue to operate normal voice, media, and data services over their network. The ultra wideband signals can co-exist on the same TTP in the same frequency range of other narrow band or wideband signals, or in notched frequency ranges separate from other narrow band or wideband signals. Local voice traffic may continue to be switched, and packets of media and data may be handled with existing, or future systems and protocols such as, but not limited to, Integrated Services Digital Network (ISDN), DSL, Asynchronous Transfer Mode (ATM), analog line interface device 361, Transmission Control Protocol/Internet Protocol (TCP/IP), etc. The present invention provides a protocol and system agnostic carrier that can be enabled to carry any form of digital voice, media, and data transmissions, such as, but not limited to, TCP/IP packets, ATM frames, etc. The multiplexer 900 in the CO 310 will generate ultra wideband pulse or impulse transmissions at, or below the noise level, of the LEC's network.

Once inside building 360, high data rate Home PNA-type systems can be built using ultra wideband pulses or impulses transmitted over telephone twisted pairs or electrical wiring.

In order to achieve longer transmission distances at lower data rates from the CO 310, over-sampling techniques such as, Cyclic Redundancy Code (CRC), and Forward Error Correction (FEC), etc., can be used to insure an acceptable Bit Error Rate (BER).

FIG. 4 illustrates an alternate embodiment of the present invention is configured as a Public Switched Telephone Network (PSTN) topology which includes intermediate field electronics in the form a Digital Loop Carrier (DLC) cabinet 400. This network topology of the present invention may operate a single private multiplexed downstream and upstream of ultra wideband pulses or impulses, or a plurality of private downstreams and upstreams of ultra wideband pulses or impulses. The ultra wideband pulses or impulses are high number base encoded, and are near, or in the noise range of the transmission on a network, which may be running voice, video, and data traffic by means other than the ultra wideband pulses or impulses of the present invention. In addition, these ultra wideband pulses or impulses may be alternating counter pulses or impulses. The telephone twisted pairs (TTP) that comprise the network may be un-bonded or bonded pairs.

Bonded pair TTPs are balanced, insulated conductors that are mirror images of each other. The balance is achieved by maintaining a consistent and controlled center-to-center distance between the conductors in the pair, which helps to ensure that the signal does not radiate from one conductor to the other and cause damaging cancellation effects.

The PSTN is a circuit switched network, which is normally accessed by telephones, key telephone systems, private branch exchange trunks, and data arrangements. The circuit between the call originator and call receiver in a PSTN is completed using network signaling in the form of dial ultra wideband pulses or impulses or multi-frequency tones. Even though long distance carriers generally operate fiber optic networks, the Local Exchange Carriers (LEC) and Competitive Local Exchange Carriers (CLEC) are the primary "last mile" link, which are generally telephone twisted pair networks, to the home, or business.

This alternate embodiment of the present invention is a typical LEC, as shown in FIG. 4, with the addition of a multiplexer 900. The tandem office 305 is the toll administration office that connects the LEC, via transmission medium 300, which may be fiber optic cable, a wireless system, etc., to other LECs through long distance Interchange Carriers (IXC), Internet Service Providers (ISP), Application Service Providers (ASP), to peering points, such as, but not limited to another computer, a server farm, and data reverberating over a network. The tandem office 305 is connected to one or more Central Offices (CO) 310 via the underground plant 315. The underground plant 315 usually consists of transport medium, such as, but not limited to, fiber optic lines for the transport of multiplexed, digital data streams.

CO 310 is the switching center for the LEC. The CO 310 is a co-location point for any DSL equipment the LEC is operating, such as, but not limited to a Digital Subscriber Lines Access Multiplexer (DSLAM), etc. The DSLAM 311 generates, modulates, transmits, and receives DSL signals to and from the Main Distribution Frame (MDF) 314. CO 310 also houses the switching gear 313 for completing circuits between two, or more customers, and the MDF 314, which is the main termination block for all of a LEC's telephone twisted pairs. This equipment generates, modulates, transmits, and receives ultra wideband pulse or impulse signals to and from the MDF 314. The pulses or impulses may be non-convolved, or convolved prior to transmission.

The MDF 314 sends and receives multiplexed, digital data streams to and from the DLC 400 via the underground plant 315. The Digital Loop Carrier (DLC) 400 are connected to an end-user via feeder distribution network 335, which are telephone twisted pairs grouped together in binders of 25 or 50, Junctor Wire Interface Cabinets (JWIC) 340, and pedestal(s) 350. DLC 400 is a piece of intermediate field electronics used to increase the physical reach of a CO. DLC 400 is an analog to digital converter, and multiplexer for traffic coming from a customer's building 360 back to the CO 310. In this embodiment of the present invention, the DLC 400, serves as the co-location point for the present invention's multiplexer 900. JWIC 340 is a mechanical cross-connect cabinet that connects the telephone twisted pairs coming from DLC 400 to the various pedestals 350, via feeder distribution network 335 in a LEC's network.

Pedestal 350 is a junction box where customer drops 355 are terminated in a neighborhood. Customer drops 355 are telephone twisted pairs from the pedestal 350 to the interface device 361, which can be located inside, or outside a customer's building 360. Interface device 361 can be equipment, such as, but not limited to, a line interface device 361 shown in FIG. 10.

The LEC described in FIG. 4 may continue to operate normal voice, media, and data services over their network. The ultra wideband signals can co-exist on the same TTP in the same frequency range of other narrow band or wideband signals, or in notched frequency ranges separate from other narrow band or wideband signals. Local voice traffic may continue to be switched, and packets of media and data may be handled with existing, or future systems and protocols such as, but not limited to, Integrated Services Digital Network (ISDN), DSL, Asynchronous Transfer Mode (ATM), analog line interface device 361, Transmission Control Protocol/Internet Protocol (TCP/IP), etc. Protocol and system agnostic carrier of the present invention can be enabled to carry any form of digital voice, media, and data transmissions, such as, but not limited to, TCP/IP packets, ATM frames, etc. The multiplexer 900 in the DLC 400 will generate transmissions at, or below the noise level, of the LEC's network.

Once inside building 360, high data rate Home PNA-type systems can be built using ultra wideband pulses or impulses transmitted over telephone twisted pairs or electrical wiring.

The following is an example of retrieving an Internet web page using the preferred embodiment of the present invention as shown in FIG. 3, or the alternate embodiment of the present invention as shown in FIG. 4. A user with service over their LEC's switched network wishes to use their PC to access a web page from a remote server. The client device, such as, but not limited to a PC, is connected, either internally or externally to a stand-alone line interface device 361, as shown in FIG. 10, or integrated into a device. Line interface device 361 is shown in FIG. 10, and in one embodiment can be an interface modem that is an ultra wideband pulse or impulse over a conductive medium modem, which is coupled to a non-ultra wideband pulse or impulse over wire communication modem.

The PC uses Internet browser software, such as, but not limited to Microsoft Internet Explorer 6.0, in order to initiate the following steps that would generally be required to connect to the remote server using a standard client-server architecture, using a line interface device 361, as shown in FIG. 10, using Multi-MegaBand for access to the Internet over a LEC's switched network, through an Internet Service Provider (ISP) in order to retrieve the following file.

The browser breaks the Uniform Resource Locator (URL) into 3 parts:
The communication protocol to be used: Hyper Text Transfer Protocol (HTTP)
The server name to be accessed.
The requested file.
The PC's communication software creates a data packet using TCP/IP stack protocol
The PC's communication software encapsulates the TCP/IP data packet in Point-to-Point Protocol (PPP), which is an established standard for the assignment and management of IP addresses, asynchronous (start/stop) and bit-oriented synchronous encapsulation, network protocol multiplexing, link configuration, link quality testing, error detection, and option negotiation for such capabilities as network layer address negotiation and data-compression negotiation.
The PC sends the TCP/IP data packet encapsulated in PPP to a line interface device 361, as shown in FIG. 10, which is a full-duplex device, in order to transmit and receive digital information over twisted telephone pairs.

The PC can be transmit TCP/IP data packets over a plurality of methods to the line interface device 361, as shown in FIG. 10, including but not limited to local and external buses such as Peripheral Component Interconnect (PCI), Advanced TCA, Industry Standard Architecture (ISA), Ethernet, Infiniband, Universal Serial Bus (USB), serial or parallel, 802.11 wireless, Bluetooth, etc. The line interface device 361, as shown in FIG. 10 may be stand alone or integrated into another device. The line interface device 361, as shown in FIG. 10, is configured for Multi-MegaBand operations receives a stream of binary data; frames the stream of data using Generic Frame Protocol (GFP); encodes the GFP bytes with control data to provide control data encoded bytes; encodes the control data encoded bytes with a Reed Solomon encoder to provide Reed Solomon encoded data; interleaves the Reed Solomon encoded data; determines bit loading per frequency bin based on channel estimation data to create a data symbol; performs a Fast Fourier Transform (FFT) on the interleaved data symbol array; maps FFT data output sub-channel to a frequency bin to provide frequency mapped data; performs an Inverse Fast Fourier Transform (iFFT) on the frequency mapped data; repeats the previous steps until the iFFT memory is full; converts the byte information coming serially from the iFFT memory into one-dimensional amplitude modulated ultra wideband impulses, which are serially transmitted over the hard-wired medium in a manner that is compatible with the LEC's telephone twisted pairs.

The CO 310 or DLC 400 houses a multiplexer 900 that converts the Multi-MegaBand coded noise-like signals containing data resulting from typical Internet usage back into GFP bytes by receiving the ultra wideband impulses over the hard-wired medium; then recovering the iFFT data from the ultra wideband impulses by performing an FFT on the iFFT data; mapping frequency to sub-channel; equalizing the mapped data by sub-channel; performing an iFFT; mapping the iFFT output to data symbols; de-interleaving the data symbols; decoding the symbols using a Reed Solomon decoder to provide the control data encoded bytes; and decoding the control data encoded bytes to create GFP bytes; then modulates and signals the bits onto the packet network for routing to a user's ISP. Typical Internet usage data includes, but is not limited to domain name resolutions on Domain Name Servers (DNS), transmission of browser cookies, transmission of client environment information like browser-type and version, HTTP requests such as "get and post" operations, FTP requests, Telnet requests, Post-Office Protocol (POP3) E-mail requests, etc.

The process is reversed at the LEC's central office when requests such as HTTP, FTP, Telnet, POP3 are fulfilled and responded with data packet(s) containing the requested information in a variety of formats including, but not limited to files, streams, Hyper Text Markup Language (HTML), Graphics Interchange Format (GIF), Joint Photographic Experts Group (JPEG), American Standard Code for Information Interchange (ASCII), Tag Image File Format (TIFF), Portable Document Format (PDF), Motion Pictures Expert Group (MPEG), MPEG 1 Audio Layer 3 (MP3), binary, etc.

The CO's 310 or DLC's 400 multiplexer 900 converts the data packet bytes into amplitudes for ultra wideband impulses, and serially transmits signal ultra wideband impulses over the LEC's switched network Multi-Mega-Band coded noise to the original web page requester.

The requester's line interface device 361 detects the received signal, demodulates the ultra wideband impulses, and converts ultra wideband impulses to bytes and subsequently bits, to be forwarded to the PC by modulating them over the network or bus as described above.

The PC's browser processes the HTML tags and formats the web page for display on the PC's monitor. The PC browser may invoke a plurality of "plugins" to provide additional functionality and to display data formats other than HTML. For example, Adobe Acrobat to display PDF files or Windows Media Player for MPEG and MP3 files and streams.

This entire process may be repeated several times in order to retrieve a single web page, or transmit other types of digital data at high speeds, such as, but not limited to, voice, music, video, software, communicate with an Application Service Provider (ASP), video conferencing, etc.

The PSTN as shown in FIG. 3 and FIG. 4 can provide a number of interface points between communication systems running on standard communication systems over fiber, wireless, and wired medium and the present invention which is a UWB over a wired communication system. These non-UWB pulse or impulse based communication systems can be running communication protocols such as, but not limited to, MOCA, Home PNA, HomePlug Standard, tZero Ultra-MIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4k (V.32bis), Modem 19.2k (V.32terbo), Modem 28.8k (V.34), Modem 33.6k (V.34plus/V.34bis), Modem 56k (V.90), and Modem 56k (V.92), 64k ISDN and 128k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, Local-Talk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The present invention can provide an interface at points to non-UWB pulse or impulse based communication systems, such as, but not limited to, the tandem office 305, DSLAM 311, multiplexer 900, DLC 400, or on a customer's premise at interface device 361, etc.

The ultra wideband over wired medium portion of the PSTN running equipment based on the present invention as shown in FIG. 3 and FIG. 4 is a dumb transport running a protocol capable of encapsulation, such as, but not limited to GFP, and can encapsulate any standard communication technology and transport data packets or streams onto hardwired portions of the network operating the present invention, which may be running one or more frequency based and/or time based and/or code based channels. These non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, $I^2C$, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

In addition, fiber portions of the PSTN shown in FIG. 3 and FIG. 4 can be configured to encapsulate a communication system standard on variable pulse or impulse encoded fiber. These non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b)

800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

Figure 5:
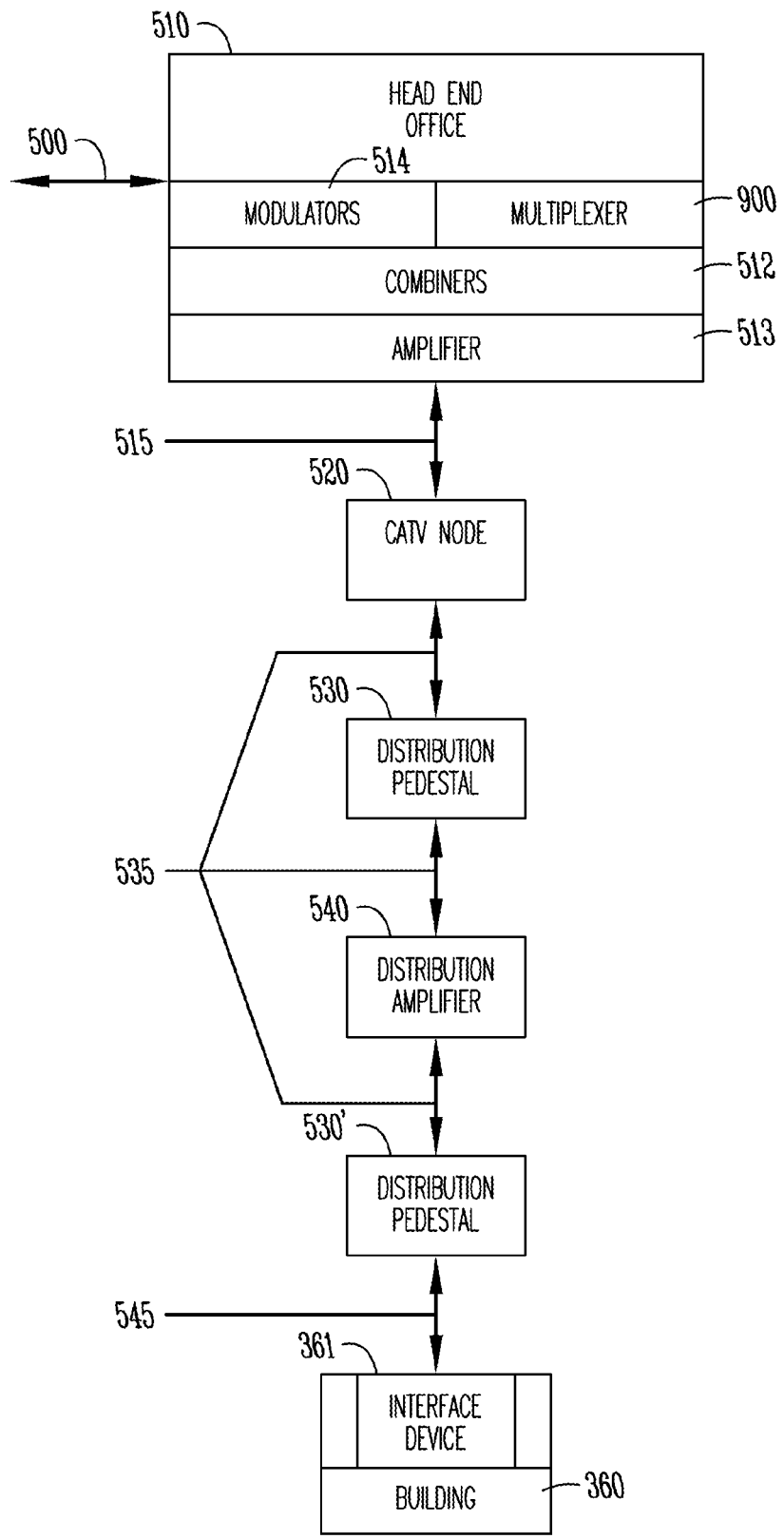
FIG. 5 is an illustration of a CATV and CATV/Power Line network topology configured in accordance with an alternate embodiment of the present invention.

FIG. 5 illustrates an alternate embodiment of the present invention, and is a Cable Television network (CATV), which may operate a single, or a plurality of shared multiplexed downstreams and upstreams of ultra wideband pulses or impulses. The ultra wideband signals can co-exist on the same coax in the same frequency range of other narrow band or wideband signals, or in notched frequency ranges separate from other narrow band or wideband signals. The CATV network may be operating narrow band voice, video, and data traffic by means other than the ultra wideband pulse or impulse transmissions of the present invention. In addition, these pulses or impulses may be alternating counter pulses or impulses.

Cable television networks are generally categorized by their overall bandwidth, which equates to the total number of channels they can transmit. Older systems are designated as 330 MHz and 550 MHz. Newer systems are designated as 750 MHz, 860 MHz, and 1 GHz. CATV networks use coaxial, and/or fiber optic cable to distribute video, audio, and data signals to homes or other establishments that subscribe to the service. Systems with bi-directional capability can also transmit signals from various points within the cable network to a central originating point.

CATV distribution systems typically use leased space on utility poles owned by a telephone or power distribution company. In areas with underground utilities, CATV systems are normally installed either in conduits, or buried directly, depending on local building codes and soil conditions.

An alternate embodiment of the present invention is a typical CATV all-coax network, as shown in FIG. 5, with the addition of a multiplexer 900. The Head End Office 510 is the central originating point of all signals carried throughout the CATV network that connects the CATV network to programming via transmission medium 500, which may be fiber optic cable, and/or a wireless system, such as, but not limited to satellites, and/or media servers, etc. Transmission medium 500 may also be used to connect to data sources for cable line interface device 361 customers through an Internet Service Provider (ISP), Application Service Provider (ASP), to peering points, such as, but not limited to another computer, a server farm, and data reverberating.

Head End Office 510 is the multiplexing and switching center for the CATV network. The Head End Office 510 can also be a co-location point for an ISP. The Head End Office 510 houses modulators 514 to receive input baseband signals from transmission medium 500, and generate a high-quality vestigial sideband TV signal for output to a combiner 512. Combiners 512 are used to combine several signals into a single output with a high degree of isolation between inputs. The Head End Office 510 will also be the co-location point for the present invention's multiplexer 900. This equipment generates, modulates, transmits, and receives data signals from a customer, switched networks, such as but not limited to the PSTN, and data packet networks, such as, but not limited to the Internet. The signals from the combiners 512 are fed to an amplifier 513 that is a low noise, high gain amplifier that also stabilizes the level of VHF and UHF channel output signals.

The amplifier 513 sends and receives multiplexed, analog and/or digital data streams to and from the distribution network. CATV networks are specialized systems for transmitting numerous television channels in a sealed spectrum, rather than a general-purpose communications medium, so the topology of the network is designed for maximum distribution efficiency, and is called a tree-and-branch architecture. Signals from the Head End Office 510 are routed over transmission medium 515, which is coaxial cable to CATV node 520. CATV node 520 is a main distribution point in a CATV network to the various branches that serve smaller geographical areas. The CATV node 520 relays signals via a serial distribution system of distribution pedestals 530, 530', distribution amplifiers 540, to a customer's drop 545, via feeder distribution network 535. The present invention is also applicable to CATV networks configured in a ring topology.

The customer's drop 545 is connected to a interface device 361, which can be equipment, such as, but not limited to, a CATV splitter, from which coaxial cable in building 360 may terminate directly into the television receiver on 12-channel systems, or into a converter where more than 12 channels are provided. Most modern receivers and videocassette recorders are "cable-ready" and include the necessary converters to access the additional system channels. Systems providing pay services may require a descrambler, or other form of converter, in the subscriber's home to allow the viewer to receive these special services. Newer cable systems use addressable converters or descramblers, giving the cable operator control over the channels received by subscribers. This control enables services such as per-view pay without the need for a technician to visit the home, or business, to install the special service. In addition, the customer drop 545 may terminate at an interface device 361, as shown in FIG. 10.

The CATV network described in FIG. 5 will continue to provide their normal media and data services over their network. In addition, the multiplexer 900 in the Head End Office 510 will generate ultra wideband transmissions over the CATV network operating near, or in the noise level in order to create additional channels for greater bandwidth. The ultra wideband pulses or impulses may be non-convolved, or convolved prior to transmission.

In addition, once inside building 360, high data rate Home PNA-type systems can be built using the ultra wideband pulse or impulse transmissions of the present invention over telephone twisted pairs or electrical wiring The following is an example of retrieving an Internet web page using the CATV embodiment of the present invention as shown in FIG. 5 A user with the service of the present invention over their CATV provider's network wishes to use their PC to access a web page from a remote server. The client device, such as, but not limited to a PC, is connected, either internally or externally to a stand-alone line interface device 361, as shown in FIG. 10, or integrated into a device.

The PC uses Internet browser software, such as, but not limited to Microsoft Internet Explorer 6.0, in order to initiate the following steps that would generally be required to connect to the remote server using a standard client-server architecture, using a line interface device 361, as shown in FIG. 10, for access to the Internet over a CATV network, through an Internet Service Provider (ISP) using MegaBand in order to retrieve the following file.

The browser breaks the Uniform Resource Locator (URL) into 3 parts:
  The communication protocol to be used: Hyper Text Transfer Protocol (HTTP)
  The server name to be accessed.
  The requested file.
The PC's communication software creates a data packet using TCP/IP stack protocol
The PC's communication software encapsulates the TCP/IP data packet in Point-to-Point Protocol (PPP), which is an established standard for the assignment and management of IP addresses, asynchronous (start/stop) and bit-oriented synchronous encapsulation, network protocol multiplexing, link configuration, link quality testing, error detection, and option negotiation for such capabilities as network layer address negotiation and data-compression negotiation.
The PC sends the TCP/IP data packet encapsulated in PPP to a line interface device 361, as shown in FIG. 10, which is a full-duplex device, in order to transmit and receive digital information over twisted telephone pairs.
The PC can transmit TCP/IP data packets over a plurality of methods to the line interface device 361, as shown in FIG. 10, including but not limited to local and external buses such as Peripheral Component Interconnect (PCI), Advanced TCA, Industry Standard Architecture (ISA), Ethernet, Infiniband, Universal Serial Bus (USB), serial or parallel, 802.11 wireless, Bluetooth, etc. The line interface device 361, as shown in FIG. 10 may be stand alone or integrated into another device.
The line interface device 361, as shown in FIG. 10, converts the byte information contained in the data packet into time delays for ultra wideband pulses or impulses, modulates the ultra wideband pulses or impulses in a manner that is compatible with the CATV provider's coaxial cable, and serially transmits signal ultra wideband pulses or impulses over the CATV provider's network as a PN coded noise-like signals.
The Head End office 510 houses a multiplexer 900 that converts the PN coded noise-like signals containing data resulting from typical Internet usage back into bytes, the bytes into individual bits, then modulates and signals the bits onto the packet network for routing to a user's ISP. Typical Internet usage data includes, but is not limited to domain name resolutions on Domain Name Servers (DNS), transmission of browser cookies, transmission of client environment information like browser-type and version, HTTP requests such as "get and post" operations, FTP requests, Telnet requests, Post-Office Protocol (POP3) E-mail requests, etc.
The process is reversed at the CATV Head End office 510 when requests such as HTTP, FTP, Telnet, POP3 are fulfilled and responded with data packet(s) containing the requested information in a variety of formats including, but not limited to files, streams, Hyper Text Markup Language (HTML), Graphics Interchange Format (GIF), Joint Photographic Experts Group (JPEG), American Standard Code for Information Interchange (ASCII), Tag Image File Format (TIFF), Portable Document Format (PDF), Motion Pictures Expert Group (MPEG), MPEG 1 Audio Layer 3 (MP3), binary, etc.

The Head End office's 510 multiplexer 900 converts the data packet bytes into time delays for ultra wideband pulses or impulses, and serially transmits signal ultra wideband pulses or impulses over the CATV provider's network as pseudo-random coded noise to the original web page requester.

The requester's line interface device 361 receives the ultra wideband signal using as an example, but not limited to, peak detection, or a decision feedback equalizer using symbol recognition, demodulates the ultra wideband pulses or impulses, converts ultra wideband pulses or impulses to bytes and subsequently bits, to be forwarded to the PC by modulating them over the network or bus as described above.

The PC's browser processes the HTML tags and formats the web page for display on the PC's monitor. The PC browser may invoke a plurality of "plugins" to provide additional functionality and to display data formats other than HTML. For example, Adobe Acrobat to display PDF files or Windows Media Player for MPEG and MP3 files and streams.

Alternatively, the same process as above can be accomplished using Multi-MegaBand as follows:

The browser breaks the Uniform Resource Locator (URL) into 3 parts:
  The communication protocol to be used: Hyper Text Transfer Protocol (HTTP)
  The server name to be accessed.
  The requested file.

The PC's communication software creates a data packet using TCP/IP stack protocol The PC's communication software encapsulates the TCP/IP data packet in Point-to-Point Protocol (PPP), which is an established standard for the assignment and management of IP addresses, asynchronous (start/stop) and bit-oriented synchronous encapsulation, network protocol multiplexing, link configuration, link quality testing, error detection, and option negotiation for such capabilities as network layer address negotiation and data-compression negotiation.

The PC sends the TCP/IP data packet encapsulated in PPP to a line interface device 361, as shown in FIG. 10, which is a full-duplex device, in order to transmit and receive digital information over coaxial cables.

The PC can be transmit TCP/IP data packets over a plurality of methods to the line interface device 361, as shown in FIG. 10, including but not limited to local and external buses such as Peripheral Component Interconnect (PCI), Advanced TCA, Industry Standard Architecture (ISA), Ethernet, Infiniband, Universal Serial Bus (USB), serial or parallel, 802.11 wireless, Bluetooth, etc. The line interface device 361, as shown in FIG. 10 may be stand alone or integrated into another device. The line interface device 361, as shown in FIG. 10, is configured for Multi-MegaBand operations and receives a stream of binary data; frames the stream of data using Generic Frame Protocol (GFP); encodes the GFP bytes with control data to provide control data encoded bytes; encodes the control data encoded bytes with a Reed Solomon encoder to provide Reed Solomon encoded data; interleaves the Reed Solomon encoded data; determines bit loading per frequency bin based on channel estimation data to create a data symbol; performs a Fast Fourier Transform (FFT) on the interleaved data symbol array; maps FFT data output sub-channel to a frequency bin to provide frequency mapped data; performs an Inverse Fast Fourier Transform (iFFT) on the frequency mapped data; repeats the previous steps until the iFFT memory is full; converts the byte information coming serially from the iFFT memory into one-dimensional amplitude modulated ultra wideband impulses, which are serially transmitted over the hard-wired medium in a manner that is compatible with the CATV coaxial cables.

The Head End office 510 houses a multiplexer 900 that converts the Multi-MegaBand coded noise-like signals containing data resulting from typical Internet usage back into GFP bytes by receiving the ultra wideband impulses over the hard-wired medium; then recovering the iFFT data from the ultra wideband impulses by performing an FFT on the iFFT data; mapping frequency to sub-channel; equalizing the mapped data by sub-channel; performing an iFFT; mapping the iFFT output to data symbols; de-interleaving the data symbols; decoding the symbols using a Reed Solomon decoder to provide the control data encoded bytes; and decoding the control data encoded bytes to create GFP bytes; then modulates and signals the bits onto the packet network for routing to a user's ISP. Typical Internet usage data includes, but is not limited to domain name resolutions on Domain Name Servers (DNS), transmission of browser cookies, transmission of client environment information like browser-type and version, HTTP requests such as "get and post" operations, FTP requests, Telnet requests, Post-Office Protocol (POP3) E-mail requests, etc.

The process is reversed at the CATV Head End when requests such as HTTP, FTP, Telnet, POP3 are fulfilled and responded with data packet(s) containing the requested information in a variety of formats including, but not limited to files, streams, Hyper Text Markup Language (HTML), Graphics Interchange Format (GIF), Joint Photographic Experts Group (JPEG), American Standard Code for Information Interchange (ASCII), Tag Image File Format (TIFF), Portable Document Format (PDF), Motion Pictures Expert Group (MPEG), MPEG 1 Audio Layer 3 (MP3), binary, etc.

The CATV Head End office 510 multiplexer 900 converts the data packet bytes into amplitudes for ultra wideband impulses, and serially transmits signal ultra wideband impulses over the CATV network as Multi-MegaBand coded noise to the original web page requester.

The requester's line interface device 361 detects the received signal, demodulates the ultra wideband impulses, and converts ultra wideband impulses to bytes and subsequently bits, to be forwarded to the PC by modulating them over the network or bus as described above.

The PC's browser processes the HTML tags and formats the web page for display on the PC's monitor. The PC browser may invoke a plurality of "plugins" to provide additional functionality and to display data formats other than HTML. For example, Adobe Acrobat to display PDF files or Windows Media Player for MPEG and MP3 files and streams.

This entire process may be repeated several times in order to retrieve a single web page, or transmit other types of digital data at high speeds, such as, but not limited to, voice, music, video, software, communicate with an Application Service Provider (ASP), video conferencing, etc.

The CATV network as shown in FIG. 5 can provide a number of interface points between communication systems running on standard communication systems over fiber, wireless, and wired medium and the present invention which is a UWB over a wired communication system. These non-UWB pulse or impulse based communication systems can be running communication protocols such as, but not limited to, MOCA, Home PNA, HomePlug Standard, tZero Ultra-MIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000baseX), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MACPHY) protocols including, but not limited to, XGMII, RGMII, SGMII, GMII, MII, TBI, RTBI, AUI, XAUI, PCB Level Control protocols including, but not limited to, SPI, I$^2$C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The present invention can provide an interface at points, such as, but not limited to, the Head End office 510, CATV node 520, multiplexer 900, or on a customer's premise at interface device 361, etc.

The ultra wideband over wired medium portion of the CATV running equipment based on the present invention as shown in FIG. 5 is a dumb transport running a protocol capable of encapsulation, such as, but not limited to GFP, and can encapsulate any standard communication technology and transport data packets or streams onto hardwired portions of the network operating the present invention, which may be running one or more frequency based and/or time based and/or code based channels. These non-UWB pulse or impulse based communication protocols include, but are not limited to, MOCA, Home PNA, HomePlug Standard, tZero Ultra-MIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000baseX), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

In addition, fiber portions of the CATV network shown in FIG. 5 can be configured to encapsulate a communication system standard on variable pulse or impulse encoded fiber. These non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

FIG. 5 also illustrates an alternate embodiment of the present invention, and is a Cable Television network (CATV) combined with an electrical power distribution network, which may operate a single, or a plurality of shared multiplexed downstreams and upstreams of ultra wideband pulses or impulses. The ultra wideband signals can co-exist on the same coax in the same frequency range of other narrow band or wideband signals, or in notched frequency ranges separate from other narrow band or wideband signals. The CATV/electrical power distribution network may be operating narrow band voice, video, and data traffic by means other than the ultra wideband pulse or impulse transmissions of the present invention. In addition, these pulses or impulses may be alternating counter pulses or impulses.

Cable television networks are generally categorized by their overall bandwidth, which equates to the total number of channels they can transmit. Older systems are designated as 330 MHz and 550 MHz. Newer systems are designated as 750 MHz, 860 MHz, and 1 GHz. CATV networks use coaxial, and/or fiber optic cable to distribute video, audio, and data signals to homes or other establishments that subscribe to the service. Systems with bi-directional capability can also transmit signals from various points within the cable network to a central originating point.

CATV distribution systems typically use leased space on utility poles owned by a telephone or power distribution company. In areas with underground utilities, CATV systems are normally installed either in conduits, or buried directly, depending on local building codes and soil conditions.

The Head End Office 510 for the CATV/electrical power distribution network is the central originating point of all signals carried throughout the CATV/electrical distribution network that connects the CATV/electrical power distribution network to programming via transmission medium 500, which may be fiber optic cable, and/or a wireless system, such as, but not limited to satellites, and/or media servers, etc. Transmission medium 500 may also be used to connect to data sources for cable line interface device 361 customers through an Internet Service Provider (ISP), Application Service Provider (ASP), to peering points, such as, but not limited to another computer, a server farm, and data reverberating.

Head End Office 510 for the CATV/electrical power distribution network is the multiplexing and switching center for the CATV/electrical power distribution network. The Head End Office 510 for the CATV/electrical power distribution network can also be a co-location point for an ISP. The Head End Office 510 for the CATV/electrical power distribution network houses modulators 514 to receive input baseband signals from transmission medium 500, and generate a high-quality vestigial sideband TV signal for output to a combiner 512. Combiners 512 are used to combine several signals into a single output with a high degree of isolation between inputs. The Head End Office 510 for the CATV/electrical power distribution network will also be the co-location point for the present invention's multiplexer 900. This equipment generates, modulates, transmits, and receives data signals from a customer, switched networks, such as but not limited to the PSTN, and data packet networks, such as, but not limited to the Internet. The signals from the combiners 512 are fed to an amplifier 513 that is a low noise, high gain amplifier that also stabilizes the level of VHF and UHF channel output signals.

The amplifier 513 sends and receives multiplexed, analog and/or digital data streams to and from the CATV/electrical power distribution network. Signals from the Head End Office 510 for the CATV/electrical power distribution network are routed over transmission medium 515, which is coaxial cable to CATV node 520. CATV node 520 is a main distribution point in a CATV/electrical power distribution network to the various branches that serve smaller geographical areas. The CATV node 520 relays signals via a serial distribution system of distribution pedestals 530, 530', distribution amplifiers 540, to a customer's drop 545, via feeder distribution network 535. The customer's drop 545 can be telephone twisted pair (TTP), coax, or a low voltage power line. The feeder distribution network 535 for this embodiment of the present can be either fiber or electrical power distribution lines.

The customer's drop 545 is connected to a interface device 361, which can be equipment, such as, but not limited to, a CATV splitter, from which coaxial cable in xbuilding 360 may terminate directly into the television receiver on 12-channel systems, or into a converter where more than 12 channels are provided. Most modern receivers and videocassette recorders are "cable-ready" and include the necessary converters to access the additional system channels. Systems providing pay services may require a descrambler, or other form of converter, in the subscriber's home to allow the viewer to receive these special services. Newer cable systems use addressable converters or descramblers, giving the cable operator control over the channels received by subscribers. This control enables services such as per-view pay without the need for a technician to visit the home, or business, to install the special service. In addition, the customer drop 545 may terminate at an interface device 361, as shown in FIG. 10.

The CATV/electrical power distribution network described in FIG. 5 will continue to provide their normal media and data services over their network. In addition, the multiplexer 900 in the Head End Office 510 will generate ultra wideband transmissions over the CATV network operating near, or in the noise level in order to create additional channels for greater bandwidth. The ultra wideband pulses or impulses may be non-convoled, or convoled prior to transmission.

In addition, once inside building 360, high data rate Home PNA-type systems can be built using the ultra wideband pulse or impulse transmissions of the present invention over telephone twisted pairs or electrical wiring The following is an example of retrieving an Internet web page using the CATV/electrical power distribution network embodiment of the present invention as shown in FIG. 5 a user with the service of the present invention over their provider's CATV/electrical power distribution network wishes to use their PC to access a web page from a remote server. The client device, such as, but not limited to a PC, is connected, either internally or externally to a stand-alone line interface device 361, as shown in FIG. 10, or integrated into a device.

The PC uses Internet browser software, such as, but not limited to Microsoft Internet Explorer 6.0, in order to initiate the following steps that would generally be required to connect to the remote server using a standard client-server architecture, using a line interface device 361, as shown in FIG. 10, for access to the Internet over a CATV/electrical power distribution network, through an Internet Service Provider (ISP) in order to retrieve the following file.

The browser breaks the Uniform Resource Locator (URL) into 3 parts:
The communication protocol to be used: Hyper Text Transfer Protocol (HTTP)
The server name to be accessed.
The requested file.
The PC's communication software creates a data packet using TCP/IP stack protocol
The PC's communication software encapsulates the TCP/IP data packet in Point-to-Point Protocol (PPP), which is an established standard for the assignment and management of IP addresses, asynchronous (start/stop) and bit-oriented synchronous encapsulation, network protocol multiplexing, link configuration, link quality testing, error detection, and option negotiation for such capabilities as network layer address negotiation and data-compression negotiation.
The PC sends the TCP/IP data packet encapsulated in PPP to a line interface device 361, as shown in FIG. 10, which is a full-duplex device, in order to transmit and receive digital information over twisted telephone pairs.
The PC can transmit TCP/IP data packets over a plurality of methods to the line interface device 361, as shown in FIG. 10, including but not limited to local and external buses such as Peripheral Component Interconnect (PCI), Advanced TCA, Industry Standard Architecture (ISA), Ethernet, Infiniband, Universal Serial Bus (USB), serial or parallel, 802.11 wireless, Bluetooth, etc. The line interface device 361, as shown in FIG. 10 may be stand alone or integrated into another device.
The line interface device 361, as shown in FIG. 10, converts the byte information contained in the data packet into time delays for ultra wideband pulses or impulses, modulates the ultra wideband pulses or impulses in a manner that is compatible with the CATV/electrical power distribution network's coaxial cable, and serially transmits signal ultra wideband pulses or impulses over the CATV/electrical power distribution network's network as a PN coded noise-like signals.
The Head End office 510 for the CATV/electrical power distribution network houses a multiplexer 900 that converts the PN coded noise-like signals containing data resulting from typical Internet usage back into bytes, the bytes into individual bits, then modulates and signals the bits onto the packet network for routing to a user's ISP. Typical Internet usage data includes, but is not limited to domain name resolutions on Domain Name Servers (DNS), transmission of browser cookies, transmission of client environment information like browser-type and version, HTTP requests such as "get and post" operations, FTP requests, Telnet requests, Post-Office Protocol (POP3) E-mail requests, etc.
The process is reversed at the CATV Head End office 510 for the CATV/electrical power distribution network when requests such as HTTP, FTP, Telnet, POP3 are fulfilled and responded with data packet(s) containing the requested information in a variety of formats including, but not limited to files, streams, Hyper Text Markup Language (HTML), Graphics Interchange Format (GIF), Joint Photographic Experts Group (JPEG), American Standard Code for Information Interchange (ASCII), Tag Image File Format (TIFF), Portable Document Format (PDF), Motion Pictures Expert Group (MPEG), MPEG 1 Audio Layer 3 (MP3), binary, etc.
The Head End office 510 for the CATV/electrical power distribution network's multiplexer 900 converts the data packet bytes into time delays for ultra wideband pulses or impulses, and serially transmits signal ultra wideband pulses or impulses over the CATV/electrical power distribution network to the original web page requester.
The requester's line interface device 361 receives the ultra wideband signal using as an example, but not limited to, peak detection, or a decision feedback equalizer using symbol recognition, demodulates the ultra wideband pulses or impulses, converts ultra wideband pulses or impulses to bytes and subsequently bits, to be forwarded to the PC by modulating them over the network or bus as described above.
The PC's browser processes the HTML tags and formats the web page for display on the PC's monitor. The PC browser may invoke a plurality of "plugins" to provide additional functionality and to display data formats other than HTML. For example, Adobe Acrobat to display PDF files or Windows Media Player for MPEG and MP3 files and streams.

This entire process may be repeated several times in order to retrieve a single web page, or transmit other types of digital data at high speeds, such as, but not limited to, voice, music, video, software, communicate with an Application Service Provider (ASP), video conferencing, etc.

Alternatively, the same process as above can be accomplished using Multi-MegaBand as follows:

The browser breaks the Uniform Resource Locator (URL) into 3 parts:
  The communication protocol to be used: Hyper Text Transfer Protocol (HTTP)
  The server name to be accessed.
  The requested file.

The PC's communication software creates a data packet using TCP/IP stack protocol The PC's communication software encapsulates the TCP/IP data packet in Point-to-Point Protocol (PPP), which is an established standard for the assignment and management of IP addresses, asynchronous (start/stop) and bit-oriented synchronous encapsulation, network protocol multiplexing, link configuration, link quality testing, error detection, and option negotiation for such capabilities as network layer address negotiation and data-compression negotiation.

The PC sends the TCP/IP data packet encapsulated in PPP to a line interface device 361, as shown in FIG. 10, which is a full-duplex device, in order to transmit and receive digital information over coaxial cables.

The PC can be transmit TCP/IP data packets over a plurality of methods to the line interface device 361, as shown in FIG. 10, including but not limited to local and external buses such as Peripheral Component Interconnect (PCI), Advanced TCA, Industry Standard Architecture (ISA), Ethernet, Infiniband, Universal Serial Bus (USB), serial or parallel, 802.11 wireless, Bluetooth, etc. The line interface device 361, as shown in FIG. 10 may be stand alone or integrated into another device. The line interface device 361, as shown in FIG. 10, is configured for Multi-MegaBand operations and receives a stream of binary data; frames the stream of data using Generic Frame Protocol (GFP); encodes the GFP bytes with control data to provide control data encoded bytes; encodes the control data encoded bytes with a Reed Solomon encoder to provide Reed Solomon encoded data; interleaves the Reed Solomon encoded data; determines bit loading per frequency bin based on channel estimation data to create a data symbol; performs a Fast Fourier Transform (FFT) on the interleaved data symbol array; maps FFT data output sub-channel to a frequency bin to provide frequency mapped data; performs an Inverse Fast Fourier Transform (iFFT) on the frequency mapped data; repeats the previous steps until the iFFT memory is full; converts the byte information coming serially from the iFFT memory into one-dimensional amplitude modulated ultra wideband impulses, which are serially transmitted over the hard-wired medium in a manner that is compatible with the CATV/Electrical Power Distribution Network coaxial cables and electrical power lines.

The CATV/Electrical Power Distribution Network Head End office 510 houses a multiplexer 900 that converts the Multi-MegaBand coded noise-like signals containing data resulting from typical Internet usage back into GFP bytes by receiving the ultra wideband impulses over the hard-wired medium; then recovering the iFFT data from the ultra wideband impulses by performing an FFT on the iFFT data; mapping frequency to sub-channel; equalizing the mapped data by sub-channel; performing an iFFT; mapping the iFFT output to data symbols; de-interleaving the data symbols; decoding the symbols using a Reed Solomon decoder to provide the control data encoded bytes; and decoding the control data encoded bytes to create GFP bytes; then modulates and signals the bits onto the packet network for routing to a user's ISP. Typical Internet usage data includes, but is not limited to domain name resolutions on Domain Name Servers (DNS), transmission of browser cookies, transmission of client environment information like browser-type and version, HTTP requests such as "get and post" operations, FTP requests, Telnet requests, Post-Office Protocol (POP3) E-mail requests, etc.

The process is reversed at the CATV/Electrical Power Distribution Network Head End when requests such as HTTP, FTP, Telnet, POP3 are fulfilled and responded with data packet(s) containing the requested information in a variety of formats including, but not limited to files, streams, Hyper Text Markup Language (HTML), Graphics Interchange Format (GIF), Joint Photographic Experts Group (JPEG), American Standard Code for Information Interchange (ASCII), Tag Image File Format (TIFF), Portable Document Format (PDF), Motion Pictures Expert Group (MPEG), MPEG 1 Audio Layer 3 (MP3), binary, etc.

The CATV/Electrical Power Distribution Network Head End office 510 multiplexer 900 converts the data packet bytes into amplitudes for ultra wideband impulses, and serially transmits signal ultra wideband impulses over the CATV network as Multi-MegaBand coded noise to the original web page requester.

The requester's line interface device 361 detects the received signal, demodulates the ultra wideband impulses, and converts ultra wideband impulses to bytes and subsequently bits, to be forwarded to the PC by modulating them over the network or bus as described above.

The PC's browser processes the HTML tags and formats the web page for display on the PC's monitor. The PC browser may invoke a plurality of "plugins" to provide additional functionality and to display data formats other than HTML. For example, Adobe Acrobat to display PDF files or Windows Media Player for MPEG and MP3 files and streams.

This entire process may be repeated several times in order to retrieve a single web page, or transmit other types of digital data at high speeds, such as, but not limited to, voice, music, video, software, communicate with an Application Service Provider (ASP), video conferencing, etc.

The CATV/Electrical Power Distribution Network as shown in FIG. 5 can provide a number of interface points between communication systems running on standard communication system over fiber, wireless, and wired medium and the present invention which is a UWB over a wired communication system. These non-UWB pulse or impulse based communication systems can be running communication protocols such as, but not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The present invention can provide an interface at points, such as, but not limited to, the Head End office 510 for the CATV/Electrical Power Distribution Network, CATV node 520, multiplexer 900, or on a customer's premise at interface device 361, etc.

The ultra wideband over wired medium portion of the CATV/Electrical Power Distribution Network running equipment based on the present invention as shown in FIG. 5 is a dumb transport running a protocol capable of encapsulation, such as, but not limited to GFP, and can encapsulate any standard communication technology and transport data packets or streams onto hardwired portions of the network operating the present invention, which may be running one or more frequency based and/or time based and/or code based channels. These non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000baseX), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MACPHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

In addition, fiber portions of the CATV/Electrical Power Distribution Network shown in FIG. 5 can be configured to encapsulate a communication system standard on variable pulse or impulse encoded fiber. These non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

Figure 6:
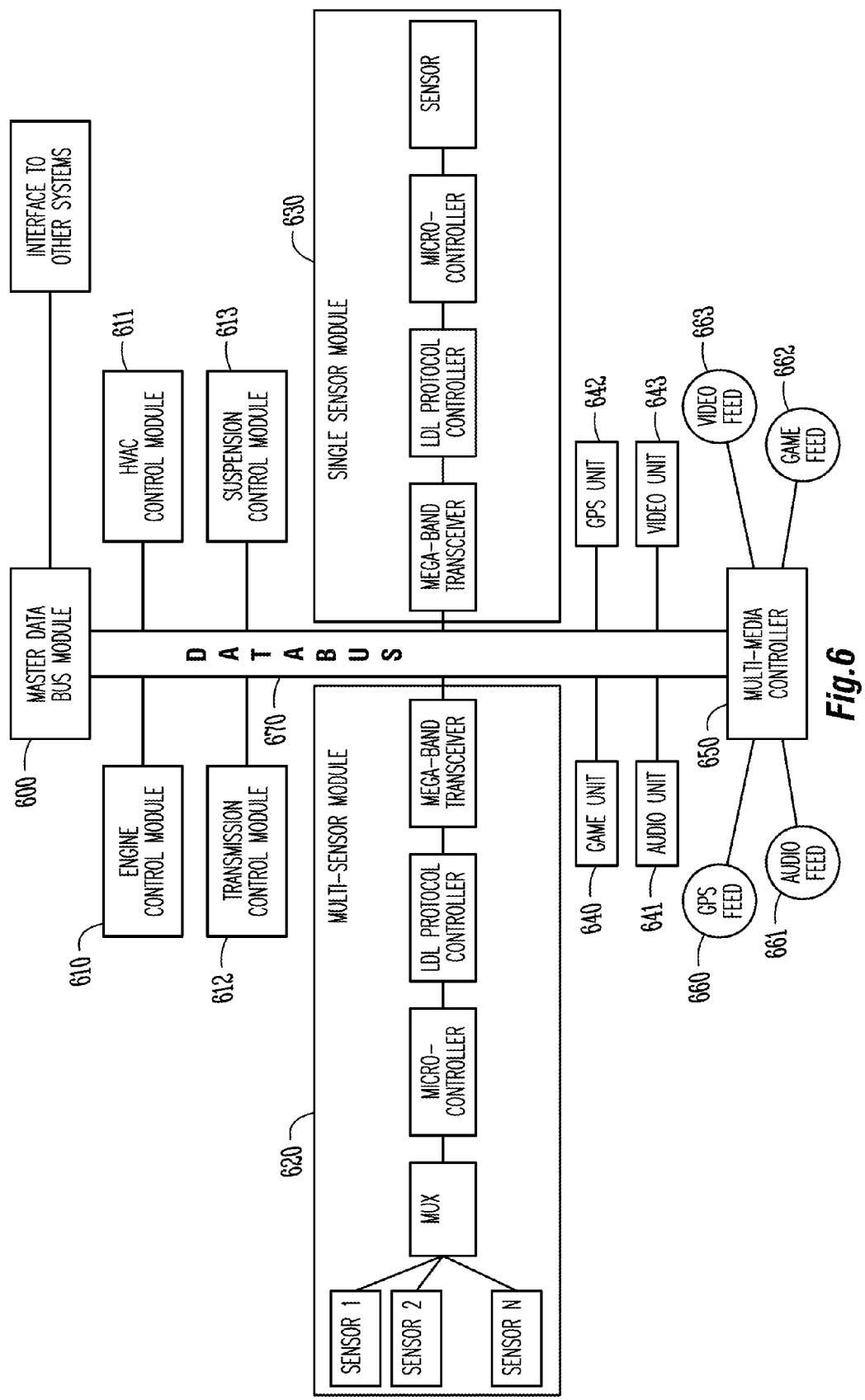
FIG. 6 is a block diagram of a data bus network topology configured in accordance with an alternate embodiment of the present invention.

FIG. 6 illustrates an embodiment of the present invention used as high speed data bus for use in an automobile for example. The inventors have tested the transmission and reception of the present inventions ultra wideband pulses or impulses signals over the metallic portions of a pick-up truck.

The data bus network may operate a single, or a plurality of shared multiplexed downstreams and upstreams of the present inventions ultra wideband pulses or impulses. The ultra wideband signals can co-exist on the same data bus medium in the same frequency range of other narrow band or wideband signals, or in notched frequency ranges separate from other narrow band or wideband signals. The data bus network may be running voice, video, and data traffic by means other than the present invention. In addition, these pulses or impulses may be alternating counter pulses or impulses. The ultra wideband pulses or impulses may be transmitted non-convolved, or convolved. The received pulses or impulses may be captured using as an example, but not limited to, peak detection, or a decision feedback equalizer using symbol recognition.

The data bus network as illustrated in FIG. 6 is comprised of various components connected to data bus 670, which is a guided media. These components include a master data bus module 600 which control various electronic control modules which are well known in the art, including, but not limited to, engine control module 610, HVAC control module 611, transmission control module 612, and suspension control module 613. In addition, master data bus module 600 controls various sensors connected to the data bus network via data bus 670, including a multi-sensor module 620, and a single sensor module 630 connected to the data bus network. Only one of each type of sensor module is shown for clarity, but in reality there can be as many as 50 sensors on a current model year vehicle. Also connected to the data bus network is a multi-media controller 650 which manages various feeds including, but not limited to a GPS feed 660, audio feed 661, game feed 662, and video feed 663, which are distributed to a game unit 640, audio unit 641, GPS unit 642, and a video unit 643 via the data bus 670.

Figure 7:
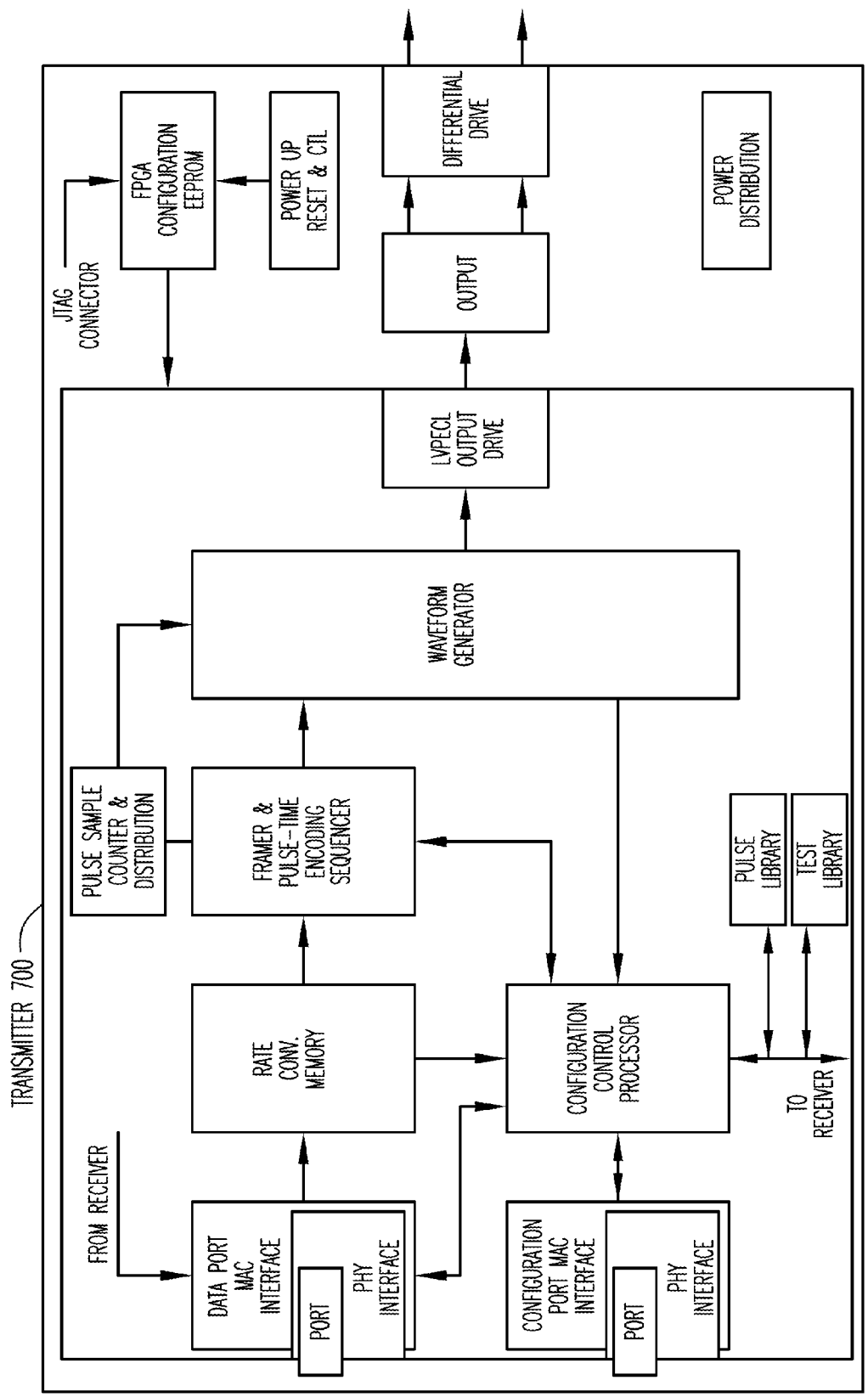
FIG. 7 is a block diagram of a transmitter according to one embodiment of the present invention.

The master data bus module 600, engine control module 610, HVAC control module 611, transmission control module 612, suspension control module 613, multi-sensor module 620, single sensor module 630, game unit 640, audio unit 641, GPS unit 642, video unit 643, and multi-media controller 650 are equipped with the present invention's transmitter and receivers as shown in FIG. 7.

Data bus 670 is shown as two conductors, but may be a single conductor. Data bus 670 can be a conductor such as a power wire, a shielded or unshielded wire, etc.

Master data base module 600 and multi-media controller 650 are the multiplexing and switching components of the data bus network.

Alternatively, the data bus network can be operated as an Ethernet.

The data bus network is protocol agnostic and use any protocol including, but not limited to, the Intelligent Transportation System Data Bus (ITSDB), and MIL-STD-1553 for military vehicles, aircraft, missiles, rockets etc.

The databus network as shown in FIG. 6 can provide a number of interface points between communication systems running on standard communication system over fiber, wireless, and wired medium and the present invention which is a UWB over a wired communication system. These non-UWB pulse or impulse based communication systems can be running communication protocols such as, but not limited to, MOCA, Home PNA, HomePlug Standard, tZero Ultra-MIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I$^2$C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

One such interface is, but not limited to, the master data bus module 600. The ultra wideband over wired medium portion of the databus network running equipment based on the present invention as shown in FIG. 6 is a dumb transport running a protocol capable of encapsulation, such as, but not limited to GFP, and can encapsulate any standard communication technology and transport data packets or streams onto hardwired portions of the network operating the present invention, which may be running one or more frequency based and/or time based and/or code based channels. These non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

In addition, fiber portions of the databus network shown in FIG. 6 can be configured to encapsulate a communication system standard on variable pulse or impulse encoded fiber. These non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

In an alternative embodiment of a data bus network in an automobile, the sensors could be powered up by wireless radio frequency energy, similar to passive Radio Frequency Identification (RFID) technology, and connected to a data bus 670 which is the metallic portions of a vehicle, including the body, frame, engine, etc. In this embodiment, expensive wiring for power and signaling could be reduced, or eliminated.

Although a data bus network in an automobile or other vehicle is illustrated in FIG. 6, one skilled in the art will recognize that data bus networks for an application such as a SCADA (Supervisory Control and Data Acquisition) application, such as, but limited to Controller Area Network Bus (CAN). In these embodiments the data bus 670 could be unique guided mediums such as, but not limited to, structural steel in a building, or the drill stem in a drilling rig application, etc.

FIG. 7 is a block diagram of a MegaBand transmitter according to one embodiment of the present invention.

Figure 8:
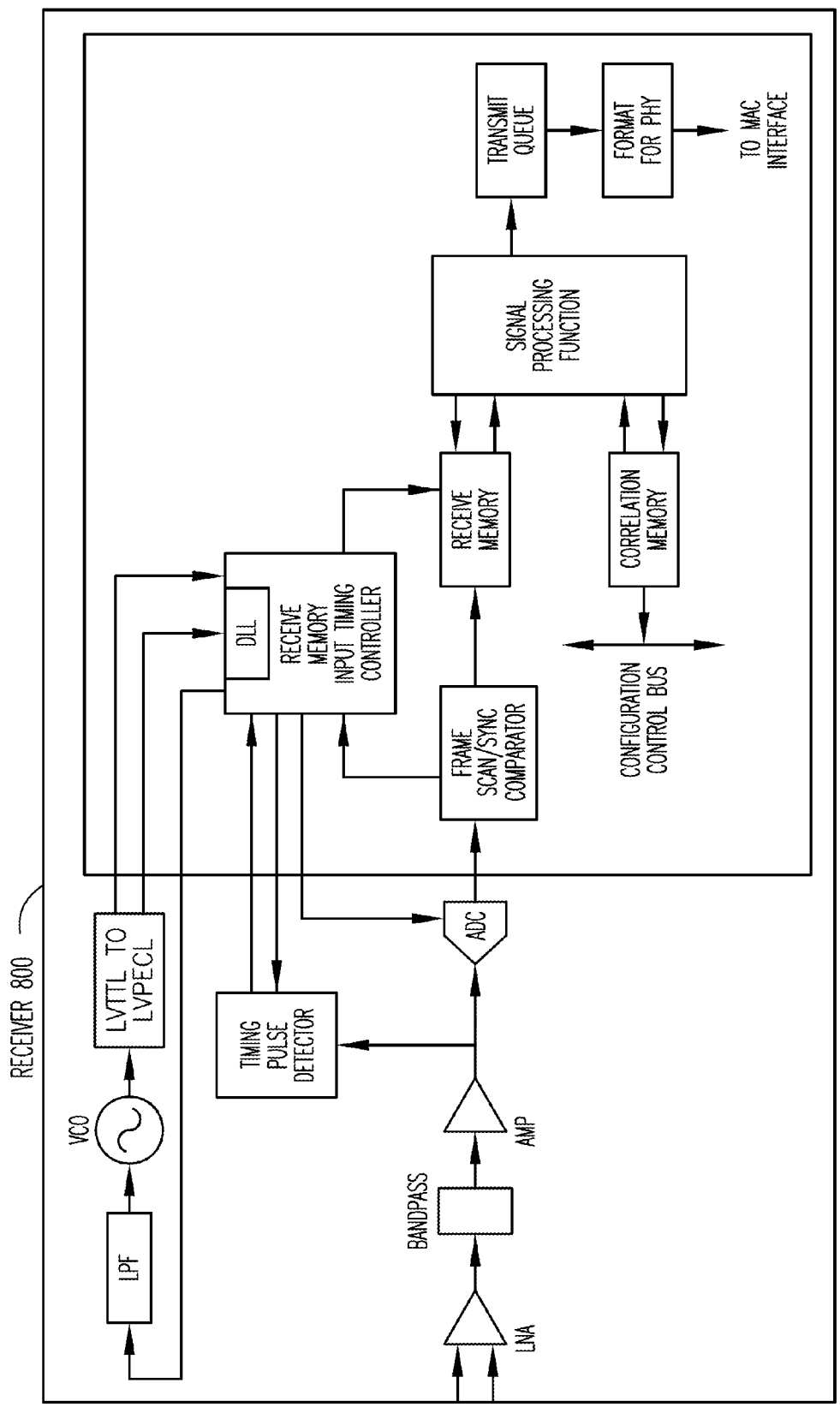
FIG. 8 is a block diagram of a receiver according to one embodiment of the present invention.

FIG. 8 is a block diagram of a MegaBand receiver according to one embodiment of the present invention. The transmitter 700 and receiver 800 of the present invention consists of the following functional items including, but not limited to, configuration, systems operations and management, ultra wideband pulses or impulses generation, ultra wideband pulses or impulses train generation, signal processing including filtering and correlation, ultra wideband pulses or impulses synchronization, software management and configuration, feature control, Ethernet configuration, development, real-time debugging capabilities, receipt and transmission of non-ultra wideband based communications, and network switching and routing capabilities.

In addition the transmitter 700 and receiver 800 are also capable of operating as an XML-aware capable switch. The XML-aware capable switch receives XML data from the ultra wideband pulses or impulses over a conductive medium modem makes decisions based on the XML header, opens the data packets, transforms or encrypts the XML data into a format that can be understood by the network, and transfers it to the non-ultra wideband pulses or impulses over wire communication modem.

Also, the XML-aware capable switch receives XML data from the non-ultra wideband pulses or impulses over wire communication modem makes decisions based on the XML header, opens the data packets, transforms or encrypts the XML data into a format that can be understood by the network, and transfers it to the ultra wideband pulses or impulses over conductive medium modem.

The XML data can be geographic data that can be used for routing and a wide variety of location-based services.

The XML data can be network timing data that can be used for routing and a wide variety of location-based services. The network timing data can originate from a GPS source.

The transmitter 700 and receiver 800 are also capable of operating as DataSpace switches as described in U.S. patent application Ser. No. 10/345,766, entitled System And Method For Storing/Caching Data On Transmission Infrastructure, which is hereby incorporated by reference in its entirety.

The transmitter 700 and receiver 800 are also capable of operating as a structured linear database-aware switch as described in U.S. Pat. Nos. 6,868,419 and 6,976,034, entitled Method of Transmitting Data Including A Structured Linear Database, which are both hereby incorporated by reference in its entirety.

The transmitter 700 and receiver 800 can be constructed of hardware and software components to create the above functionality including, but not limited to: field programmable gate arrays (FPGA), FPGA Intellectual Property cores, ASIC, processors, device drivers, digital signal processors (DSPs), Ethernet, FireWire, Open Peripheral Bus, DMA, real time operating systems (RTOS), debug ports, Microkernel, memory (RAM, ROM, Flash, disk), memory management, file management, digital to analog converters, analog to digital converters, phased-locked loops, clocks and other standard electrical components, boards and housing one skilled in the art would recognize as required to integrate components into a transmitter and receiver.

The ultra wideband transmitter 700 and receiver 800 are capable of receiving and transmitting non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I$^2$C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The ultra wideband transmitter 700 and receiver 800 are also capable of receiving and transmitting encapsulated non-UWB pulse or impulse based communication protocols encapsulated on the ultra wideband over wired medium portion of a network which include, but are not limited to, MOCA, Home PNA, HomePlug Standard, tZero Ultra-MIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The transmitter 700 and receiver 800 can be configured to be integrated into devices such as, but not limited to, modems, PC boards, cell phones, set-top boxes, televisions, GPS receivers, ATM machines, landline phones, VoIP wireless phones, VoIP landline phones, DLC equipment, digital cameras, electrical outlets, interface devices that plug into electrical outlets, iPODs, Rios, etc., DVD players/recorders, on card/board communications, on back-plane communications, RFID readers, computer mouse, PDAs, computers, laptops, notebooks, eternal hard drives, CD burners, DVD burners, gaming equipment—X Box, Nintendo, etc., camcorders, copiers, fax machines, printers, cash registers, bar code readers, LCD projectors, PBXs, home networking devices, entertainment centers, PVRs, wireless/wire line switch (couplers), sensors, clocks, audio speakers, servers, power line jumpers (breaker box), DSLAMs, ISLAMs, amplifiers, monitors, video displays, RFID tags (non-UWB), RFID tags (UWB), smart cards, Cable TV head-end and field equipment, Cable TV CPE equipment, Broadband Power Line (BPL) head-end and field Equipment, BPL CPE equipment, in-building power line communication system controllers, databus controllers, etc.

Figure 17:
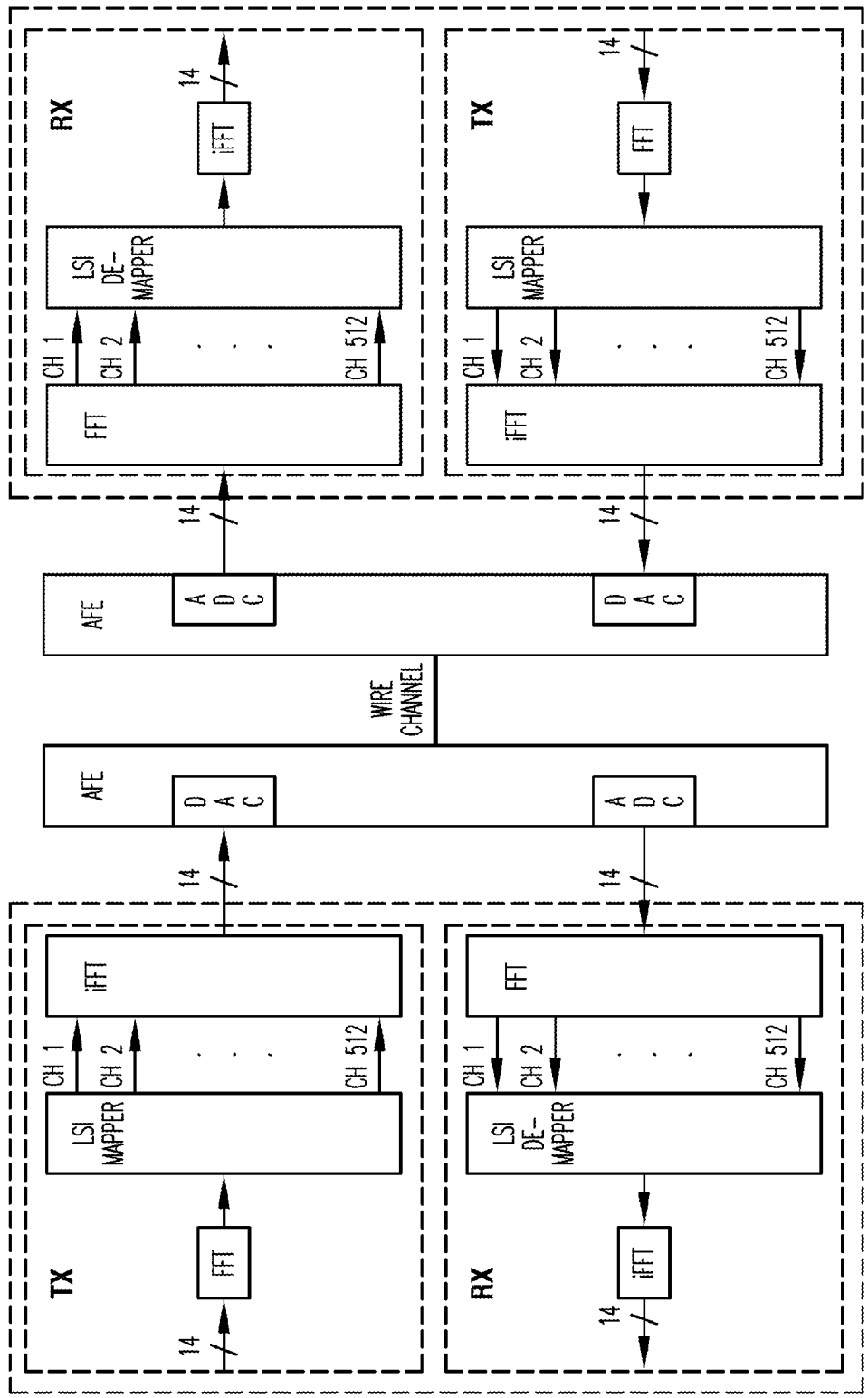
FIG. 17 illustrates a basic block diagram of the flow of the FFT/iFFT stages and how they tie into one another

FIG. 17 illustrates a basic block diagram of the flow of the FFT/iFFT stages and how they tie into each other. Both the transmitter and the receiver sections have access to all the frequency bands. Configuration parameters will dictate which frequencies are transmitted and which are received by enabling or disabling specific frequency channels.

The implementation of each Tx and Rx section consist of an FFT and an iFFT block, which will have a transform size of 32 and 16,384 respectively. This provides 512 channels, which is also the basis for the mapping function. The present invention in the Multi-MegaBand implementation may optimize the mapping function in the future as the FFT functions are constructed with input and output buffers, and also since the data being processed is real only data there is opportunity for optimization based on a transform size of 8192 with 16,384 real only inputs.

Figure 18:
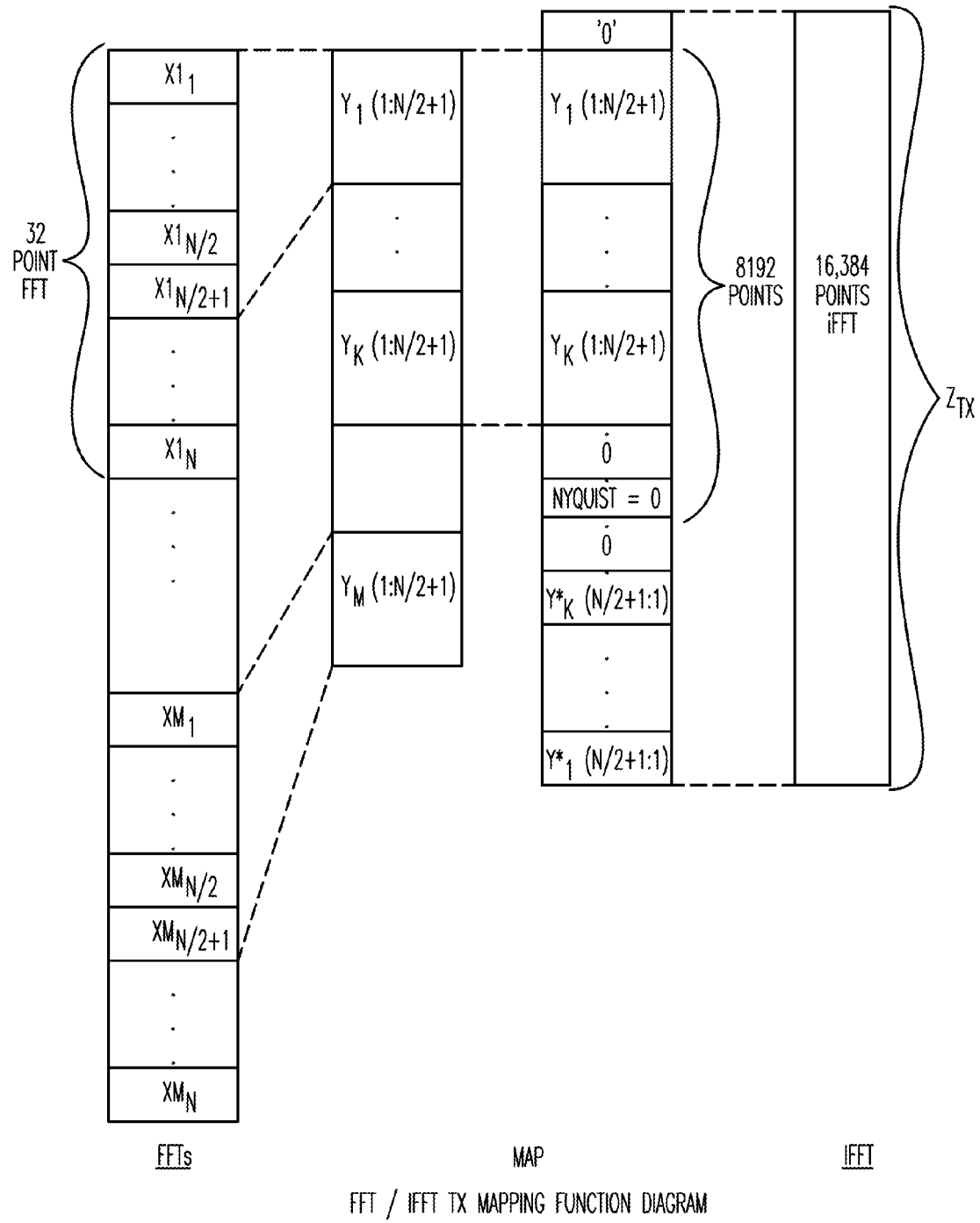
FIG. 18 illustrates the mapping relationship between the FFT and iFFT functions in the Tx PHY interface.

FIG. 18 illustrates the mapping relationship between the FFT and iFFT functions in the Tx PHY interface. X represents the real only input data to the FFT function where N is the number of FFT bins per channel and M is the number of channels. YM represents the transferred portion of the FFT output block used as the data for a specific channel. Note that Y*M is shown below merely for illustrative purposes and should not need to be explicitly stored. The sum of all the FFT bins in all the channels is always equal to the number of bins in the iFFT, or N*M. If we say that the K is the maximum number of usable channels, it is described by the following equation:

$$K = \left\lfloor \frac{\frac{N*M}{2}}{\frac{N}{2}+1} \right\rfloor$$

For the current version of the present invention, N=32 and M=512, therefore K=481. ZTx is the real only transmitted output.

On the Rx PHY side the Tx process as shown in FIG. 18 would be reversed replacing the iFFT with an FFT and the FFT with an iFFT as shown in FIG. 17. In actual practice, the goal would be to make Tx and Rx the same core while allowing for separate Tx and Rx parameters.

On the Tx side, pre-emphasis is required, which is a gain gradient applied across all channels. This gradient is currently a linear function with a definable slope where each point on the slope is equal to the gain of a specific channel, which is a net effect that provides gain control across frequencies.

On the Rx side, equalization will be applied in the frequency domain also on a per channel basis.

The system captures training data from time to time on each channel in order to calculate and update complex frequency domain coefficients. Each set of coefficients is derived from 32 complex values captured on each of the 512 channels. The reciprocal of these 32 complex values will be the 32 coefficients used for that channel's output from the 16K FFT. For the Multi-MegaBand implementation of the present invention, this calculation is performed in software, but in the future it will likely be a hardware function that will allow the calculation to be performed more quickly and more frequently.

The Multi-MegaBand embodiment of the present invention is very elegant. It provides precise dynamic spectrum control of the overall channel in response to the channel estimation, while also providing precise dynamic logical control of the multiple Multi-MegaBand channels of users, devices, bandwidth, and Quality of Service (QoS).

Figure 19A:
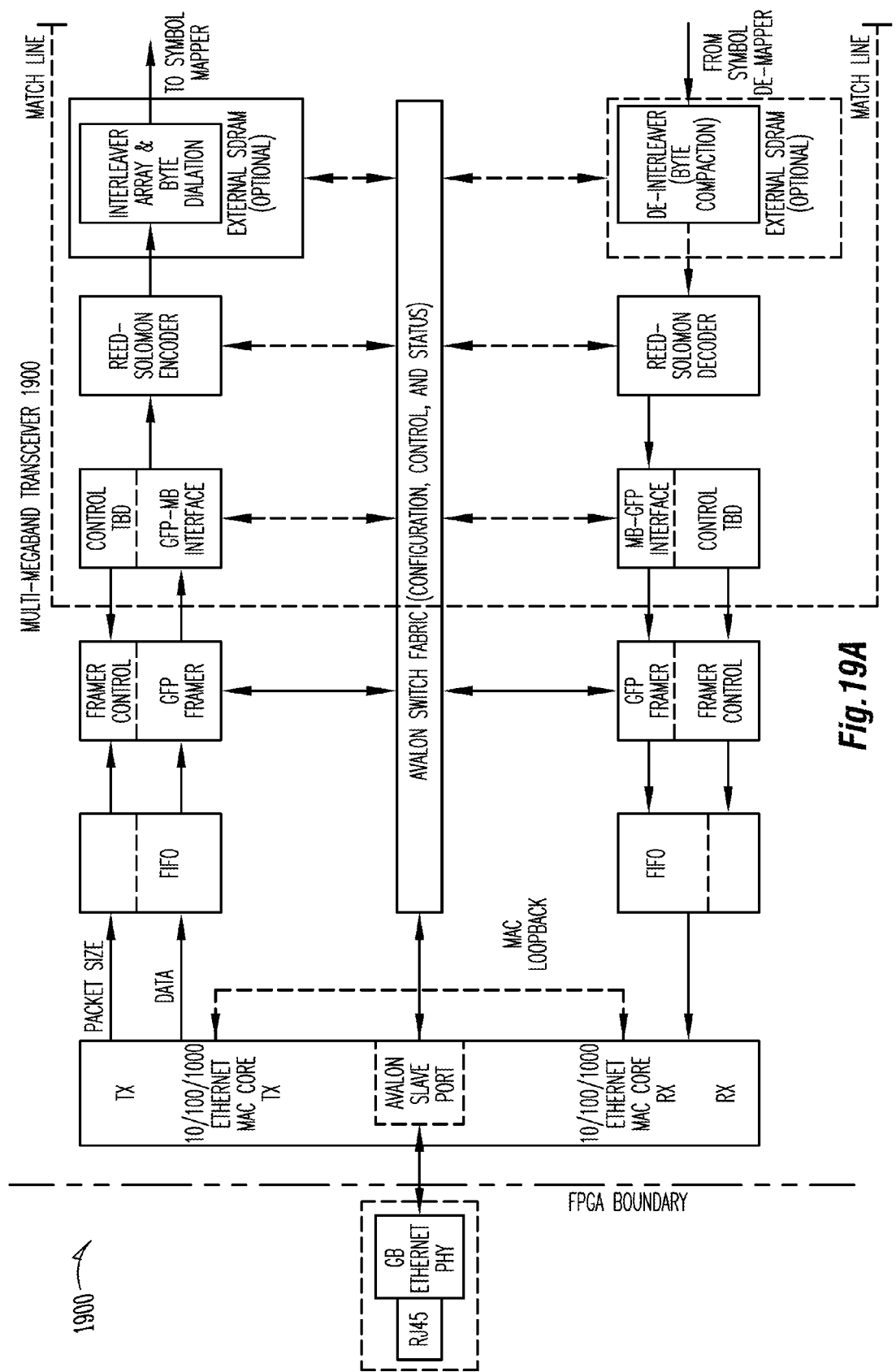
FIG. 19A is a block diagram of a Multi-MegaBand transceiver according to one embodiment of the present invention.
Figure 19B:
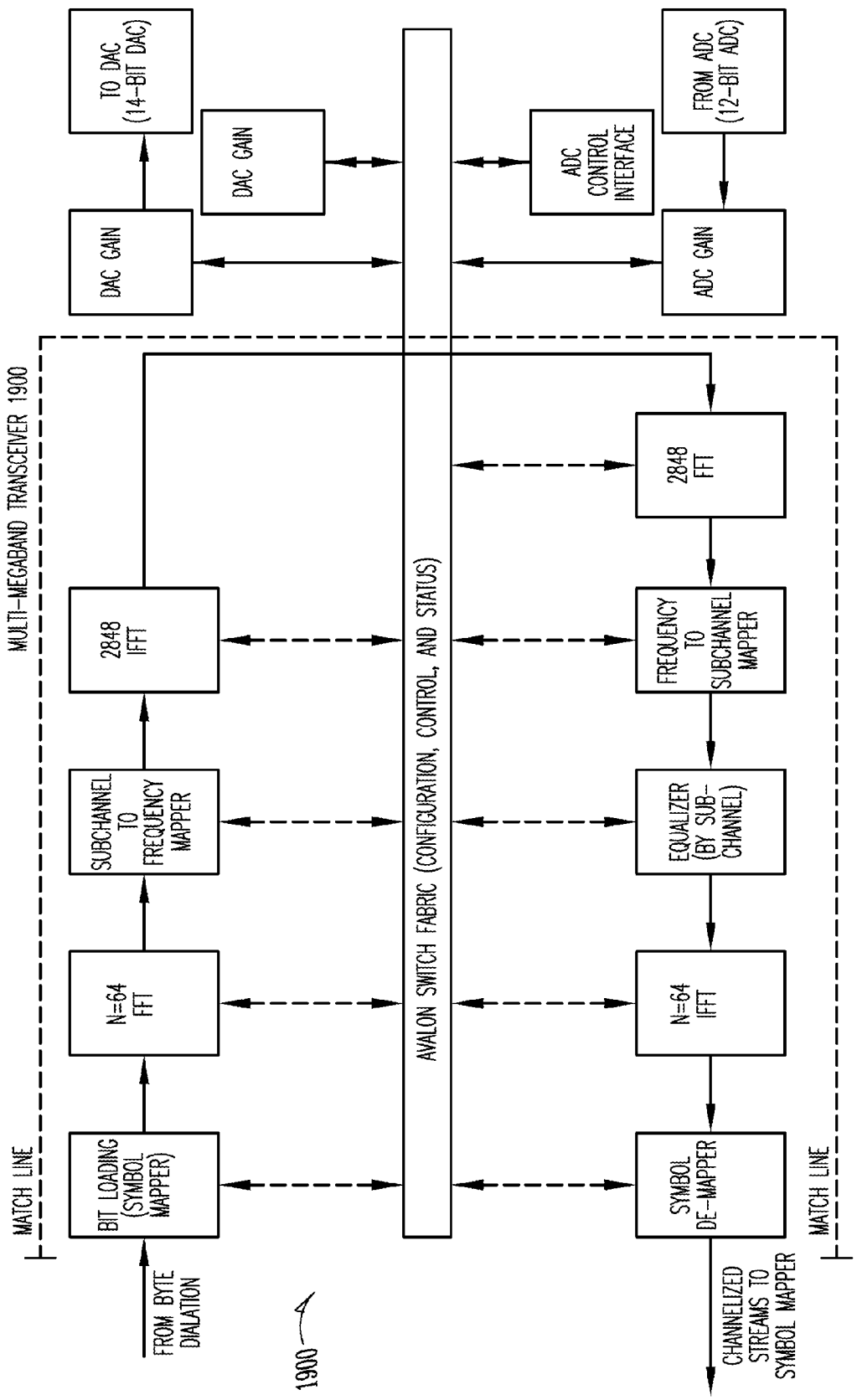
FIG. 19B is a continuation of the block diagram in FIG. 19A of a Multi-MegaBand transceiver according to one embodiment of the present invention.

FIGS. 19A and 19B is a block diagram of a Multi-MegaBand transceiver 1900 according to one embodiment of the present invention. The inventors have successfully tested a very high data rate (>500 Mbps) version of the prototype known as Multi-MegaBand. This version of the prototype currently uses the following sequence to transmit and receive data via UWB impulses over a hard-wired medium: receiving at least one stream of binary data; framing the stream of data using Generic Frame Protocol (GFP); encoding the GFP bytes with control data to provide control data encoded bytes; encoding the control data encoded bytes with a Reed Solomon encoder to provide Reed Solomon encoded data; interleaving the Reed Solomon encoded data; determining bit loading per frequency bin based on channel estimation data to create a data symbol; performing a Fast Fourier Transform (FFT) on the interleaved data symbol array; mapping FFT data output sub-channel to a frequency bin to provide frequency mapped data; performing an Inverse Fast Fourier Transform (IFFT) on the frequency mapped data; repeating the previous steps until the IFFT memory is full; then serially transmitting the IFFT data as one-dimensional amplitude modulated ultra wideband impulses over a hard-wired medium; then receiving the ultra wideband impulses over the hard-wired medium; then recovering the IFFT data from the ultra wideband impulses by performing an FFT on the IFFT data; mapping frequency to sub-channel; equalizing the mapped data by sub-channel; performing an IFFT; mapping the IFFT output to data symbols; de-interleaving the data symbols; decoding the symbols using a Reed Solomon decoder to provide the control data encoded bytes; and decoding the control data encoded bytes to create GFP bytes. The transceiver 1900 of the present invention consists of the following functional items including, but not limited to, configuration, systems operations and management, ultra wideband impulse generation, ultra wideband impulse train generation, signal processing including FFT/iFFT transforms, timing, software management and configuration, feature control, PHY configuration, development, real-time debugging capabilities, receipt and transmission of non-MegaBand communications, and network switching and routing capabilities.

In addition the transceiver 1900 is also capable of operating as an XML-aware capable switch. The XML-aware capable switch receives XML data from the ultra wideband pulses or impulses over a conductive medium modem makes decisions based on the XML header, opens the data packets, transforms or encrypts the XML data into a format that can be understood by the network, and transfers it to the non-ultra wideband pulses or impulses over wire communication modem.

Also, the XML-aware capable switch receives XML data from the non-ultra wideband pulses or impulses over wire communication modem makes decisions based on the XML header, opens the data packets, transforms or encrypts the XML data into a format that can be understood by the network, and transfers it to the ultra wideband pulses or impulses over conductive medium modem.

The XML data can be geographic data that can be used for routing and a wide variety of location-based services.

The XML data can be network timing data that can be used for routing and a wide variety of location-based services. The network timing data can originate from a GPS source.

The transceiver 1900 is also capable of operating as DataSpace switches as described in U.S. patent application Ser. No. 10/345,766, entitled System And Method For Storing/Caching Data On Transmission Infrastructure, which is hereby incorporated by reference in its entirety.

The transceiver 1900 is also capable of operating as a structured linear database-aware switch as described in U.S. Pat. Nos. 6,868,419 and 6,976,034, entitled Method of Transmitting Data Including A Structured Linear Database, which are both hereby incorporated by reference in its entirety.

The transceiver 1900 can be constructed of hardware and software components to create the above functionality including, but not limited to: field programmable gate arrays (FPGA), FPGA Intellectual Property cores, ASIC, processors, device drivers, digital signal processors (DSPs), Ethernet, FireWire, Open Peripheral Bus, DMA, real time operating systems (RTOS), debug ports, Microkernel, memory (RAM, ROM, Flash, disk), memory management, file management, digital to analog converters, analog to digital converters, phased-locked loops, clocks and other standard electrical components, boards and housing one skilled in the art would recognize as required to integrate components into a transmitter and receiver.

Multi-MegaBand enabled devices can provide a number of interface points between communication systems running on standard communication systems over fiber, wireless, and wired medium and the present invention which is a UWB over a wired communication system. These "non-UWB pulse or impulse based communication systems" can be running communication protocols such as, but not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

Multi-MegaBand enabled devices are dumb transports running a protocol capable of encapsulation, such as, but not limited to GFP, or the LDL Protocol based on GFP, and can encapsulate any standard communication technology and transport data packets or streams onto hardwired portions of the network operating the present invention, which may be running one or more frequency based and/or time based and/or code based channels. These non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

Multi-MegaBand enabled devices can be configured to encapsulate a communication system standard on variable pulse or impulse encoded fiber. These non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I$^2$C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The transceiver 1900 can be configured to be integrated into devices such as, but not limited to, modems, PC boards, cell phones, set-top boxes, televisions, GPS receivers, ATM machines, landline phones, VoIP wireless phones, VoIP landline phones, DLC equipment, digital cameras, electrical outlets, interface devices that plug into electrical outlets, iPODs, Rios, etc., DVD players/recorders, on card/board communications, on back-plane communications, RFID readers, computer mouse, PDAs, computers, laptops, notebooks, eternal hard drives, CD burners, DVD burners, gaming equipment—X Box, Nintendo, etc., camcorders, copiers, fax machines, printers, cash registers, bar code readers, LCD projectors, PBXs, home networking devices, entertainment centers, PVRs, wireless/wire line switch (couplers), sensors, clocks, audio speakers, servers, power line jumpers (breaker box), DSLAMs, ISLAMs, amplifiers, monitors, video displays, RFID tags (non-UWB), RFID tags (UWB), smart cards, Cable TV head-end and field equipment, Cable TV CPE equipment, Broadband Power Line (BPL) head-end and field Equipment, BPL CPE equipment, in-building power line communication system controllers, databus controllers, etc.

FIG. 9 is a block diagram of a multiplexer. Multiplexer 900 is capable of combining two or more incoming data feeds A, B, and C onto a common transmission medium connected to I/O ports A, B, and C on line cards 904, 904', 904", and 904'". The multiplexer 900 is capable of time division, code, and/or frequency division multiplexing.

Multiplexer 900 is comprised of a control plane subsystem 901, data plane subsystem 902, trunk card 903 (only one is shown for clarity), and line cards 904, 904', 904", 904'". Line Cards 904, 904', 904", 904'" are comprised of transmitter 700 and receiver 800 as shown in FIGS. 7 and 8, and alternatively can be comprised of Multi-Megaband transceiver 1900 as shown in FIG. 19A and FIG. 19B.

The MegaBand ultra wideband transmitter 700 and receiver 800, or Multi-MegaBand ultra wideband transceiver 1900 are capable of receiving and transmitting non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I$^2$C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The MegaBand ultra wideband transmitter 700 and receiver 800, or Multi-MegaBand transceiver 1900 are also capable of receiving and transmitting encapsulated non-UWB pulse or impulse based communication protocols on the ultra wideband over wired medium portion of a network which include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I$^2$C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

FIG. 10 illustrates the basic components of line interface device 361. The line interface device 361 is comprised of a transceiver, which is comprised of a MegaBand transmitter 700 and receiver 800, or Multi-MegaBand transceiver 1900, ports for connecting to transmission mediums 1001, 1002, a port for connected to signal wire 1003, an optional processor 1010 and optional memory 1020. The line interface device's transceiver handles the transmission and receipt of data signals between a user's device, such as, but not limited to a PC, set-top box, etc. (not shown), and multiplexer 900 as shown in FIG. 9, FIGS. 3, 4, and 5 via transmission medium 1001. Transmission medium 1001 is a metallic guided medium such as, but not limited to, telephone twisted pair, coaxial cable, CAT-5 cable, power line, etc, but excludes fiber optic and wireless mediums.

A user connects a device (not shown) such as, but not limited to a PC, set-top box, or home networking router, to a port on the line interface device 361 via transmission medium 1002 in order to transmit and receive data from a remote source. The ports for transmission medium 1002 may include, but are not limited to an RJ-11 jack for telephone twisted pair, an RJ-45 jack for an Ethernet connection, IEEE 1394 Fire Wire connection, USB, RS-232, a PCMCIA slot, fiber optic, etc. The PCMCIA slot can be used as a wireless integration point for systems such as, but not limited to, Bluetooth, 802.11a, 802.11b, ultra wideband, etc. Only one port for transmission medium 1002 is shown for clarity, but the line interface device may be configured with any combination of additional ports as required.

The MegaBand ultra wideband transmitter 700 and receiver 800, or Multi-MegaBand transceiver 1900, are capable of receiving and transmitting non-UWB pulse or impulse based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I²C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The MegaBand ultra wideband transmitter 700 and receiver 800, or Multi-MegaBand transceiver 1900 are also capable of receiving and transmitting encapsulated non-UWB pulse or impulse based communication protocols encapsulated on the ultra wideband over wired medium portion of a network which include, but are not limited to, MOCA, Home PNA, HomePlug Standard, tZero Ultra-MIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, Local-Talk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, $I^2C$, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

Figure 11:
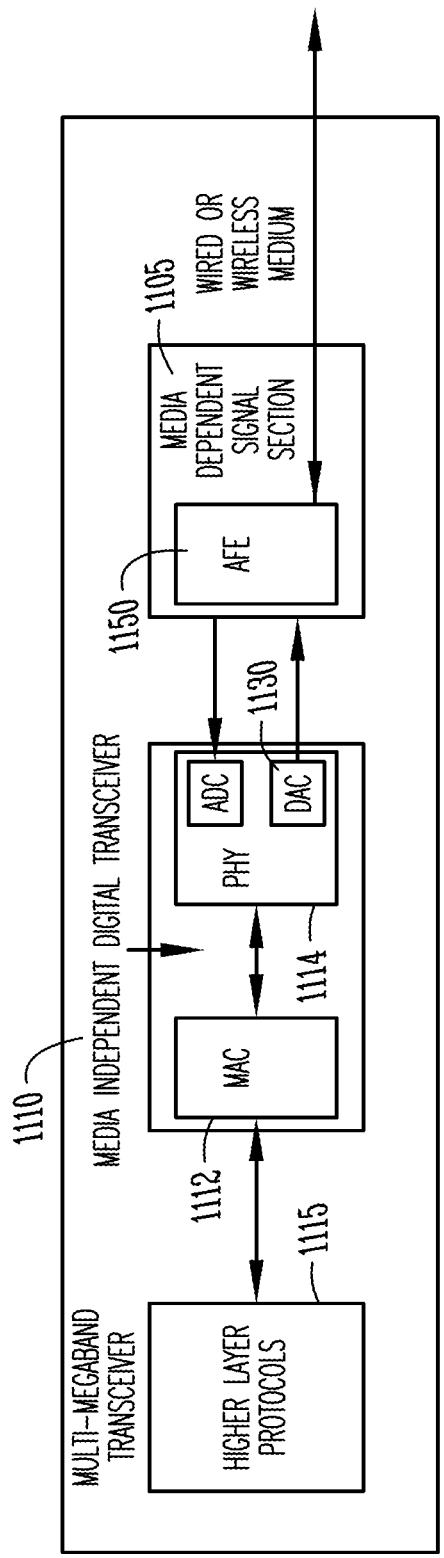
FIG. 11 is an illustration of a MultiMegaBand transceiver architecture.

FIG. 11 illustrates transceiver architecture for use with the present invention, particularly in a local network environment. The local network can be located in places such as, but not limited to, homes, condominiums, motels, hotels, schools, colleges, universities, government buildings, apartment buildings, offices, etc. The transceiver is designed for sending and receiving Multi-MegaBand signals. Alternatively, the transceiver can send and receive Multi-MegaBand signals, and be an interface point with a Multi-MegaBand network. The transceiver is also designed as a dumb transport, therefore the Multi-MegaBand signals can encapsulate any type of data transmitted or received according to any type of standard or proprietary protocol. Also, the Multi-MegaBand transceiver is designed to send and receive data signals over any type of electrically conductive medium, including, but not limited to, telephone twisted pairs, CAT-5 wires, coaxial cables, and power lines. One, or more, or these electrically conductive hard-wired mediums can be used simultaneously by the present invention.

In addition, the transceiver is also capable of operating as an XML-aware capable switch. The XML-aware capable switch receives XML data from the ultra wideband pulses or impulses over a conductive medium modem makes decisions based on the XML header, opens the data packets, transforms or encrypts the XML data into a format that can be understood by the network, and transfers it to the non-ultra wideband pulses or impulses over a wire communication modem.

Also, the XML-aware capable switch receives XML data from the non-ultra wideband pulses or impulses over wire communication modem makes decisions based on the XML header, opens the data packets, transforms or encrypts the XML data into a format that can be understood by the network, and transfers it to the ultra wideband pulses or impulses over conductive medium modem.

The XML data can be geographic data that can be used for routing and a wide variety of location-based services.

The XML data can be network timing data that can be used for routing and a wide variety of location-based services. The network timing data can originate from a GPS source.

The Multi-MegaBand transceiver is also capable of operating as DataSpace switches as described in U.S. patent application Ser. No. 10/345,766, entitled System And Method For Storing/Caching Data On Transmission Infrastructure, which is hereby incorporated by reference in its entirety.

The Multi-MegaBand transceiver is also capable of operating as a structured linear database-aware switch as described in U.S. Pat. Nos. 6,868,419 and 6,976,034, entitled Method of Transmitting Data Including A Structured Linear Database, which are both hereby incorporated by reference in its entirety.

The Multi-MegaBand transceiver can be constructed of hardware and software components to create the above functionality including, but not limited to: field programmable gate arrays (FPGA), FPGA Intellectual Property cores, ASIC, processors, device drivers, digital signal processors (DSPs), Ethernet, FireWire, Open Peripheral Bus, DMA, real time operating systems (RTOS), debug ports, Microkernel, memory (RAM, ROM, Flash, disk), memory management, file management, digital to analog converters, analog to digital converters, phased-locked loops, clocks and other standard electrical components, boards and housing one skilled in the art would recognize as required to integrate components into a transmitter and receiver.

The Multi-MegaBand transceiver is capable of receiving and transmitting non-Multi-MegaBand communication protocols such as, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I$^2$C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The Multi-MegaBand transceiver is also capable of receiving and transmitting encapsulated non-MegaBand communication protocols encapsulated on the ultra wideband over wired medium portion of a network which include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4 k (V.32bis), Modem 19.2 k (V.32terbo), Modem 28.8 k (V.34), Modem 33.6 k (V.34plus/V.34bis), Modem 56 k (V.90), and Modem 56 k (V.92), 64 k ISDN and 128 k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2., OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor-Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, I$^2$C, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture (AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

The Multi-MegaBand transceiver can be configured to be integrated into devices such as, but not limited to, modems, PC boards, cell phones, set-top boxes, televisions, GPS receivers, ATM machines, landline phones, VoIP wireless phones, VoIP landline phones, DLC equipment, digital cameras, electrical outlets, interface devices that plug into electrical outlets, iPODs, Rios, etc., DVD players/recorders, on card/board communications, on back-plane communications, RFID readers, computer mouse, PDAs, computers, laptops, notebooks, eternal hard drives, CD burners, DVD burners, gaming equipment—X Box, Nintendo, etc., camcorders, copiers, fax machines, printers, cash registers, bar code readers, LCD projectors, PBXs, home networking devices, entertainment centers, PVRs, wireless/wire line switch (couplers), sensors, clocks, audio speakers, servers, power line jumpers (breaker box), DSLAMs, ISLAMs, amplifiers, monitors, video displays, RFID tags (non-UWB), RFID tags (UWB), smart cards, Cable TV head-end and field equipment, Cable TV CPE equipment, Broadband Power Line (BPL) head-end and field Equipment, BPL CPE equipment, in-building power line communication system controllers, databus controllers, etc.

The Multi-MegaBand transceiver as described in FIGS. 17, 18, 19A and 19B can alternatively operate as MegaBand transmitter and receiver as illustrated in FIGS. 7 and 8. The transceiver architecture includes a media dependent signal section 1105, media independent digital transceiver section 1110, and a section that deals with higher layer protocols 1115. The media independent digital transceiver section 1110 includes a Multi-MegaBand Medium Access Control (MAC) 1112 coupled between a conventional baseboard physical layer 1114 and the higher layer protocols 1115.

The media independent digital transceiver section 1110 includes the Multi-MegaBand MAC 1112 and the physical Layer 1114. In accordance with the present invention, the Multi-MegaBand MAC 1112 is the data link sublayer that is responsible for transferring data to and from the physical layer 1114 and provides the protocol and control to enable interface to each of the local area mediums. The physical layer 1114 is coupled to the Multi-MegaBand MAC 1112 and includes circuitry for converting analog data received from the analog front end (AFE) 1150 to digital data and for converting digital data received from the Multi-MegaBand MAC 1112 to analog data 1130 for transmission to the AFE 1150. This architecture can be used for any type of Multi-MegaBand enabled user devices, such as, but not limited to, power line devices, landline phones, VoIP phones, computers, etc. This architecture also supports the use of non-Multi-MegaBand devices, such as, but not limited to, power line devices, landline phones, VoIP phones, computers, etc. The transceiver 1110 can serve as an interface point between Multi-MegaBand portions of the network, and non-Multi-MegaBand portions of the network.

The media dependent mixed signal section 1105 includes at least one analog front end (AFE) 1150 for interfacing with a specific medium, including, but not limited to, telephone twisted pairs, CAT-5 wires, coaxial cables, and power lines. Using more than one media dependent mixed signal section 1105 additional electrically conductive hard-wired mediums can be used simultaneously by the present invention. An AFE 1150 includes the transmitter, receiver and other typical hardware and software providing the interface between a specific medium and the physical layer 1114 for encoding/decoding and modulating/demodulating.

With an interface point adapted to communicate over more than one electronically conductive hard-wired medium, each end user or end device can communicate device-to-device via the interface point. In addition, direct communication between terminal devices is enabled over the same transmission medium.

In another embodiment, the end user device can also include a repeater section adapted to communicate directly with a non-Multi-MegaBand communication device operating within the local area network. The repeater section only provides for interface between one type of Multi-MegaBand medium or enabled device and the non-Multi-MegaBand communication medium or device, where the interface point coordinates interfaces to all Multi-MegaBand to non-Multi-MegaBand devices and mediums. There is only a single interface point in the local area network. The repeater section is designed to extend the reach of the network to non-Multi-MegaBand communication devices or mediums which can not interface the interface point directly. The repeater section includes an AFE adapted to communicate with the non-Multi-MegaBand communication device or medium. Thus, for example, a MegaBand enabled or Multi-MegaBand enabled power line device adapted with a repeater section can communicate directly with non-Multi-MegaBand communication devices or mediums, as well as with other devices, computers, phones, etc, that are connected via other mediums such as phone lines, coaxial cables, etc., via the interface point.

As stated above, the interface point coordinates and interconnects interface between any user devices connected to the same or different media within the local Area Network. The interface, or communication link, or bridge, is enabled by the LDL Protocol MAC frames, and is transparent to layers above the MAC. There is no upper layer bridging is needed for interconnecting two devices using different communications media or different data transmission technologies, Multi-MegaBand and non-Multi-MegaBand.

Figure 12:
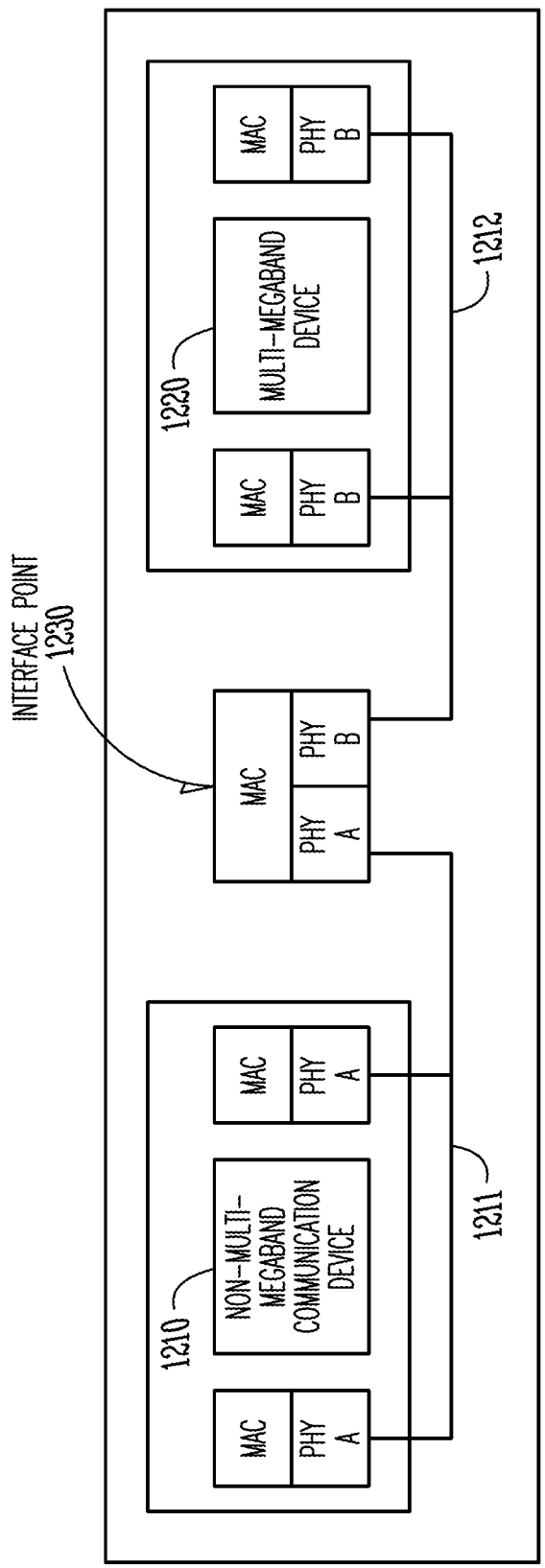
FIG. 12 is an illustration of a MAC architecture for use with the present invention.

FIG. 12 illustrates an alternative embodiment of a MAC architecture for use with the present invention. This architecture includes non-Multi-MegaBand communication devices 1210 and Multi-MegaBand devices 1220 each in communication with an interface point (IP) 1230. The IP 1230 has a single MAC and two transport medium dependent physical layers (A,B), one interfaced to the non-Multi-MegaBand communication device medium 1211 by a suitable AFE (not shown) and one interfaced to the Multi-MegaBand device medium 1212 by a suitable AFE (not shown). PHY A and PHY B in FIGS. 12-14 include a physical layer adapted to the Multi-MegaBand medium. Each user device also contains a MAC and a non-Multi-MegaBand communication device 1210 or MegaBand device 1220 transport medium dependent physical layer for communication with the corresponding physical layer in the IP 1230. Transmissions to and receptions from, the non-Multi-MegaBand communication device 1210 and MegaBand devices or Multi-MegaBand devices 1220 are coordinated by a single MAC.

Figure 13:
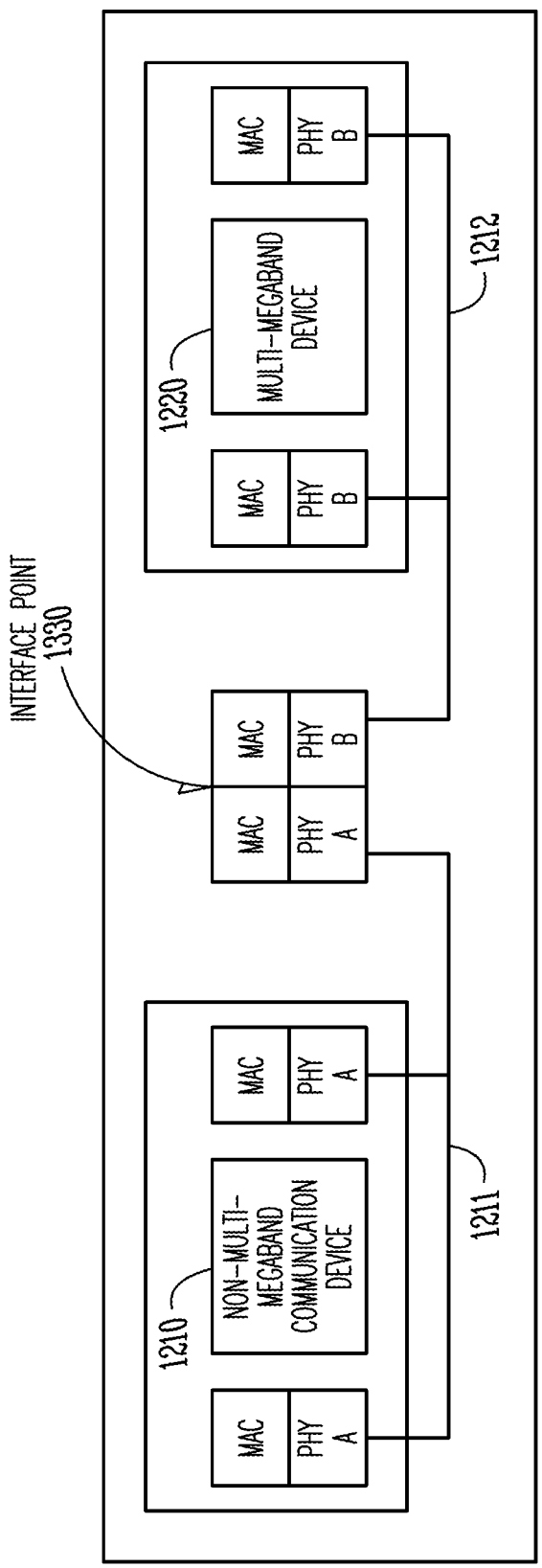
FIG. 13 is an illustration of another MAC architecture for use with the present invention.

FIG. 13 illustrates other preferred embodiments of a MAC architecture in accordance with the present invention. Again, the IP 1330 coordinates and interconnects interface of both non-Multi-MegaBand communication device 1210 and Multi-MegaBand Devices 1220. However, this IP 1330 has two MACs and two transport medium dependent physical layers (A,B), one MAC-PHY pair handling the non-Multi-MegaBand communication device medium 1211 and one pair handling the Multi-MegaBand Device medium 1212. Different processing delays of each type of media are addressed with this dual MAC architecture enabling the two physical layers to have different signal processing delays. Thus, timing hierarchies related to the non-Multi-MegaBand communication device 1210 and Multi-MegaBand Device 1220 need not be the same, since interface to each medium is handled by a separate MAC. In addition, each MAC can process frames transmitted to, or received from, the corresponding medium independently, thus enabling simultaneous use of the non-Multi-MegaBand communication device 1210 and Multi-MegaBand Device 1220.

Figure 14:
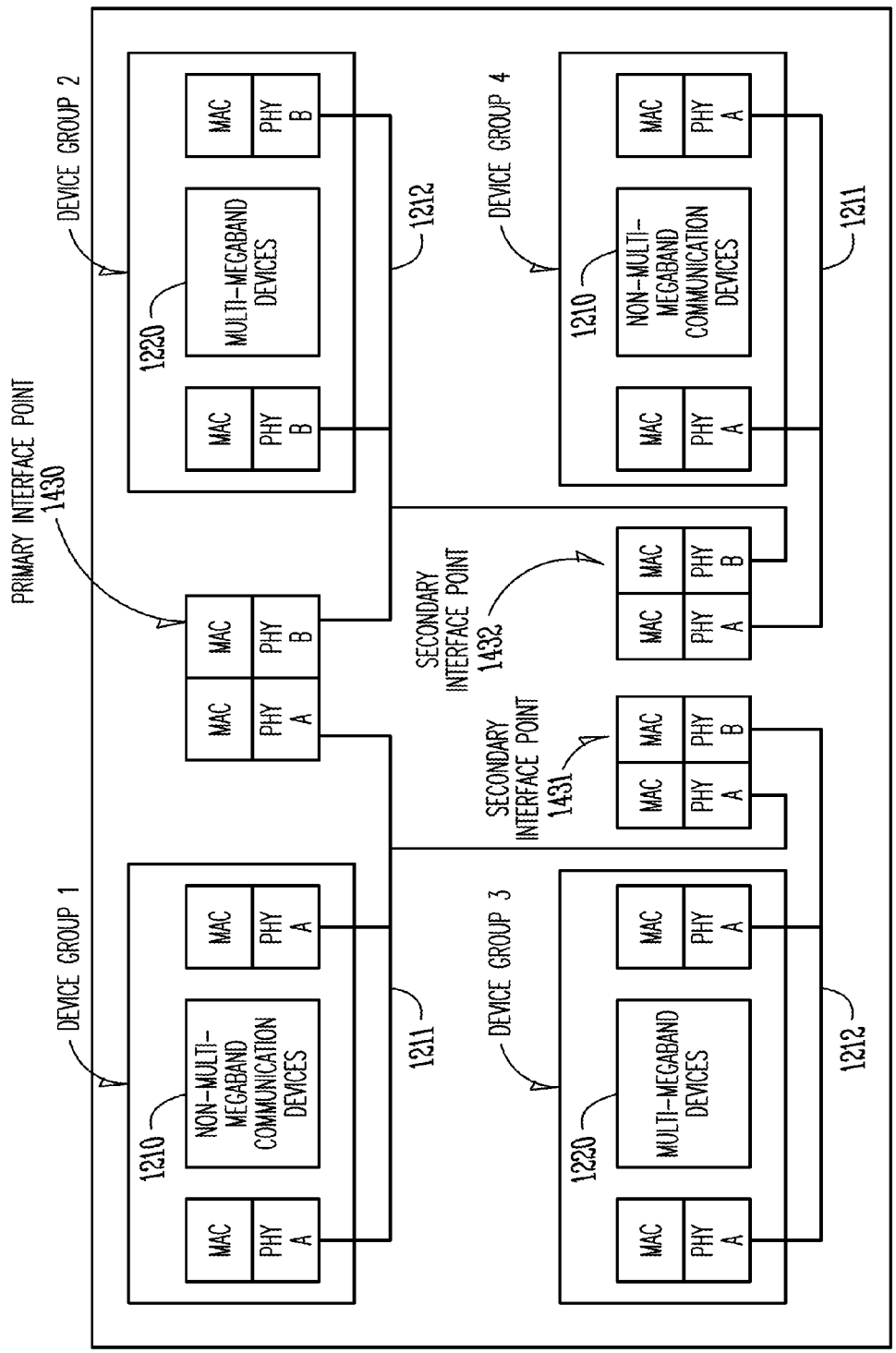
FIG. 14 is an illustration of an extended service using the MAC architecture illustrated in FIG. 13.

Multiple dual MAC IPs such as IP 1330 can also be configured to form an extended service set to enable extended coverage. FIG. 14 illustrates a preferred embodiment of an extended service architecture according to the present invention, including a primary MAC IP 1430 and two secondary IPs 1431, 1432. Each IP includes the dual MAC architecture described above at 1330 in FIG. 13. The primary IP 1430 coordinates and interconnects interface of "closely located" non-Multi-MegaBand communication devices and Multi-MegaBand devices and the secondary IPs (1431, 1432). The secondary IPs 1431, 1432 coordinate interface of "remote" non-Multi-MegaBand communication devices and Multi-MegaBand user devices and connect them to the primary IP 1430. A set of devices controlled directly by a specific MAC-PHY pair of an IP constitutes a logical device group. FIG. 14 shows four separate device groups: Device Group 1 includes a group of non-Multi-MegaBand communication devices 1210 controlled directly by a first MAC-PHY pair in the primary IP 1430; Device Group 2 includes a group of Multi-MegaBand devices 1220 controlled directly by a second MAC-PHY pair in the primary IP 1430; Device Group 3 which includes a group of Multi-MegaBand devices 1220 controlled directly by a first MAC-PHY pair in secondary IP 1431; and Device Group 4 which includes a group of non-Multi-MegaBand communication devices 1210 controlled directly by a first MAC-PHY pair in secondary IP 1432.

Connections between the primary IP 1430 and the secondary IPs 1431, 1432 share the medium as the user devices and are based on the LDL Protocol MAC as well. Each of the secondary IPs 1431, 1432 function as user devices in a device group of the primary IP 1430. So, IP 1431 is in communication with IP 1430 via the same non-Multi-MegaBand communication device medium as the non-Multi-MegaBand communication devices 1210 of Device Group 1 and IP 1432 is in communication with IP 1430 via the same Multi-MegaBand medium as the Multi-MegaBand devices 1220 of Device Group 2. This advantageous approach enables a seamless internetworking over one or more electrically conductive hard-wired mediums between Multi-MegaBand communication systems and non-Multi-MegaBand communication systems using common hardware and/or software components and standard protocol layering in an extended device group configuration and provides, a means for in-local area, LDL protocol inter-device group operation using existing premises wiring.

In some exemplary embodiments, the interface points, 1230, 1330 and 1430 can be implemented in a local area, small office, or other situations where networking is desired without adding additional infrastructure.

Figure 15:
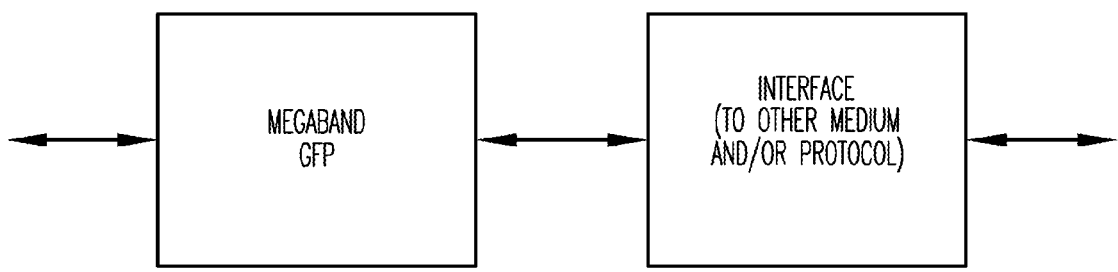
FIG. 15 is an illustration of the packaging process of other mediums and protocols as MegaBand GFP packets as used in the present invention.

FIG. 15 is an illustration of the packaging process of other protocols as MegaBand GFP packets as used in the present invention.

Lightwaves Data Link (LDL) Protocol

The present invention is transport protocol agnostic. The system may be configured to use standardized or proprietary transport protocols. Standardized network and transport protocols include, but are not limited to, Ethernet, Asynchronous Transport Mode (ATM), Synchronous Optical Network (SONET), IP-based protocols such as File Transfer Protocols (FTP), Transmission Control Protocol (TCP), Hyper-text Transport Protocol (HTTP), Internetwork Packet Exchange (IPX), Motion Picture Expert Group (MPEG), MPEG-1 Audio 3 (MP3) and System Network Architecture (SNA).

Lightwaves Data Link (LDL) is a proprietary data packet architecture designed for use in the present invention's preferred embodiment on telephone twisted pair networks, and alternatively the LDL protocol has been designed to be easily adaptable to other embodiments of the present invention including, but not limited to, CATV, LAN, indoor and outdoor powerline, and Data Bus. Additionally, LDL could be used with other standardized or proprietary data transport systems and methods.

LDL is based upon Lucent's Simple Data Link Protocol (SDL) and IETF's RFC 2823 titled "PPP over Simple Data Link using SONET/SDH with ATM-like Framing." LDL encapsulates protocol data units (PDUs), such as Internet Protocol (IP), Internetwork Packet Exchange (IPX), etc. for transport using the present invention's data transmission system. LDL uses some of the same constructs provided in SDL. The LDL frames are illustrated in Charts 4 through 7 below.

CHART 4

| LDL IDLE FRAME | |
| --- | --- |
| LDL Header | |
| LDL Payload Data Length | Payload Length CRC |
| 2 octets | 2 octets |

CHART 5

| LDL LINK LAYER SCRAMBLER FRAME | | | | |
| --- | --- | --- | --- | --- |
| LDL Header | | LDL Private Area | | |
| LDL Payload Data Length | Payload Length CRC | LDL Priority, Type, Broadcast, Stream ID | Stream Count | LDL Check Private & Payload CRC 16 |
| 2 octets | 2 octets | 3 octets | 1 Octet | 2 octets |

CHART 6

| LDL OPERATION AND MEASUREMENTS MESSAGE FRAME | | | | |
| --- | --- | --- | --- | --- |
| LDL Header | | LDL Private Area | | |
| LDL Payload Data Length | Payload Length CRC | LDL Priority, Type, Broadcast, Stream ID | Stream Count | LDL Check Private & Payload CRC 16 |
| 2 octets | 2 octet | 3 octets | 1 Octet | 2 octets |

CHART 7

| LDL PDU TRANSPORT FRAME | | | | | |
| --- | --- | --- | --- | --- | --- |
| LDL Header | | LDL Private Area | | | |
| LDL Payload Data Length | Payload Length CRC | LDL Priority, Type, Broadcast, Stream ID | Stream Count | LDL Payload LDL Payload Data Area | LDL Check Private & Payload CRC 32 |
| 2 octets | 2 octet | 3 octets | 1 Octet | <=65,535 octets | 4 octets |

The LDL header contains two fields and when used together function as the frame delimiter for LDL. Every LDL frame transmitted requires a complete LDL Header containing the LDL Payload Data Length (PDL) and the LDL Payload Length CRC fields.

The LDL Payload Data Length contains the number of octets contained within the LDL Payload Data Area. Its value dictates the type of LDL frame transmitted. As examples:

Idle (PDL=0): LDL Private and Payload Areas are not transmitted, thus a LDL check is also not required. Only the LDL Header is transmitted as a group of four NULL octets.

Link Layer Scramble (PDL=1): The LDL Payload area is not transmitted. As a result, an LDL Check field of 2 octets contains the checksum of the LDL Private Area.

Operations and Measurement (OAM) Message Frames (PDL=2 or 3): The LDL Private area of 4 octets contains OAM data. The LDL Payload area is not transmitted. As a result, an LDL Check field of 2 octets contains the checksum of the LDL Private Area.

Protocol Data Unit (PDU) Transport Frame (4<PDL<=65,535): This LDL frame is used for encapsulating raw PDUs for transport between multiple LDL devices. The LDL Private and Payload areas are transmitted and the LDL Check contains a 4 octet CRC calculated over the LDL Private and Payload areas.

The Payload Length CRC contains the CRC-16 or CRC-32 calculation of the LDL Payload Length contained in the LDL Payload Data Length.

The LDL Private Area consists of 4 octets divided into 3 octets described in Chart 7 for the LDL frame priority, the frame type, broadcast type and stream ID. With the exception of an LDL Idle Frame, every LDL Frame requires a LDL Private area consisting of 6 octets in length.

The LDL Payload Area contains the encapsulated PDUs to be transmitted between multiple LDL devices. When an LDL frame contains a payload, the LDL Payload Area ranges from a minimum of 4 to a maximum of 65,535 octets in size.

Figure 16A:
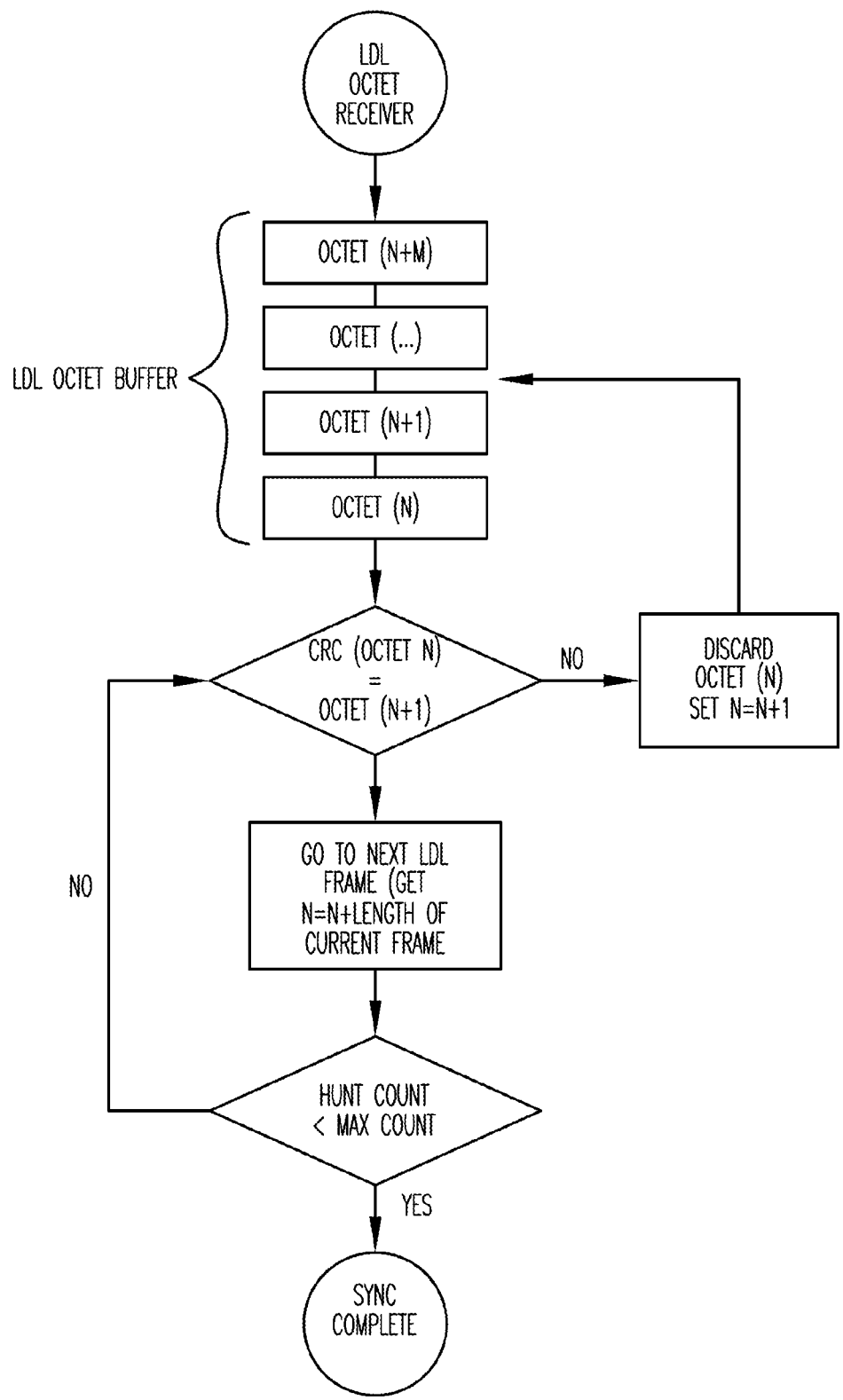
FIG. 16A is a flow chart that illustrates the LDL protocol's hunt and synchronization method.

An LDL session begins with the search and synchronization process. FIG. 16A is a flow chart of the process.

LDL octets are received into an octet buffer or other memory and storage caching mechanism that is subsequently processed by the LDL decoder. The search begins at the beginning of the octet buffer and compares CRC-16 value of the current octet and value of the next octet. If there is no match, then the current octet is discarded and the process moves to the next octet in the buffer.

If there is a match between these two values, then it is known with a high degree of probability that a valid LDL length octet has been found. Using the assumption this is the actual length; a calculation is performed to determine the location of the next LDL frame's length and CRC-16 value octets, in order to perform the comparison again for the subsequent frame. If the comparison is also successful, then it is assumed synchronization has been achieved for the LDL frame stream.

Prior art has noted that some transmission methods encounter difficulty in transmitting lengthy successions of identical data values, and as a result methods of scrambling data have been developed. Scrambling data to be transported over a network increases the density of shifts from binary value "1" to "0" and vice-versa in any given stream of data. Scrambling is accomplished by coupling data streams with scrambling patterns to produce data patterns that contain enough shifting to reduce transmission problems. Due to the nature of the physical transport of the present invention, optionally, there may be a limited need to implement scrambling within LDL in preparation for the transmission of data.

Network PDU frames define network elements encapsulated within LDL and transported between devices capable of using the LDL protocol. Charts 8 through 11 define PDU frame outlines for Network PDU types, such as, but not limited to, Ethernet and MPEG, that can be contained within the LDL Data area for transport.

CHART 8

| | | | | | | | |
|---|---|---|---|---|---|---|---|
| | | ETHERNET 802.3 | | | | | |
| Preamble | Start Frame Delimiter | Dest. MAC Address | Source MAC Address | Length/Type | MAC Client Data | Pad | Frame Check Sequence |
| 7 octets | 1 octet | 6 octets | 6 octets | 2 octets | <=1.5K | | 4 octets |

Cycle Redundancy Check (CRC) 16 and 32 bit is an algorithm based upon the use of polynomial arithmetic that assigns a CRC value equal to the remainder of dividing the LDL Private and Payload Data Areas (if used) by a divisor representing a polynomial. It can process any payload of any size, so the length of the payload in combination with the LDL private area is not an issue. LDL idle frames do not contain a CRC and the size of the CRC field is dependent on the type of the LDL frame used.

The Ethernet 802.3 minimum frame size is 64 octets, and the maximum frame size is 1518 octets. It should be noted Ethernet standards do not include the preamble or start frame delimiter as part of frame length.

CHART 9

| | | | | | | | | | |
|---|---|---|---|---|---|---|---|---|---|
| | | ETHERNET VIRTUAL LOCAL AREA NETWORK (VLAN) 802.3ac | | | | | | | |
| Preamble | Start Frame Delimite | Dest. MAC Address | Source MAC Address | 802.1Q Tag Type | Tag Control Info | Length/ Type | MAC Client Data | Pad | Frame Check Sequenc |
| 7 octets | 1 octet | 6 octets | 6 octets | 2 octets | 2 octets | 2 octets | <=1.5K | | 4 octets |

The minimum Ethernet Virtual Local Area Network (VLAN) 802.ac frame size is 64 octets, and the maximum frame size is 1522 octets. It should also be noted that some references to length for Ethernet do not include the preamble or start frame delimiter.

CHART 10

| | | | | | | | | |
|---|---|---|---|---|---|---|---|---|
| Gigabit Ethernet 802.3z | | | | | | | | |
| Preamble | Start Frame Delimite | Dest. MAC Address | Source MAC Address | Length/Type | MAC Client Data | Pad | Frame Check Sequenc | Extension |
| 7 octets | 1 octet | 6 octets | 6 octets | 2 octets | <=1.5K | | 4 octets | |

The frame size for Gigabit Ethernet 802.3z remains the same Ethernet 802.3 with the exception that the length from the Destination MAC Address field through the Extension field is a minimum of 512 octets.

The following chart defines the structure for an MPEG Transport PDU.

CHART 11

| MPEG Transport PDU | |
|---|---|
| Header | Payload |
| >=4 octets | <188 octets - header size |

In the future, the LDL protocol is designed to be flexible enough to handle Ethernet Jumbo frames that have a maximum size of 9,000 octets.

Since LDL is built upon the constructs of SDL, an LDL frame can be switched to a SONET network in its current format, with little or no modifications to the LDL frame. However, the payload may require scrambling prior to placement onto a SONET network.

The encapsulation of an Ethernet network PDU into LDL involves no manipulation of the original Ethernet network PDU with the exception that the preamble, start frame delimiter, pad and frame check sequence will not be transported. Because they will not be carried in the LDL payload, they will be reconstructed on the far-end after arriving via the transport.

Figure 16B:
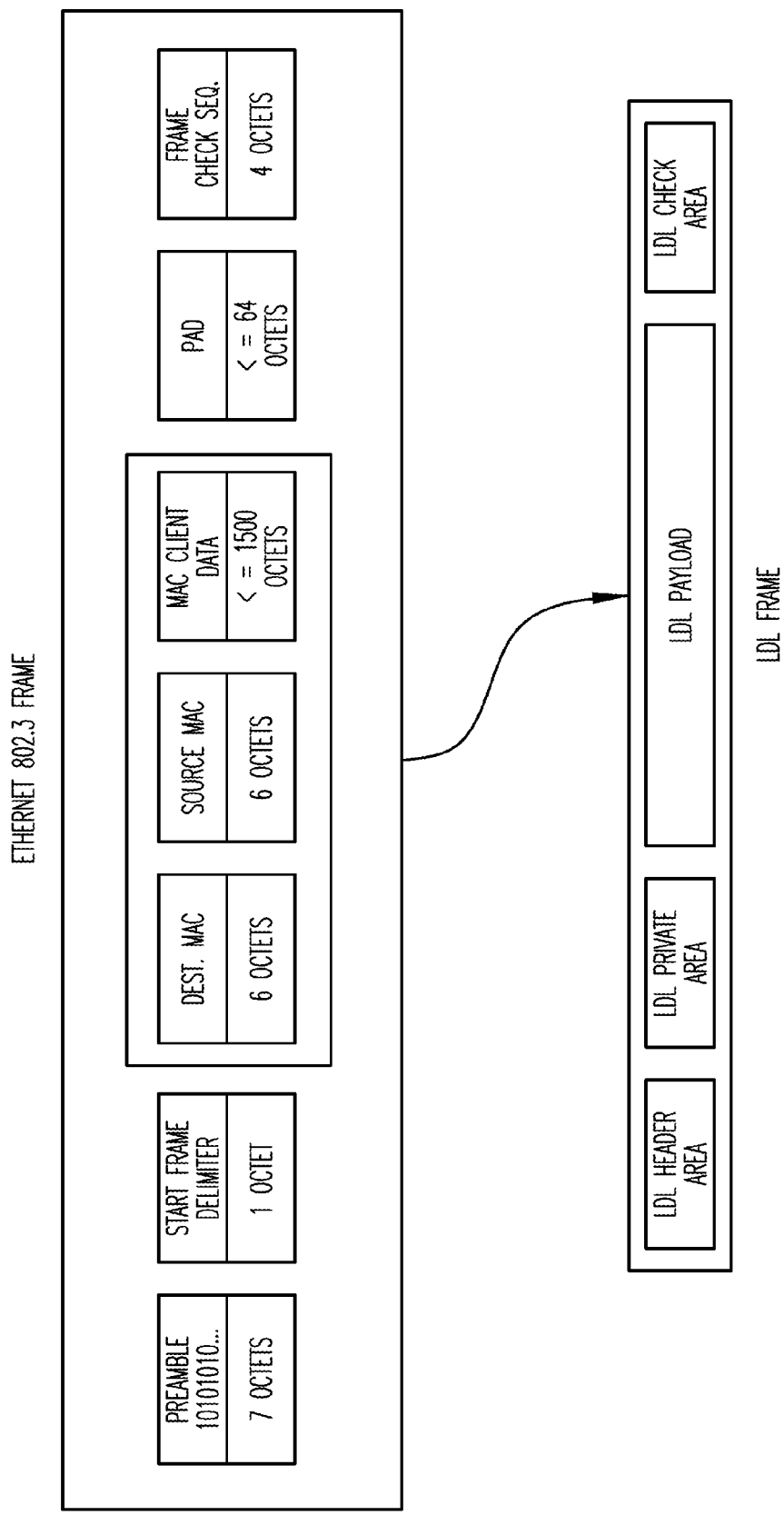
FIG. 16B is an illustration of an Ethernet Network PDU encapsulated in a LDL packet.

FIG. 16B illustrates the encapsulation of Ethernet Network PDU in an LDL packet.

Figure 16C:
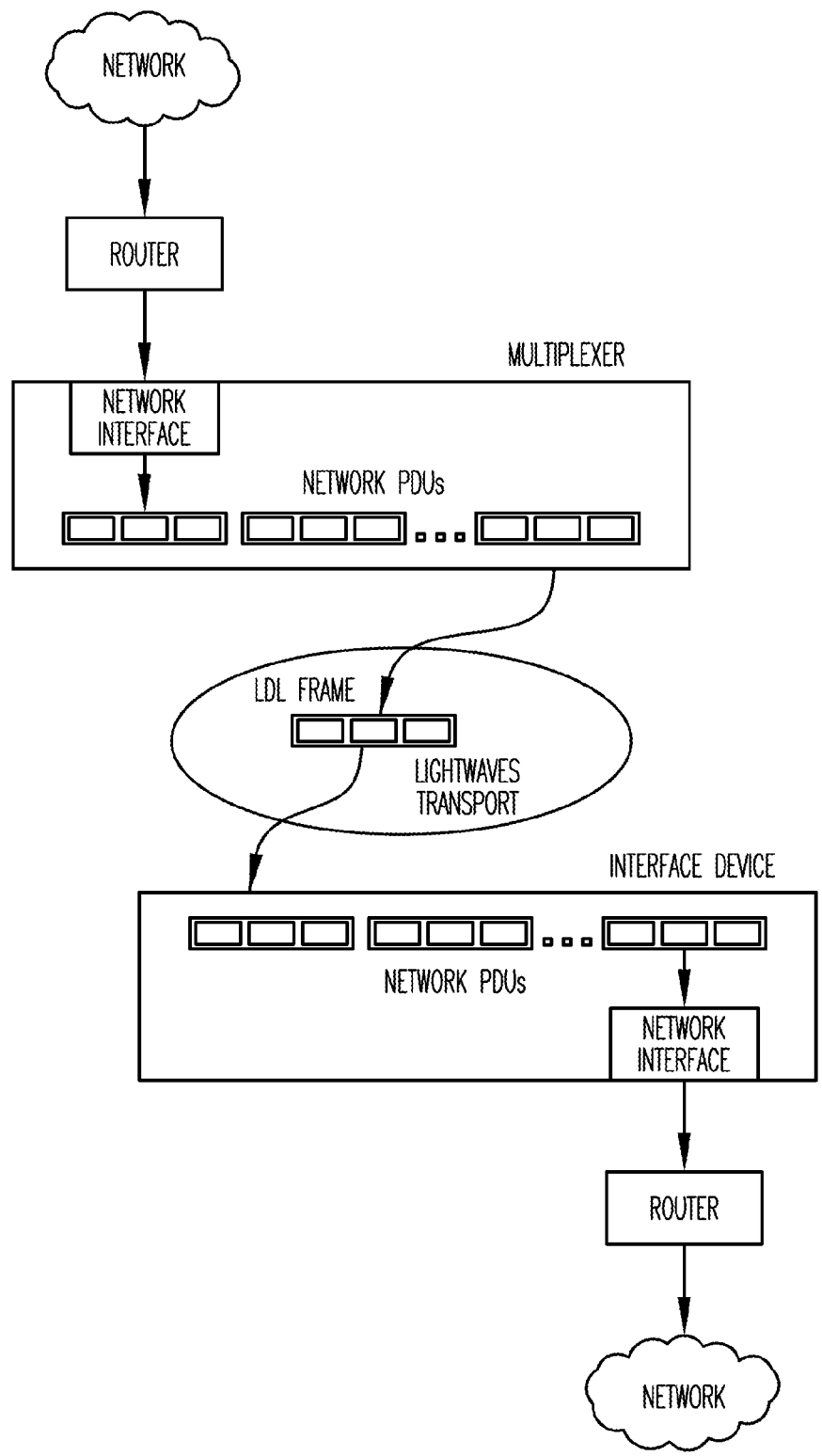
FIG. 16C is an illustration of LDL packets being transported over a network according to one embodiment of the present invention.

FIG. 16C illustrates a flow chart of LDL packets being transported over a network of the present invention.

An Ethernet network PDU switching table is required on the multiplexer in a telephone central office, or CATV head end, or a device acting as a director for the transport of an Ethernet network PDU to the correct device. When a device or service is provisioned a MAC or network protocol specific address will be assigned to a particular LDL stream ID. FIG. 16C illustrates the flow of a network PDU originating from a network interconnect on the CO side through the transport fabric to a Customer Premise Equipment (CPE) device.

The Ethernet network PDU Address to LDL Stream ID Table contains mapping information required to create a LDL frame. In addition, the network PDU is encapsulated into the LDL frame after which the LDL frame is subsequently routed to the appropriate device. In the case of Ethernet, the CO device will maintain a pool of MAC addresses to assign them to CPE devices in a manner to be detailed later.

Figure 16D:
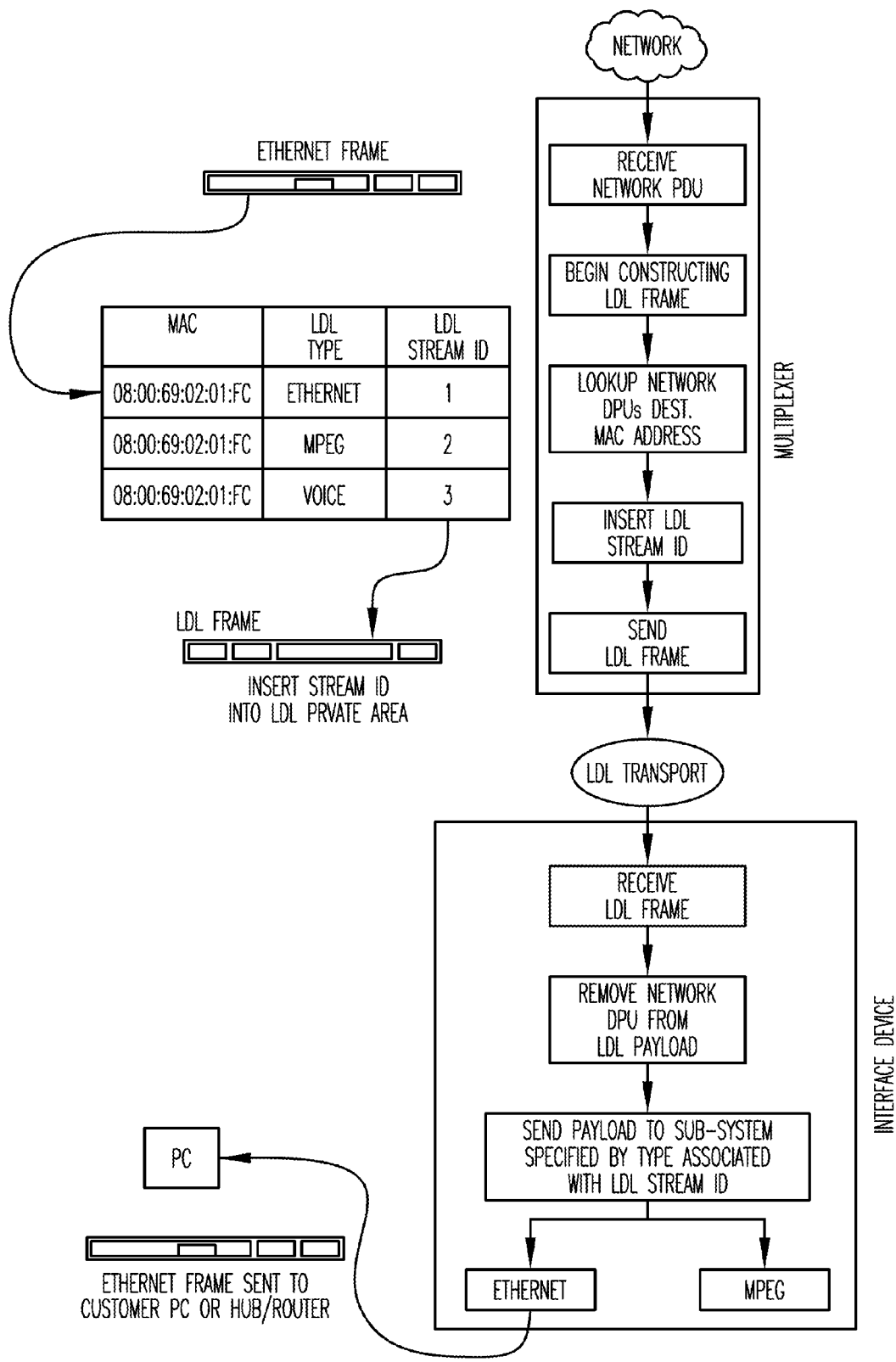
FIG. 16D is a flow chart illustrating Ethernet Network PDUs to device switching according to one embodiment of the present invention.

FIG. 16D is a flow chart illustrating Ethernet Network PDUs to device switching.

The encapsulation of an MPEG-2 Transport (TS) network PDU into LDL involves no manipulation of the original MPEG-2 PDU. The transport of the MPEG-2 PDU while not exactly identical as the Ethernet PDU, still involves the encapsulation of the MPEG-2 PDU into LDL and transport on the LDL transport similarly to FIG. 10 above.

Figure 16E:
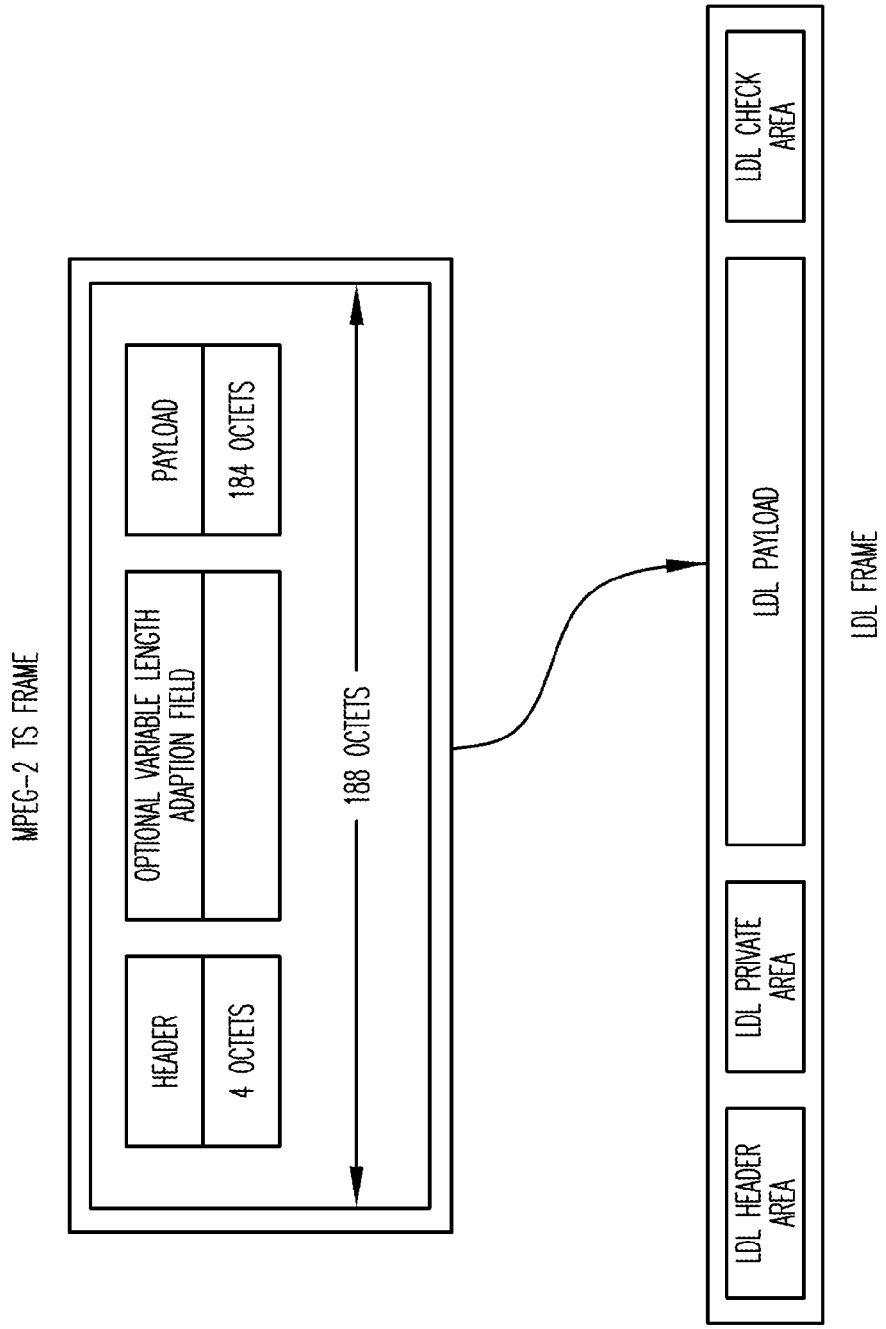
FIG. 16E is an illustration of a MPEG-2 TS PDU encapsulated in a LDL packet.

FIG. 16E is an illustration of an MPEG-2 TS PDU encapsulated in an LDL packet.

Unlike the Ethernet transport requirements, the MPEG encapsulation into LDL will occur outside of the LDL transport core. The LDL transport core system will receive MPEG-2 TS packets already encapsulated into LDL. The primary purpose for this design is to:

Reduce scope of LDL transport core to transport focus activity

Figure 16F:
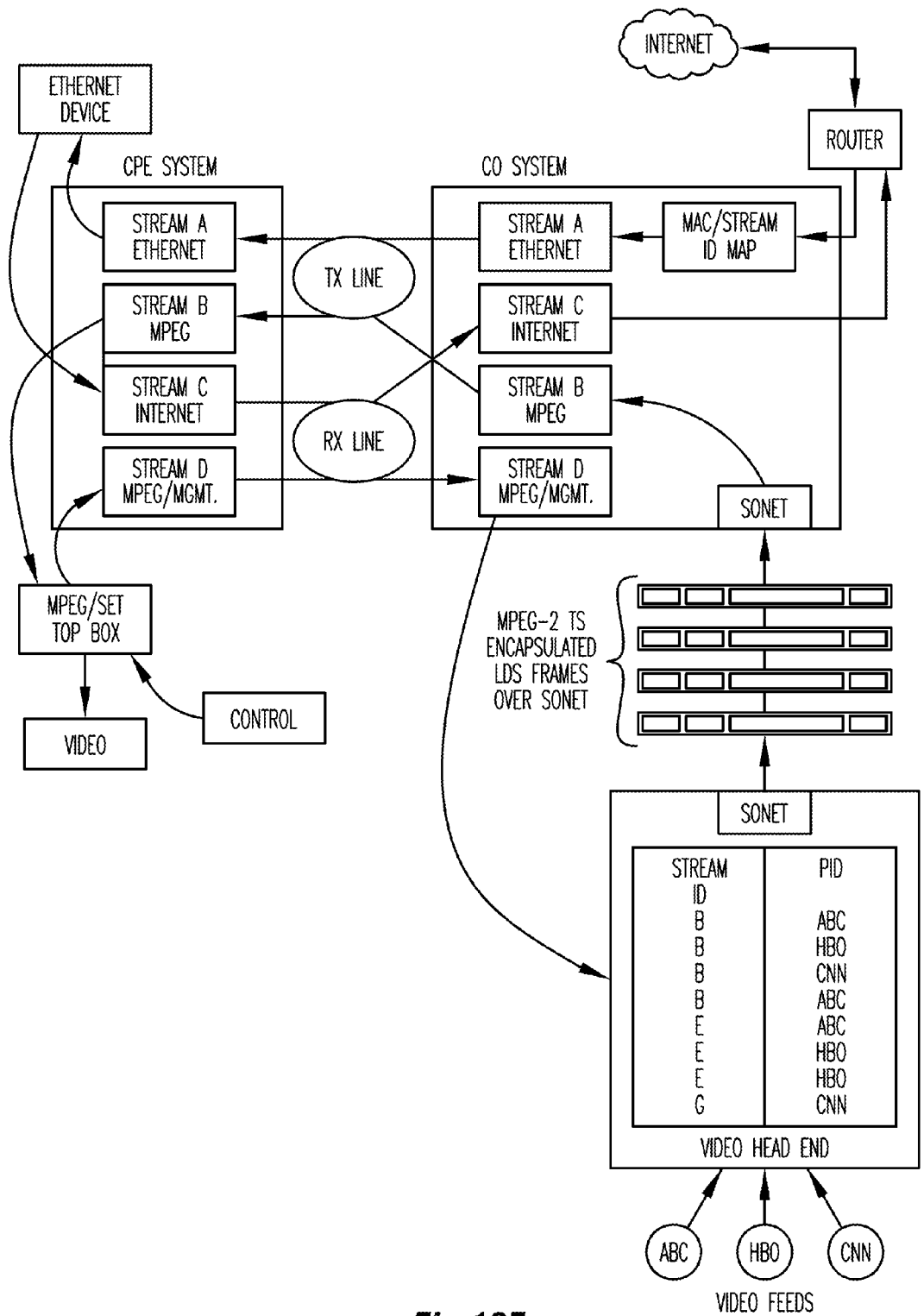
FIG. 16F is a flow chart illustrating of a system configured to deliver video feeds via streams to an end user according to one embodiment of the present invention.

Move application and service control to application components to outside the LDL transport FIG. 16F is a flow chart illustrating of a system configured to deliver video feeds via streams to an end user. The first component is the system that contains the CO and CPE devices for transmitting LDL frames over the transport. The second is the Ethernet system that illustrates the transmission of Ethernet network PDUs between the CO network interconnect and the client connected to the CPE device. The third component is the MPEG-based video broadcast application used to broadcast MPEG-2 transport (TS) frames from a video head to a set top box (STB) located off the CPE device.

It is important to note that the system is focused predominantly on transport while the application control logic for video feed selection and other value-added features such as on-demand video and audio is provided by application systems inter-connected to the framework via a high-speed interconnect such as SONET or Gigabit Ethernet. SONET will be able to accommodate LDL packets created within the video application easily since LDL is derived from SDL, which has been originally created for use within SONET networks.

The STB or other video application device will be enabled to send messages back to the video system via LDL which will then be forwarded back to the CO based video head-end and its management system. This interconnect can be done as SONET as well.

Figure 16G:
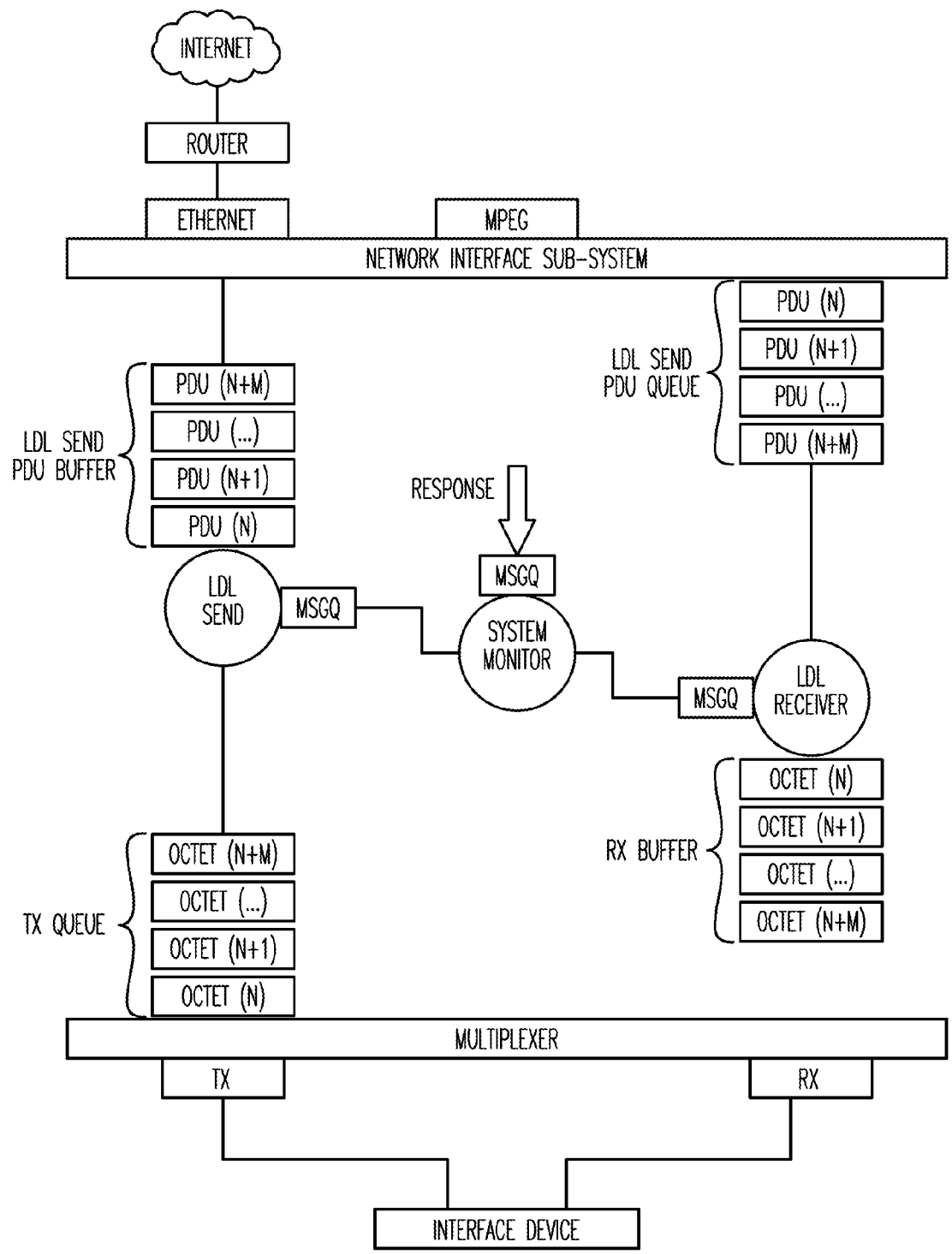
FIG. 16G is an illustration of a high-level system requirement for a central office or head end.

Each connection between the CPE and CO will have at least one video stream if video is incorporated into that particular configuration. If the transport is supplying video for more than one video device at the CPE location, then there are several different configurations possible:

All video MPEG frames are multiplexed onto one stream. This configuration is illustrated in FIG. 16G. In this configuration, if four video feeds are required at the CPE side, then all four video feeds will be assigned to the one stream assigned for MPEG/video feeds and the single feed of multiplexed MPEG frames are extracted from the LDL frames and sent to the CPE video application, for example an STB. This configuration is preferable where one video application or STB is used for managing all video feeds.

All video MPEG frames are assigned their individual stream. In this configuration, if four video feeds are required at the CPE side, then all four video feeds are assigned their own stream. Once the CPE device receives the frame for a particular stream, it will extract the MPEG frame from LDL and send it to the CPE video application, for example a STB, that is inter-connected to the device assigned to that particular MPEG feed. This configuration is preferable where a video application or STB is required for each video feed or MPEG stream.

One skilled in the art having the benefit of this disclosure will realize that "data storage" refers to a comprehensive list of methods and systems for the storing of data and information. This can include methods such as, but not limited to, the use of files, ASCII files, databases, relational databases, indexed-based databases, CD, magnetic storage, optical storage, distributed data and databases, replicated data and databases, RAM, ROM, reverberating data storage, cache, and local or remote storage systems.

In addition, the data can be represented in many formats including, but not limited to, binary, ASCII, EBCDIC, foreign-language sets, MPEG, MPEG-2, MP3, text and XML. Data can be organized or not organized and can be stored in some form of database including ones such as, but not limited to, Oracle, Sybase, Microsoft SQL, MySQL, Velocis, Ingres, Postgres, Chaotic Databases, and proprietary non-public database methods and systems.

In addition, one skilled in the art will also note that "information exchange" refers to the transfer of information over a variety of possible transports between one or more entities. Transports for "information exchange" include, but are not limited to wireline or wireless networks including fiber, SONET, Ethernet, Gigabit Ethernet, CDMA, Ultra-Wide Band, MegaBand, internal and external bus, Infiniband, Advanced TCA, Peripheral Component Interconnect (PCI), etc. The "information exchange" transport can include many different protocols including, but not limited to, IP-based protocols, TCP/IP, IP, Systems Network Architecture (SNA), FTP, HTTP, IPX/SPX, Netbui, Novell, etc.

"Information exchange" includes, but is not limited to data, text, records, files and other forms of electronically encoded data.

The entities within the definition of "information exchange" include elements that comprise the preferred embodiment, sub-systems or sub-elements of an element(s) within the preferred embodiment. In addition, an entity can include a third-party system or sub-system(s) of a third-party system.

"Information exchange" also includes methodologies and third-party products such as, but not limited to XML, SOAP, CORBA, Tibco, Middle-layer, grid computing, DCE, etc. Furthermore, "information exchange" includes the use of private-proprietary and public-standard formats and secure methods, including but not limited to, encryption and secure socket layer (SSL).

"Information exchange" also includes a push methodology where information is pushed to one or more elements from one or more elements. Conversely, "information exchange" can include a methodology where information is pulled from one or more elements to one or more elements.

The management system described as follows is designed for use in the present invention's preferred embodiment on telephone twisted pair networks, particularly considering the impact of high bandwidth/user becoming available. The management system has been designed to be easily adaptable to other embodiments of the present invention including, but not limited to, CATV networks.

Figure 16H:
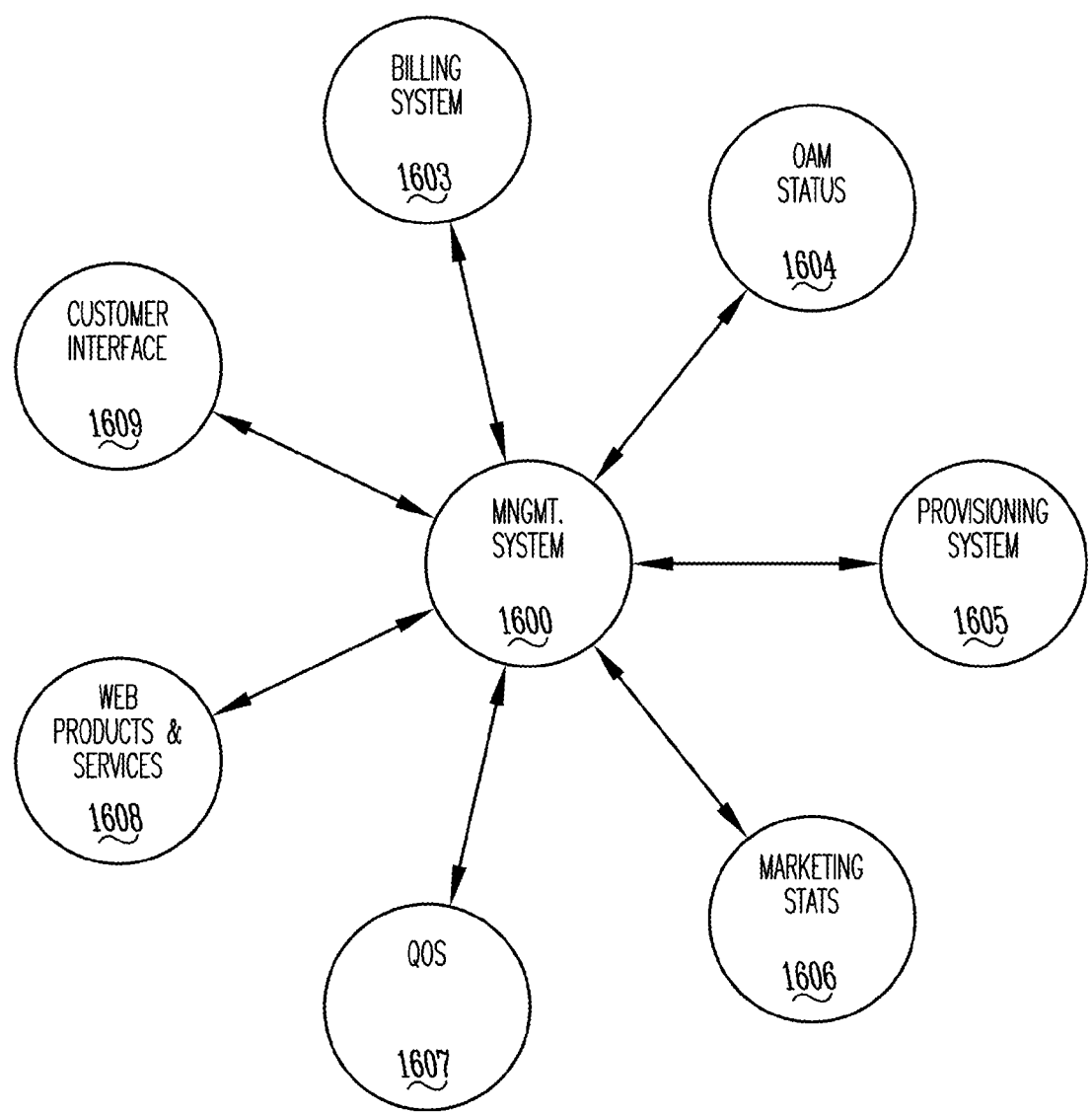
FIG. 16H is an illustration illustrating various components that may be configured in a LDL Management System.

The services management system 1600, as shown in FIG. 16H, includes a plurality of service applications that can be a combination of one or more computer applications, software modules, and computer programs including: billing and revenue applications 1603, operations and management applications 1604, service and customer provisioning applications 1605, marketing and sales support applications 1606, quality of service (QoS) applications 1607, web products and services 1608, and customer interface 1609.

One skilled in the art can realize that the service applications within the services management system 1600 can depend and integrate with other service applications. Examples of this would be the need for the marketing sales and support 1606 needing to access customer account information 1609 and procedures contained in the service and customer provisioning applications 1605 and billing and revenue applications 1603.

In addition, the service applications may require supportive elements that reside on other elements outside of the services management system 1600.

These other elements can include other components of the preferred embodiment such as, but not limited to, the multiplexer 900 as shown in FIG. 9 and line interface device 361 as shown in FIG. 3 and FIG. 4 and FIG. 5.

Other supportive elements for service applications within the services management system 1600 can include third-party systems and databases that reside outside the preferred embodiment. Examples of these include, but are not limited to video and audio service providers, gaming providers, application service providers (ASP), e-mail services, unified messaging, emergency broadcast and notification, etc.

The hardware architecture of the services management system 1600 can consist of a centralized, distributed or grid computing model and can include a combination of one or more processing devices s such as, but not limited to mainframes such as IBM 3090, IBM RS/6000, PC's, workstations such as H/P, Sun, Compaq.

Each processing device can dictate the operating system requirements and options. The operating options include, but are not limited to the many of the variants of Unix, e.g. Red Hat Linux and HP-UX, IBM mainframe operating systems, e.g. MVS/TSO, Microsoft Windows, embedded operating systems such as eCos, VxWorks, QNX and hardware.

In addition, the hardware architecture can consist of centralized or distributed media storage devices. These media devices can include standard magnetic storage systems such as disk, diskette and tape, optical storage systems, media storage arrays, cache and memory. These storage media devices can be local or remote to the processing devices and can be interconnected to one or more of the hardware devices over local bus such as SCSI, PCI, Infiniband, networked bus such as iSCSI, FiberChannel, communications protocols such as NFS and TCP/IP.

The data for the service management system 1600 components can be stored in standard file formats, e.g. ASCII text, binary, compressed, etc., in memory or in a database such as but not limited to Oracle, Sybase, Microsoft Access, MySQL, DataSpace and a chaotic database.

In support of some of the service management system 1600 and associated service applications. Third-party application packages and engines can be implemented in full or part including, but not limited to Matrixsoft's eMatrix for expediting business processes, Amdocs for customer care and billing, PeopleSoft, Siebel and Athene software products for customer care and support systems, and on-line shopping technologies such as shopping carts, credit card processing and Internet web servers such as Apache.

Additional software developed for the service management system 1600 and associated service applications can be created in a plurality of software languages including C, C++, PHP, ASP Vbscript, Java, SQL, embedded SQL, OBDC, COBOL and can include the use of various application programming interfaces provided by third-party products such as Customer Interface 1609 into the service management system 1600 and service applications can occur via a plurality of methods including, but not limited to a web browser, a PDA, a telephone and a cell phone. In addition, user access or service management system 1600 requests originating from components in the preferred embodiment such as a set-top box, or Internet appliance, etc. can be received from the multiplexer 900 as shown in FIG. 3 and FIG. 4 and FIG. 5.

The billing and revenue support system 1603 provides support for the many facets of billing and revenue including, but not limited to billing, rates management, processing and rating of user usage records, the management of product and services packages (plans, promotions, discounts, volume), sales commissions, taxes, etc.

Operation and Maintenance (OAM) 1604—Elements of the preferred embodiment of the present invention will collect and maintain information related to providing insight to the performance and operational aspects of the preferred embodiment.

Examples of performance and operation indicators include, but are not limited to statistics for transactions, network transaction, memory usage, processor usage, user access information, database transaction, input/output transactions (bus, disk, network, card), disk transactions, cache transactions, network usage, network overflow, network re-routes, network blockage and service interruptions.

OAM information may be stored via means outlined above under "data storage" either on the devices where the OAM indicators are monitored and collected or they can be pushed to a "data storage" element within the preferred embodiment or on a third-party system.

Likewise, OAM information may be exchanged as outlined above under the definition of "information exchange" with other service management system 1600 applications such as quality of service application 1607. In addition, OAM can exchange information as outlined above under the definition of "information exchange" with third-party systems within a Network Operations Center (NOC) such as but not limited to an HP OpenView or other network monitoring and operational systems.

Service Provisioning Application 1605—Service provisioning applications 1605 are responsible for the provisioning of services to users of the preferred embodiment. When a user wishes to add, delete or change services such as Internet and video services the service management system's 1600 provisioning applications 1605 are largely responsible for the managing the change request among the many components that compose the preferred embodiment.

For example, if a user wishes to add Internet service, the service provisioning applications 1605 will issue a request to the multiplexer 900 to allocate resources and perform other operations that enable the transmission of Internet services between an end-user and the Internet. In addition, the service provisioning applications 1605 will send a request to end-user's interface device 361 as shown in FIGS. 3 and 4, instructing it to allocate resources and perform procedures that enable Internet services. There could be additional requests from the service provisioning application 1605 to any one or more preferred embodiment components for allocating resources and performing service enabling procedures.

In addition, the service provisioning application 1605 may respond to requests and issue requests to any of the other service management applications in the support of provisioning services.

In some cases, the provisioning of services for a user could require resource allocation and service enabling requests to third-party systems and services that access the preferred embodiment including, but not limited to video feeds, Internet services and telephony service.

For example, if a user wishes to subscribe to a particular music streaming service that is provided and access is controlled by a third-party service provider, then the service provisioning application 1605 would request the third-party service provider to begin sending a particular music stream to the service management system 1600, or the multiplexer 900 on behalf of the user who requested the service.

Similarly, if a user decides to end the music stream subscription service, then the Service Provisioning application 1605 would send a request to the third-party service provider. Any method of communicating instructions between the management system 1600 and the third-party service providers.

A request for the Service Provisioning System 1605 may originate from any of the interconnected components to the management system 1600.

Upon receipt of a service provisioning request, the Service Provisioning System 1605 may send additional requests to the other systems shown in FIG. 16H.

Marketing and Sales Support 1606—Marketing and Sales Support 1606 application of the service management system 1600 is responsible for the collection and processing of information as it is related to marketing and sales analysis. For example, usage information regarding the services provided by the present invention can be analyzed individually or in aggregate to determine the popularity of services and other user metrics for tailoring the preferred embodiment's service offerings, user service packages, etc.

In addition, the Marketing and Sales Support 1606 component may include the use of third-party systems including but not limited to Athene's iCRM suite, APT Churn™ and APT Profitability™ software products to determine profitability of products and churn of customer services. These third-party systems may or may not be co-located with the service management system 1600 and may include the use of sharing or exchanging of data contained within the preferred embodiment.

Also, the Marketing and Sales Support 1606 system may include the use of web site statistics and logging utilities such as but not limited to WebTrends to analyze the use of web-enabled products and services of the preferred embodiment.

Quality of Service 1607—Quality of Service application 1607 is responsible for managing resources and other components within the preferred embodiment to provide quality of service to the users of the preferred embodiment. Depending on a variety of parameters, including but not limited to user service level agreements (SLAs), quality of service required for product and services provided or supplied by the preferred embodiment, the quality of service application 1607 is largely responsible for the managing the quality of service oriented requests among the many components that comprise the present invention.

If the Quality of Service application 1607 determines the need to adjust the level of resources and/or the performance on behalf of user(s) of the preferred embodiment, the quality of service application 1607 will issue such requests to the required elements, service applications and third-party systems.

In addition, if one or more operations among one or more of the preferred embodiment elements, service management system applications and/or third-party systems are required in support of quality of service, then the quality of service application 1607 will issue the required requests to the required elements, service applications and/third-party systems.

Web Enabled Products and Services 1608—As previously noted, there are several access methods into the preferred embodiment of the present invention. Among those listed are web-based services and products that are typically accessed by a browser-enabled device such as, but not limited to a computer or personal digital assistant (PDA.) These devices typically run some form of browser software such as but not limited to Microsoft's Internet Explorer or Netscape's browser.

By web-enabling the applications in whole or in part, a user of the preferred embodiment can access segments of the service management system's 1600 applications. Web enabling an application implies that the user can control components segments an application via the use of a browser.

Examples of web-enabled application segments within the preferred embodiment include, but are not limited to accessing and modifying user account and billing information, accessing customer care and help applications such as on-line chat, instant messaging and help web-pages, subscription services such as requesting an on-demand multi-media feed and the ordering services and products, etc.

A general description of the present invention, as well as a preferred embodiment, and alternative embodiments and aspects of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention, which is to be limited only by the claims, appended hereto.

What is claimed is:

1. A device for ultra wideband communications over a guided medium, comprising:
   a line interface configured for electrical communication to the guided medium and adapted for interfacing with the guided medium;
   an ultra wideband impulse transmitter electrically connected to the line interface for transmitting amplitude modulated ultra wideband impulses over the guided medium; and
   an ultra wideband receiver electrically connected to the line interface for receiving amplitude modulated ultra wideband impulses over the guided medium;
   wherein the device is adapted for preparing data for transmission using the ultra wideband impulse transmitter by: (a) determining bit loading per frequency bin based on channel estimation data to create data symbols; (b) performing a Fast Fourier Transform (FFT) on an array of the data symbols; (c) mapping FFT data output sub-channel to a frequency bin to provide frequency mapped data; (d) performing an Inverse Fast Fourier Transform (IFFT) on the frequency mapped data to provide IFFT frequency mapped data suitable for transmission using one-dimensional amplitude modulated ultra wideband impulses representing the IFFT frequency mapped data; and
   wherein the device is adapted for (a) recovering data from the amplitude modulated ultra wideband impulses received by the ultra wideband receiver; (b) performing a FFT on the data; (c) mapping frequency to sub-channel to provide mapped data; (d) equalizing the mapped data by sub-channel to provide equalized mapped data; (e) performing an IFFT on the equalized mapped data to provide an IFFT output; and (f) mapping the IFFT output to data symbols to thereby provide for recovering information communicated over the guided medium to the ultra wideband receiver.

2. The device of claim 1 wherein the array of the data symbols is interleaved.

3. The device of claim 1 wherein the guided medium is a coaxial cable.

4. The device of claim 1 wherein the guided medium is a twisted pair wire.

5. The device of claim 1 wherein the guided medium is a power line.

6. The device of claim 1 wherein the ultra wideband communications communicate data selected from the group consisting of telephony data, digital video data, digital television data, Internet data, and audio data.

* * * * *